United States Patent [19]

Wolfe et al.

[11] Patent Number: 4,541,055
[45] Date of Patent: Sep. 10, 1985

[54] LASER MACHINING SYSTEM

[75] Inventors: Donald L. Wolfe, Allison Park; Jack W. Clements, Trafford, both of Pa.; John S. Kerrey, Columbia, S.C.

[73] Assignee: Westinghouse Electric Corp., Pittsburgh, Pa.

[21] Appl. No.: 414,241

[22] Filed: Sep. 1, 1982

[51] Int. Cl.³ .................... B23K 26/12; G05D 25/00
[52] U.S. Cl. .................................. 364/474; 364/559; 364/400; 364/167; 364/142; 219/121 LY
[58] Field of Search ................ 219/121 LA–121 LE, 219/121 LS–121 LZ, 75, 121 LM, 121 FS, 125; 364/474, 400, 559, 167, 142

[56] References Cited

U.S. PATENT DOCUMENTS

| | | | |
|---|---|---|---|
| 3,422,246 | 1/1969 | Wetzel | 219/121 |
| 3,555,239 | 1/1971 | Kerth | 219/125 |
| 3,774,010 | 11/1973 | Heer et al. | 219/121 LM |
| 3,791,466 | 2/1974 | Patterson et al. | 176/78 |
| 3,803,379 | 4/1974 | McRay | 219/121 LY X |
| 3,966,550 | 6/1976 | Foulds et al. | 176/78 |
| 4,078,167 | 3/1978 | Banas et al. | 219/121 R |
| 4,083,629 | 4/1978 | Kocher et al. | 219/121 LT X |
| 4,088,890 | 5/1978 | Waters | 219/121 L |
| 4,154,530 | 5/1979 | Connolly, Jr. et al. | 364/559 X |
| 4,190,759 | 2/1980 | Hongo et al. | 219/121 LV X |
| 4,223,201 | 9/1980 | Peters et al. | 219/121 LC X |
| 4,223,202 | 9/1980 | Peters et al. | 219/121 LC |
| 4,278,867 | 7/1981 | Tan | 219/121 LC X |
| 4,327,277 | 4/1982 | Daly | 219/121 LT X |

OTHER PUBLICATIONS

Proceedings of the Society of Photo-Optical Instrument Engineering; vol. 247; Advances in Laser Engineering and Applications (1980); pp. 24–29, King, Peter P., "Pressurization of Nuclear Fuel Rods Using Laser Welding" and pp. 30–37, Welty, Richard K., External Attachment of Titanium Sheathed Thermocouples to Zirconium Nuclear Fuel Rods for the Loss-of-Fluid-Test (LOFT) Reactor.

Nuclear Engineering and Design 33 (1975), pp. 155–169, Stehle, A. et al., "External Corrosion of Cladding in PWR's" and pp. 178–195, Lunde, Liv, Special Features of External Corrosion of Fuel Cladding in Boiling Water Reactors.

Primary Examiner—Jerry Smith
Assistant Examiner—Allen MacDonald
Attorney, Agent, or Firm—Douglas E. Erickson

[57] ABSTRACT

A computer controlled apparatus is disclosed for performing a series of laser machining operations on a work piece in an environment comprised of a non-reactive gas with respect to the material of which the work piece is made. The computer controlled apparatus includes a machining chamber for receiving the work piece and means in the form of a pump for directing the non-reactive gas into the machining chamber at a controlled, selected rate. A laser beam is generated by a laser and is focused into a beam along a path to the work piece. An assembly is provided for selectively moving the machining chamber and its work piece therein through a sequence of steps, whereby the relative position between the work piece and the laser beam is changed such that a series of lasing operations and, in particular, welds may be effected on a sequence of selected sites of the work piece. A computer is programmed to control the rate at which the non-reactive gas is introduced into the machining chamber, as well as to the machining sites of the work piece, whereby the selectively moving assembly may be controlled to dispose the work piece to effect the series of welding operations.

35 Claims, 62 Drawing Figures

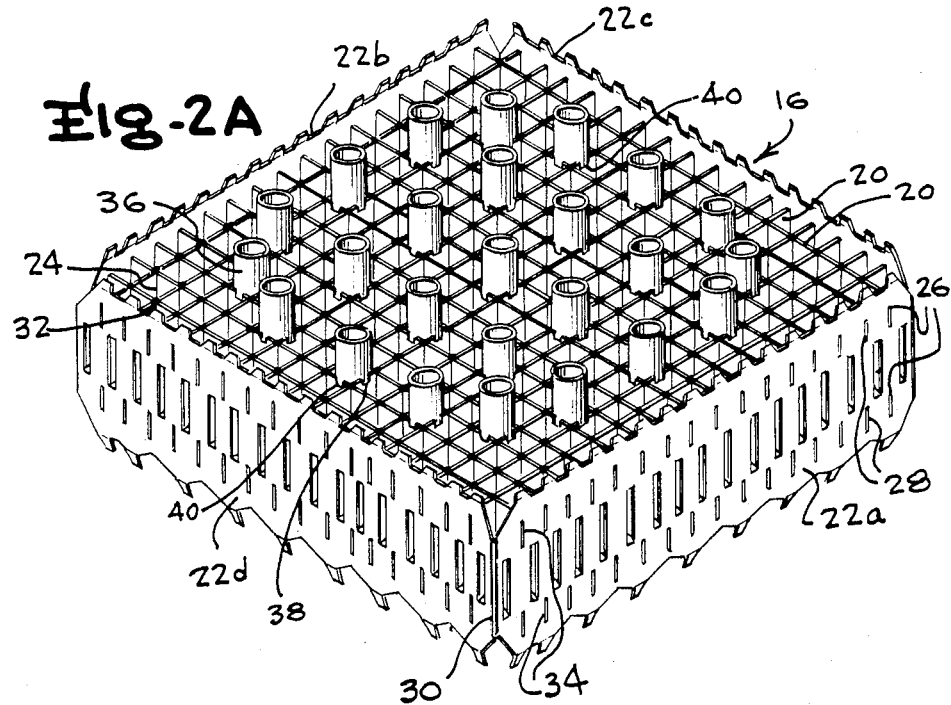
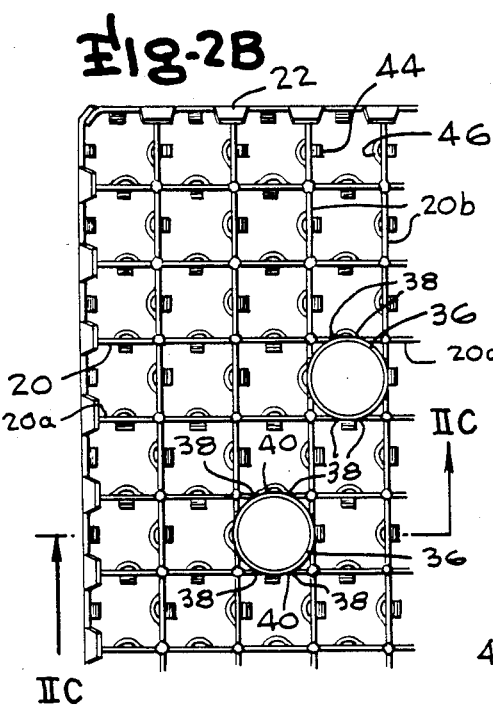
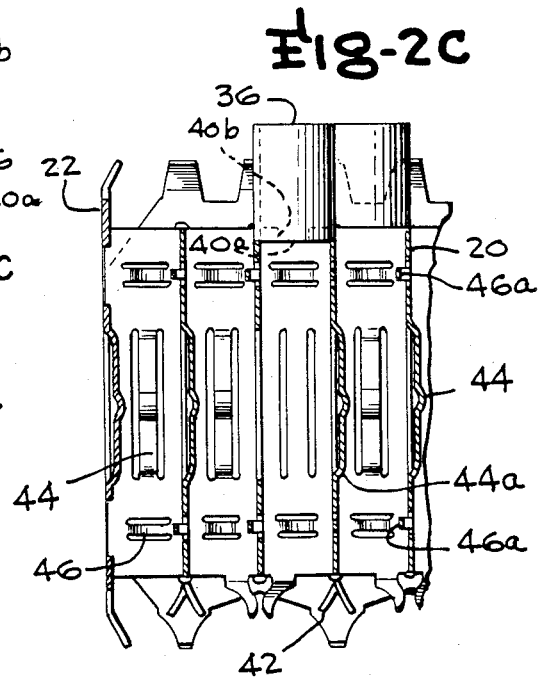

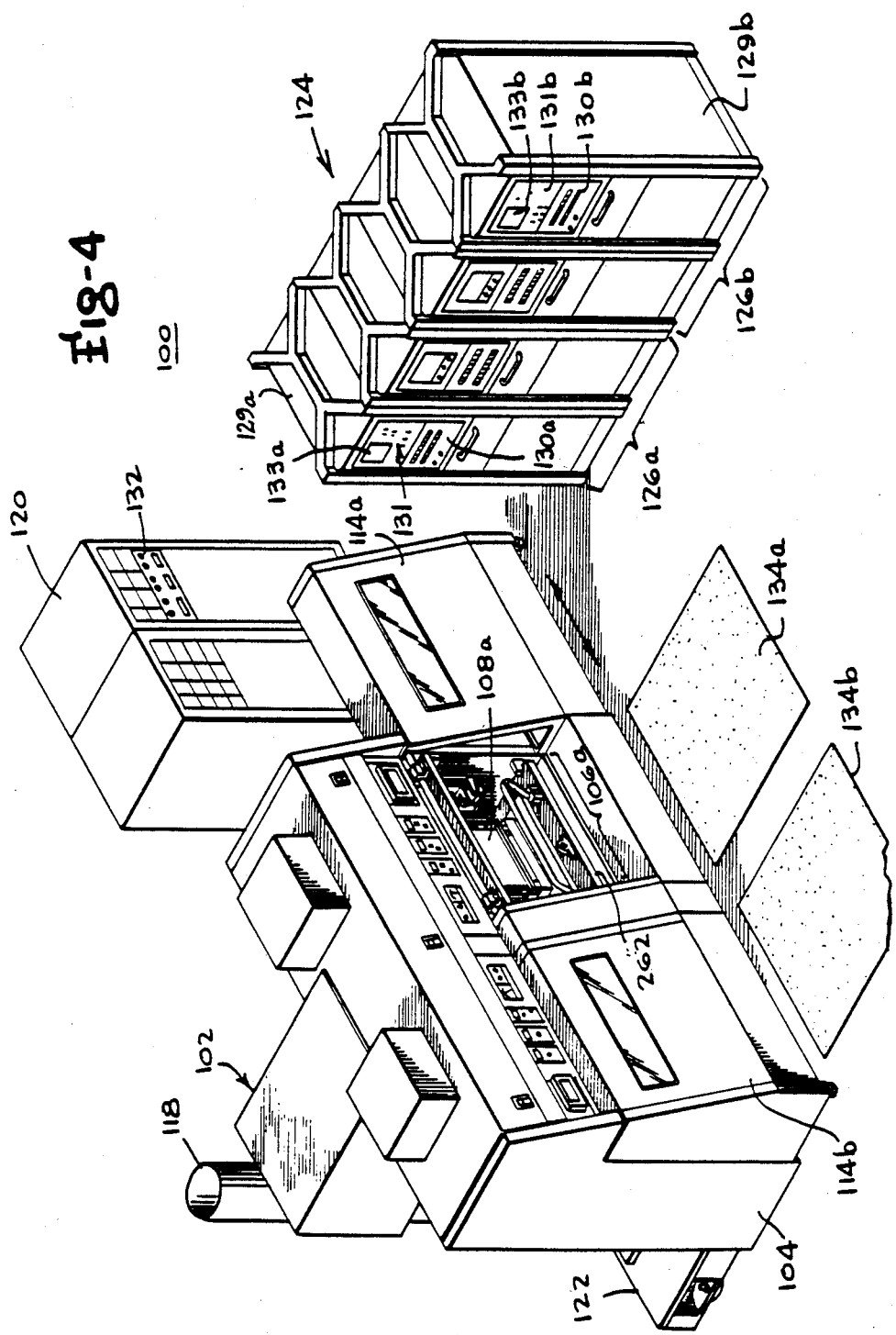

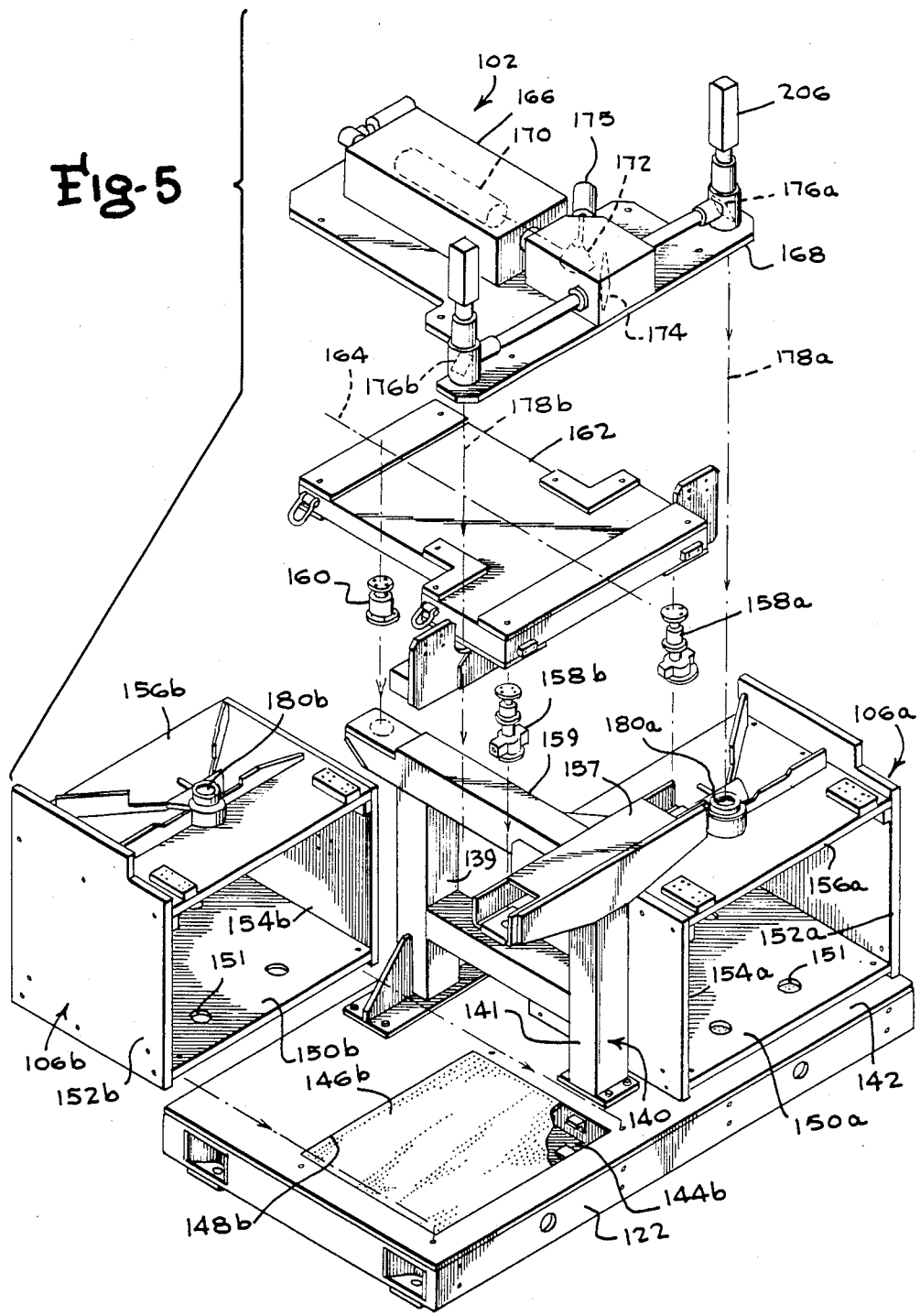

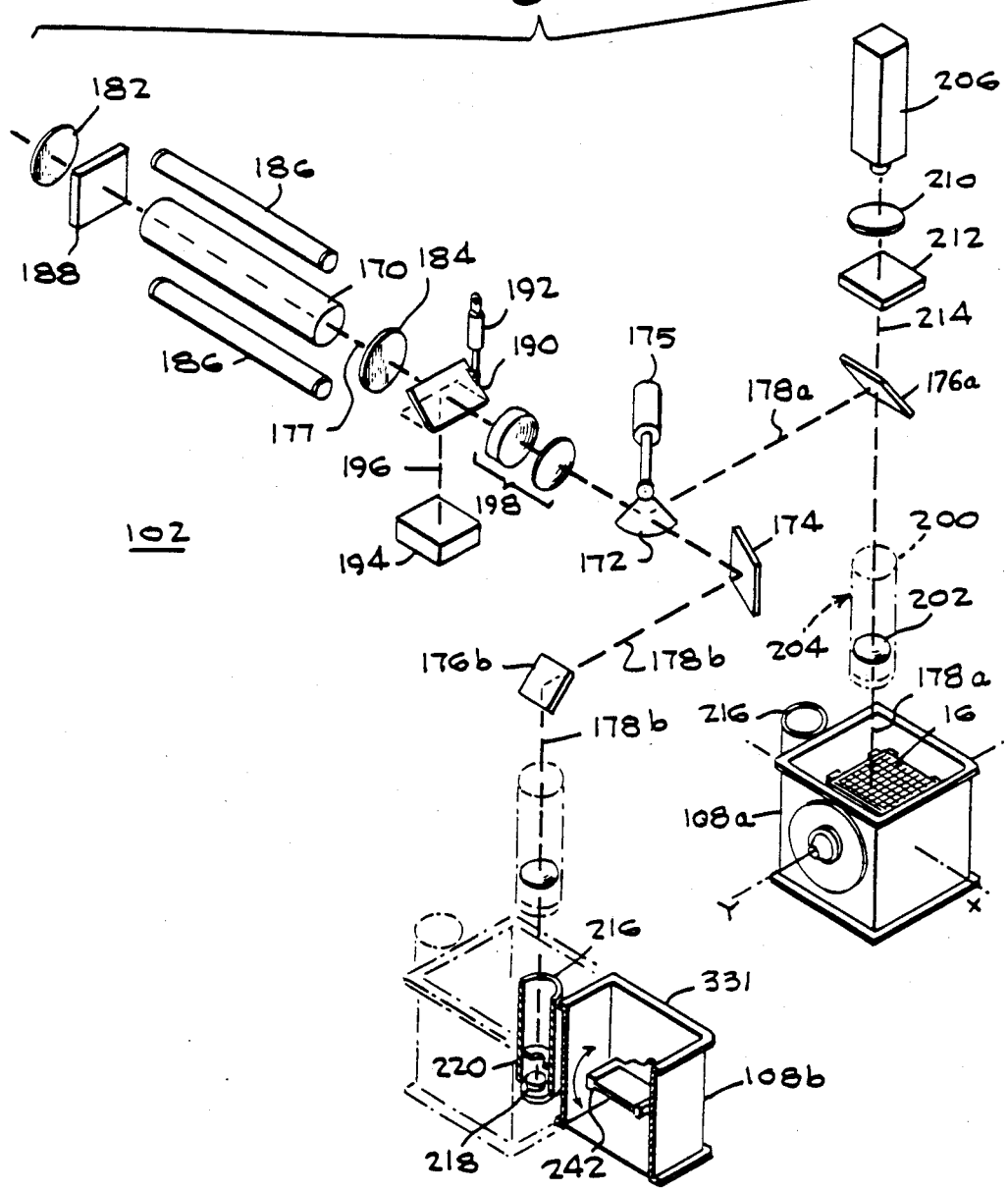

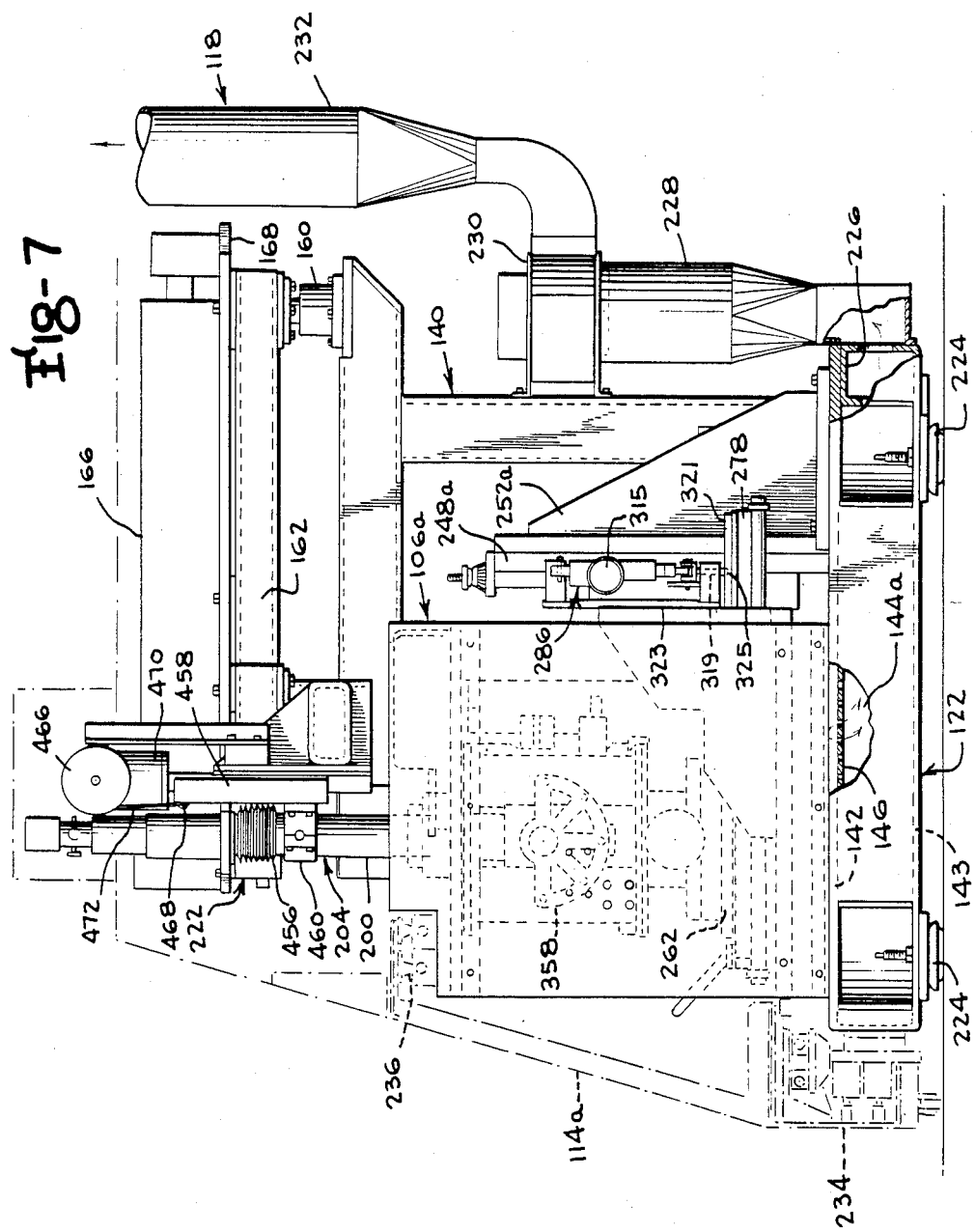

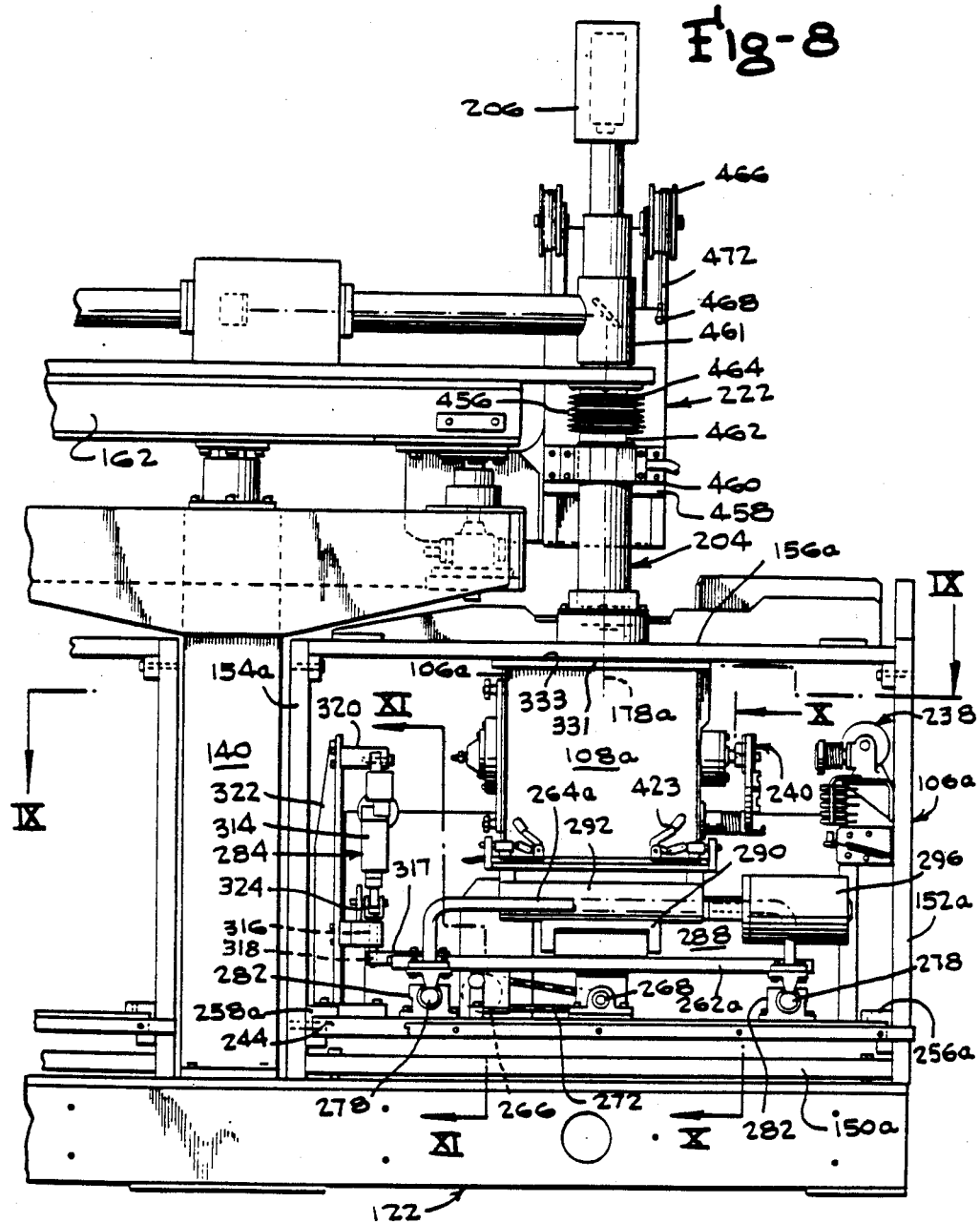

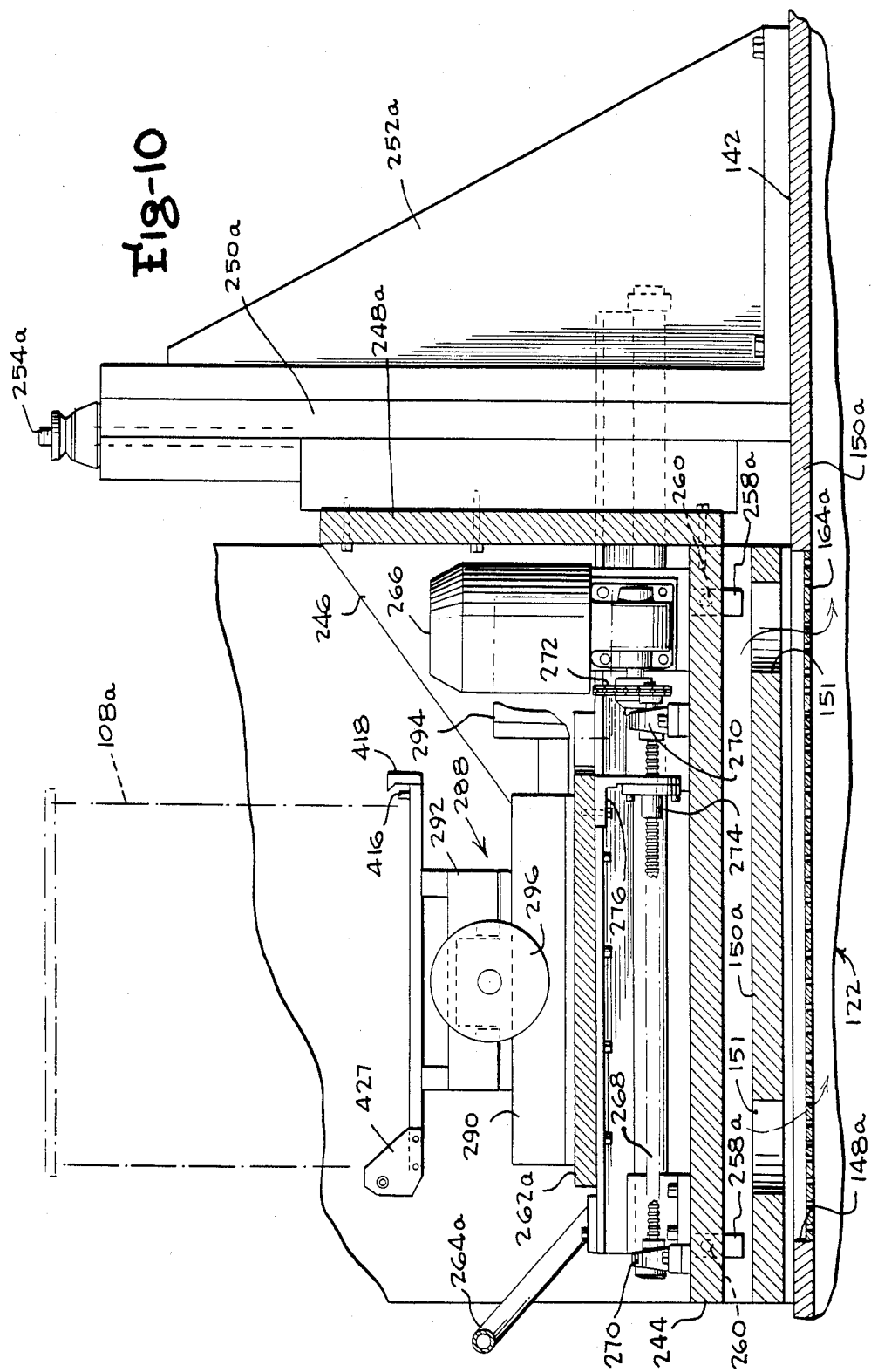

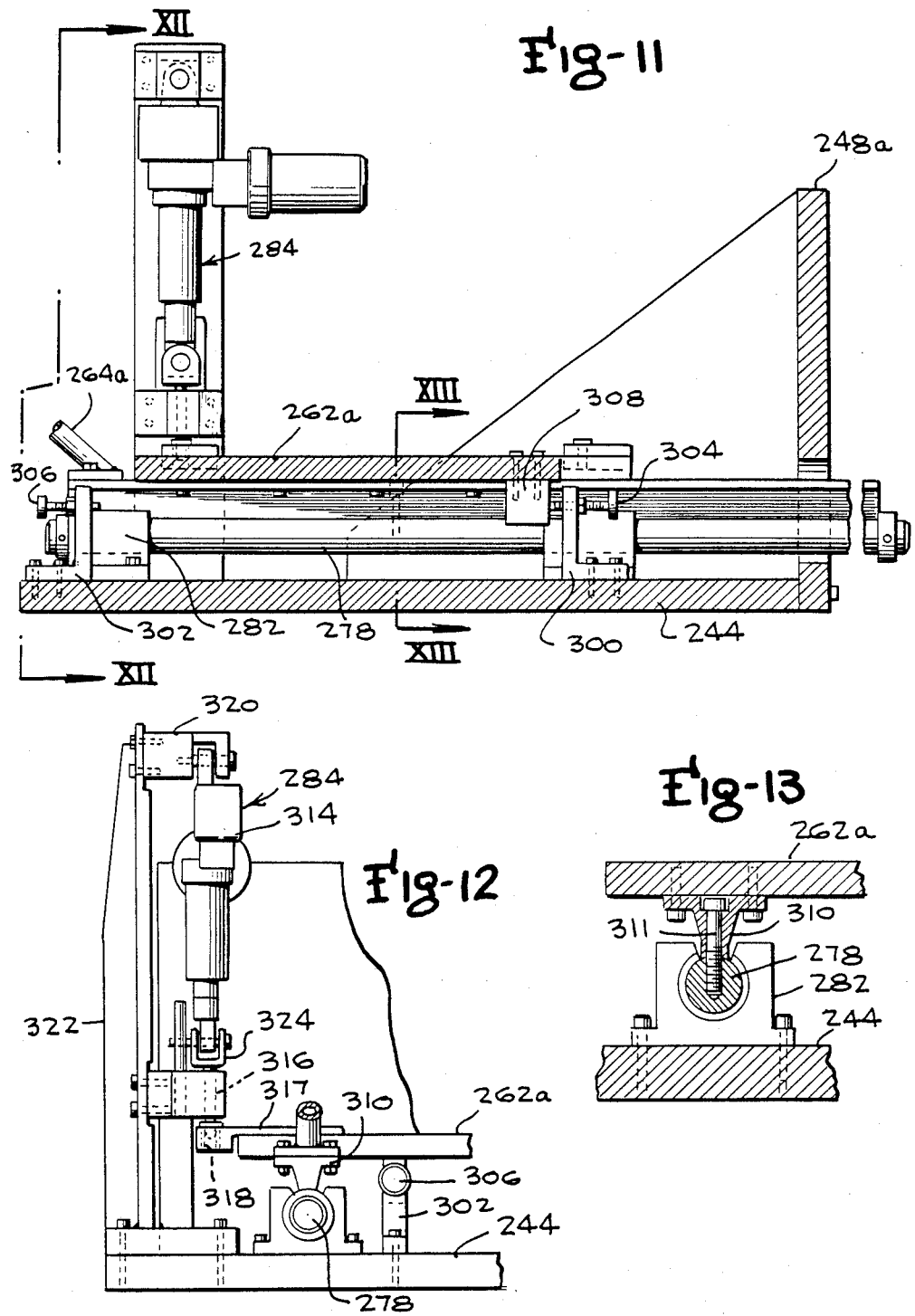

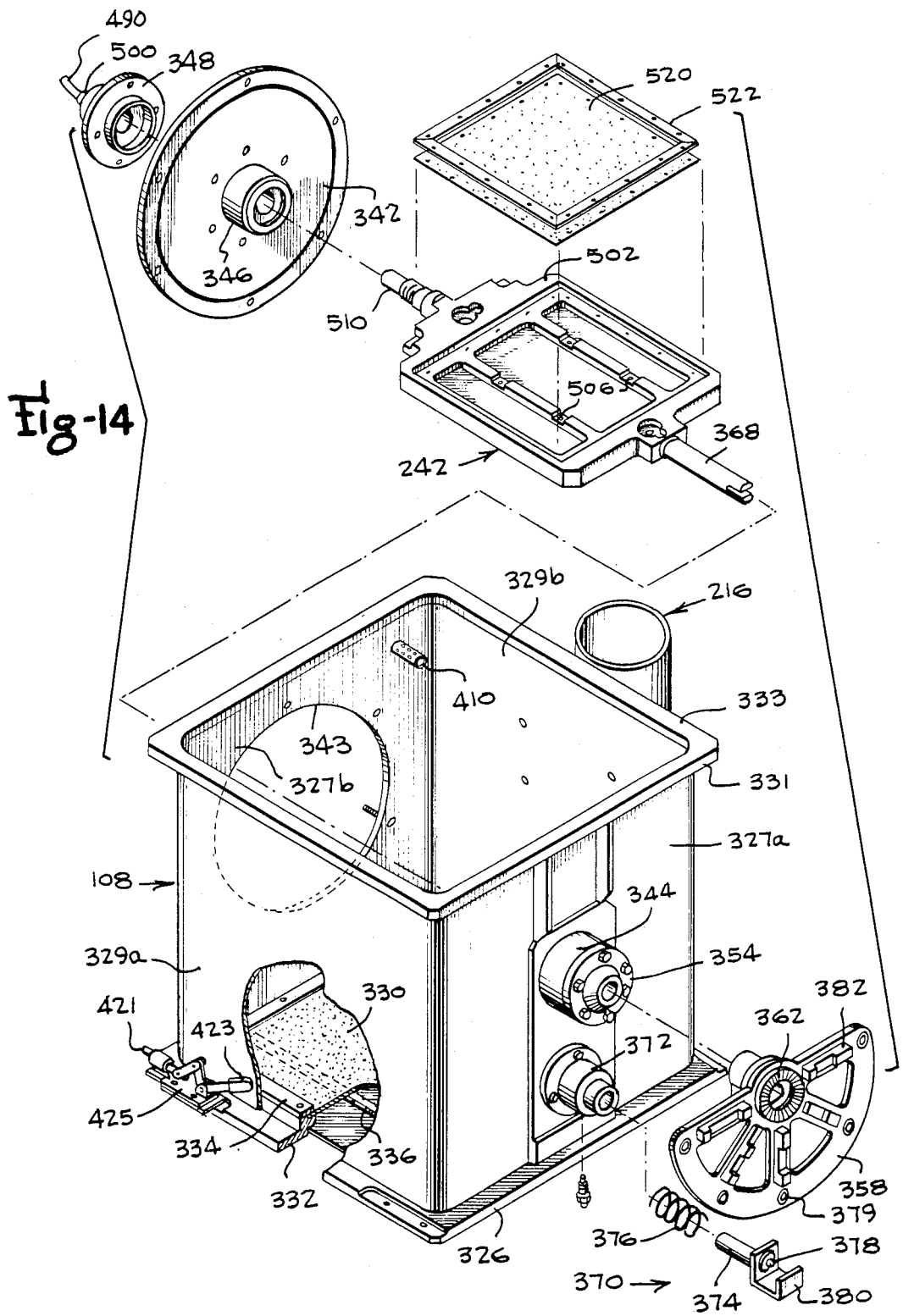

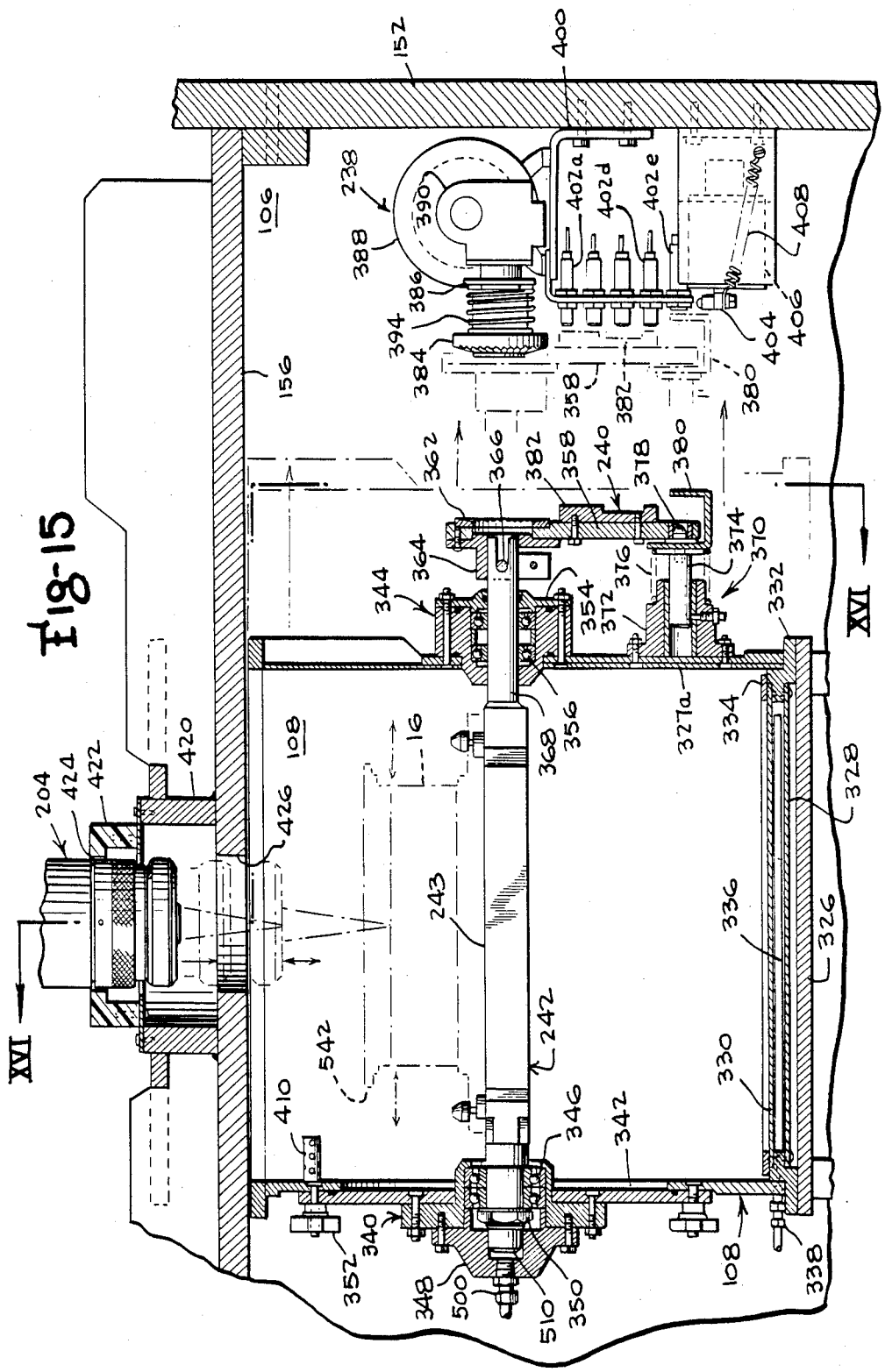

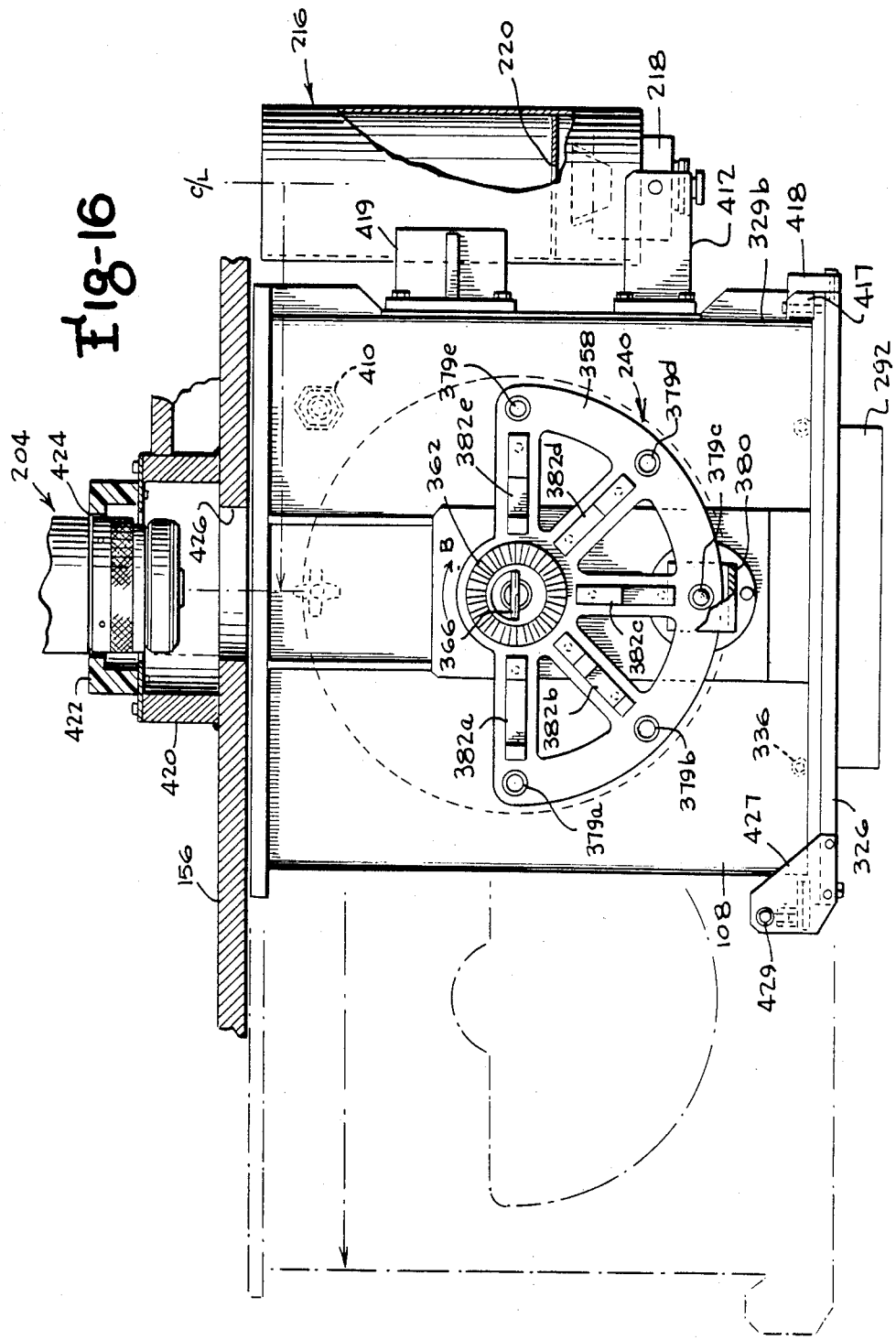

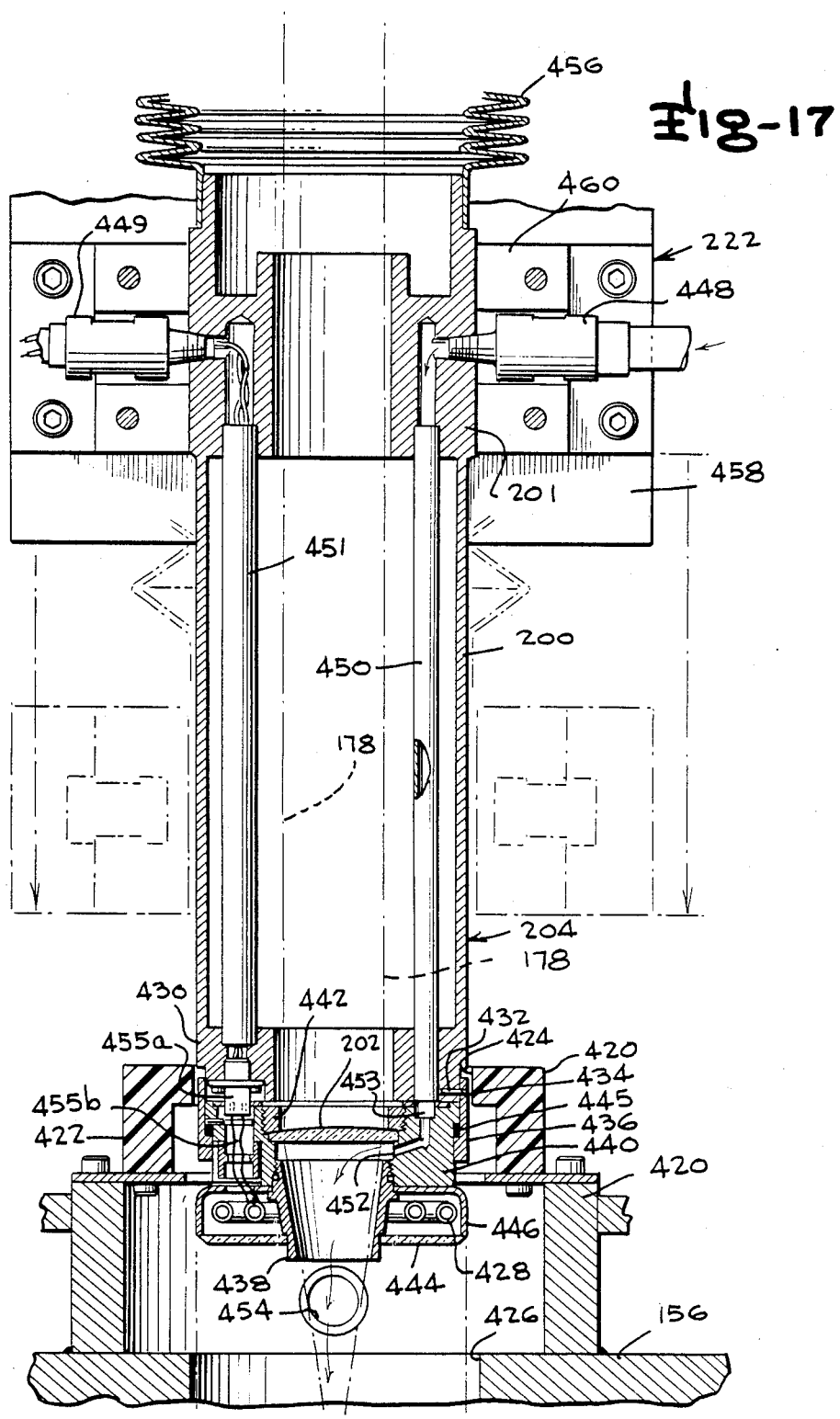

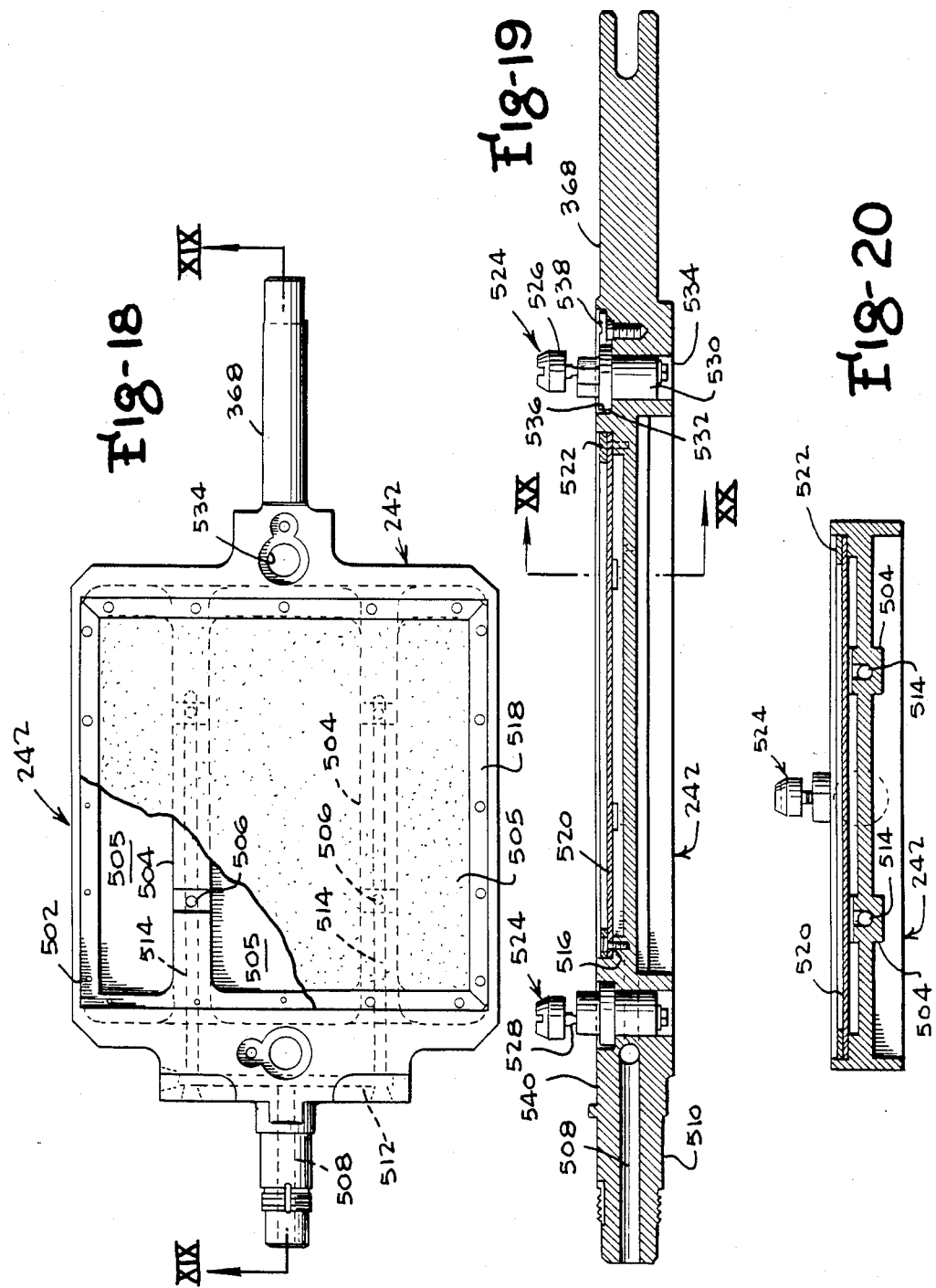

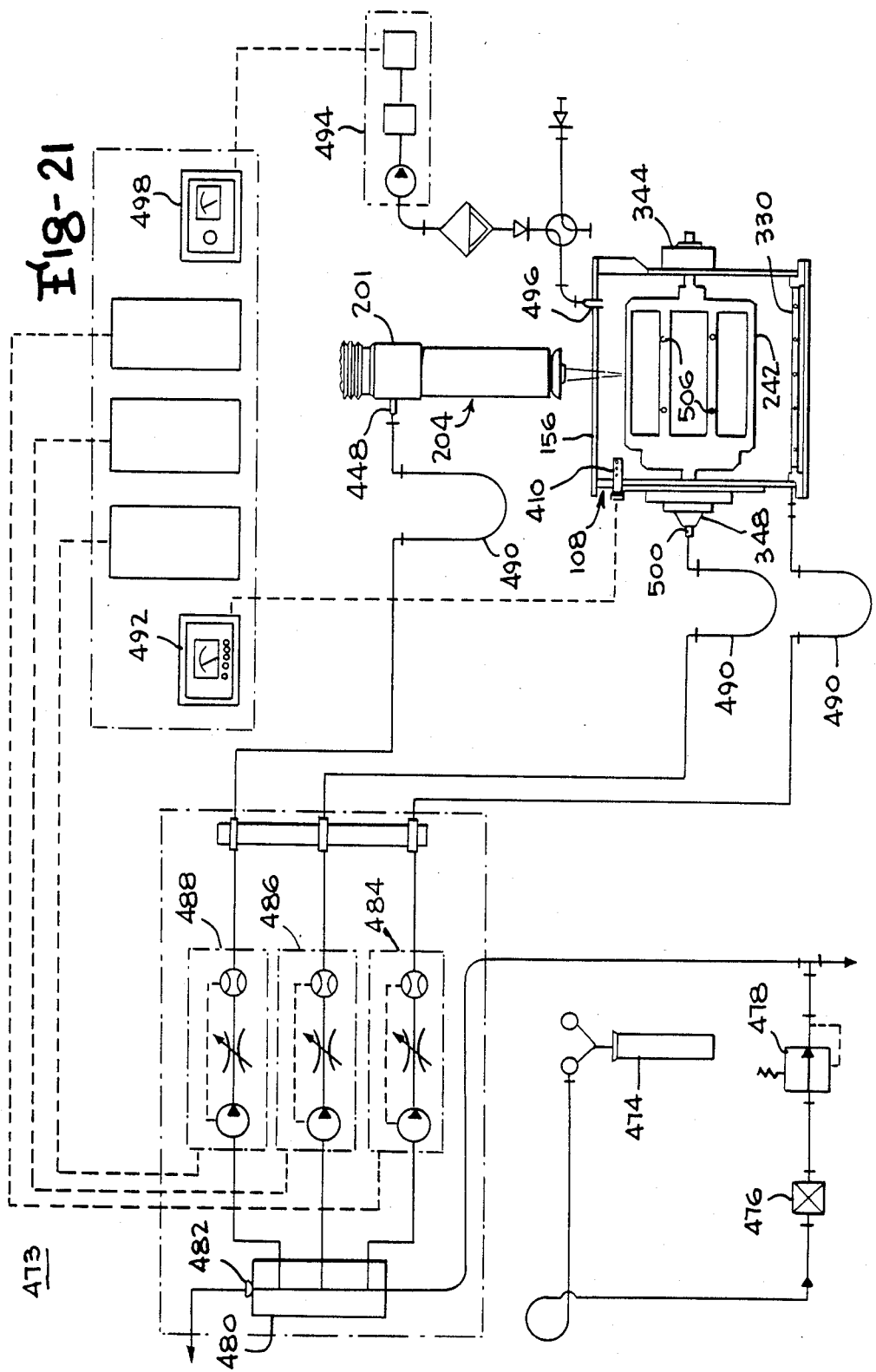

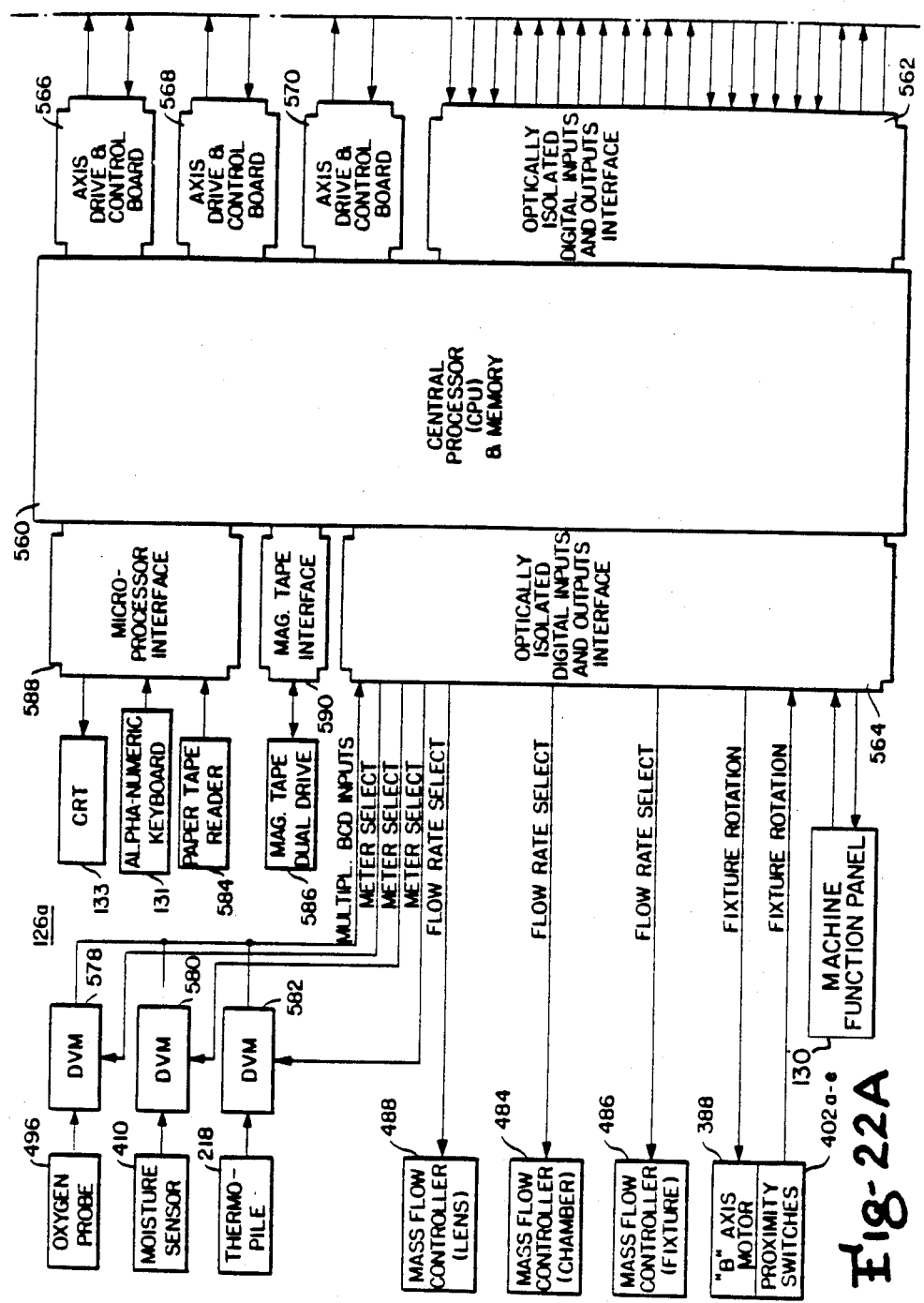

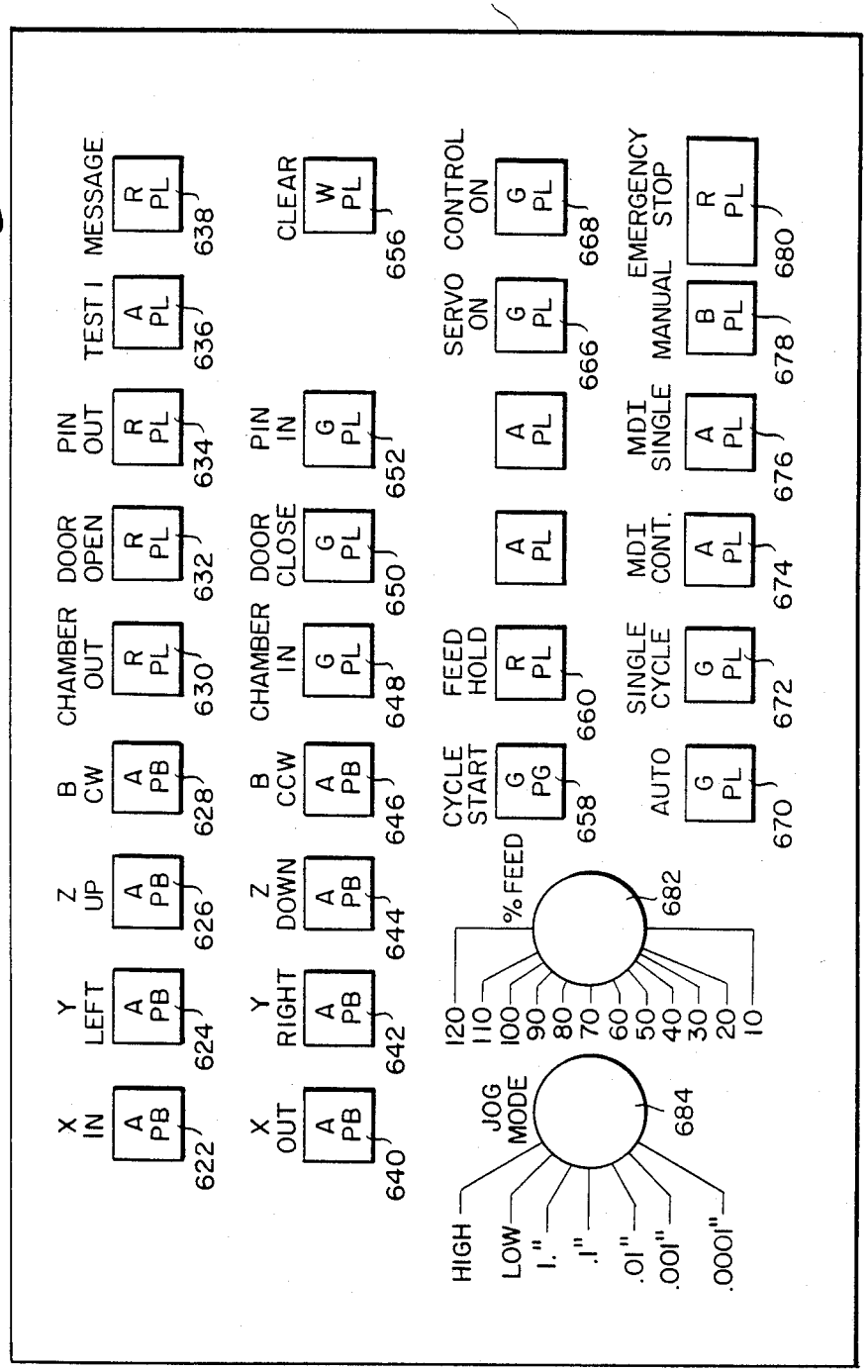

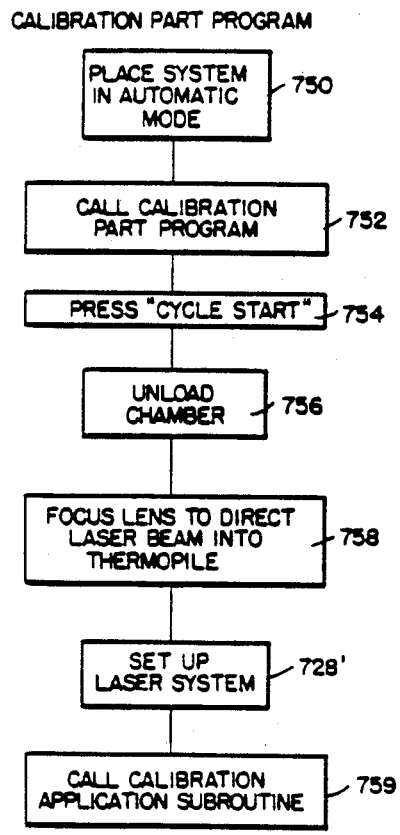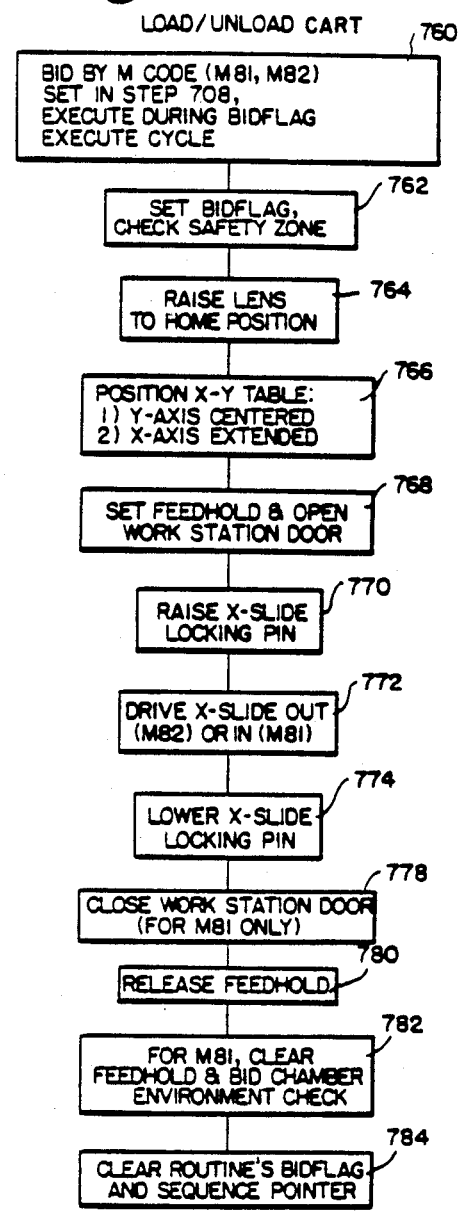

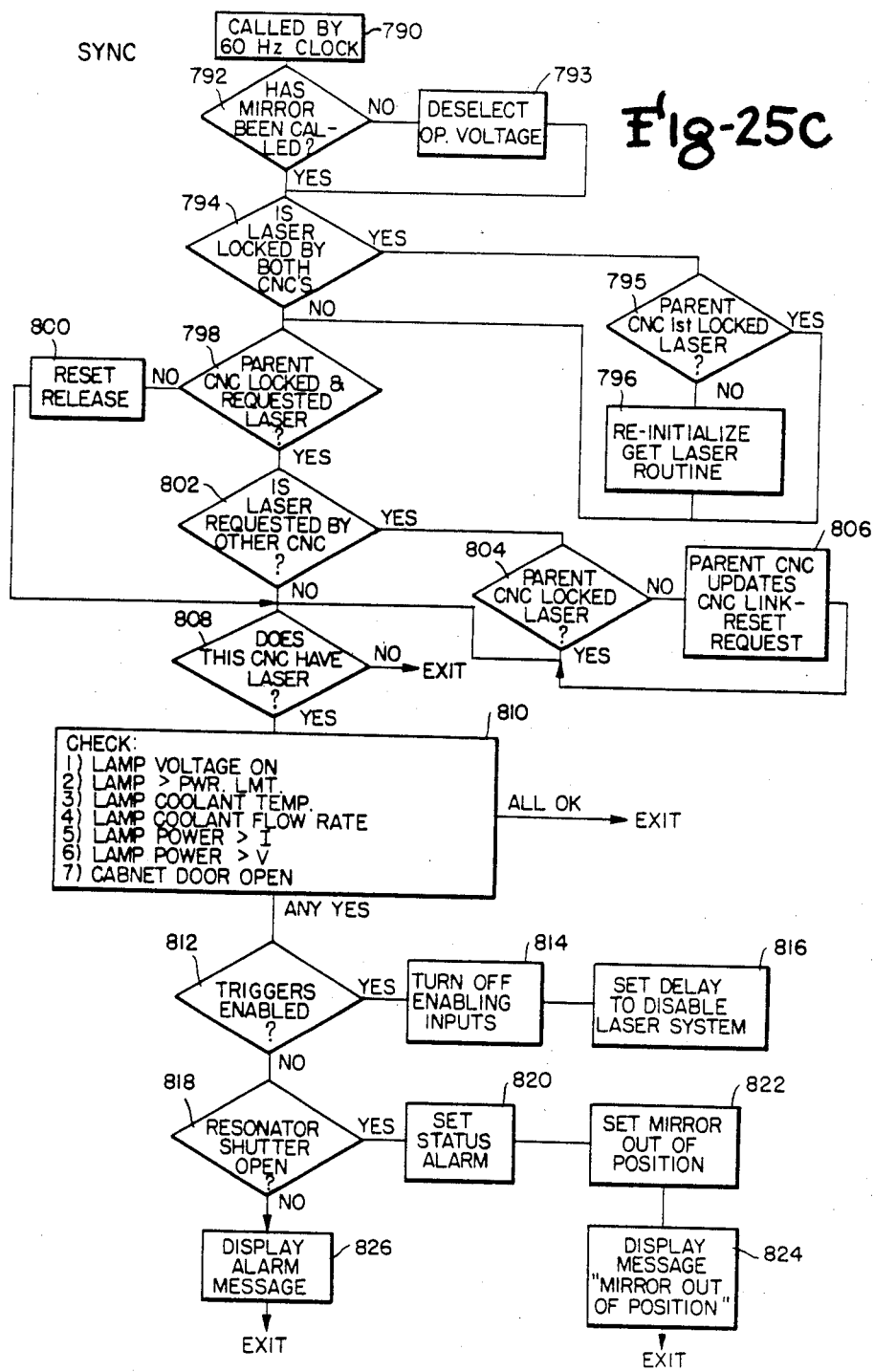

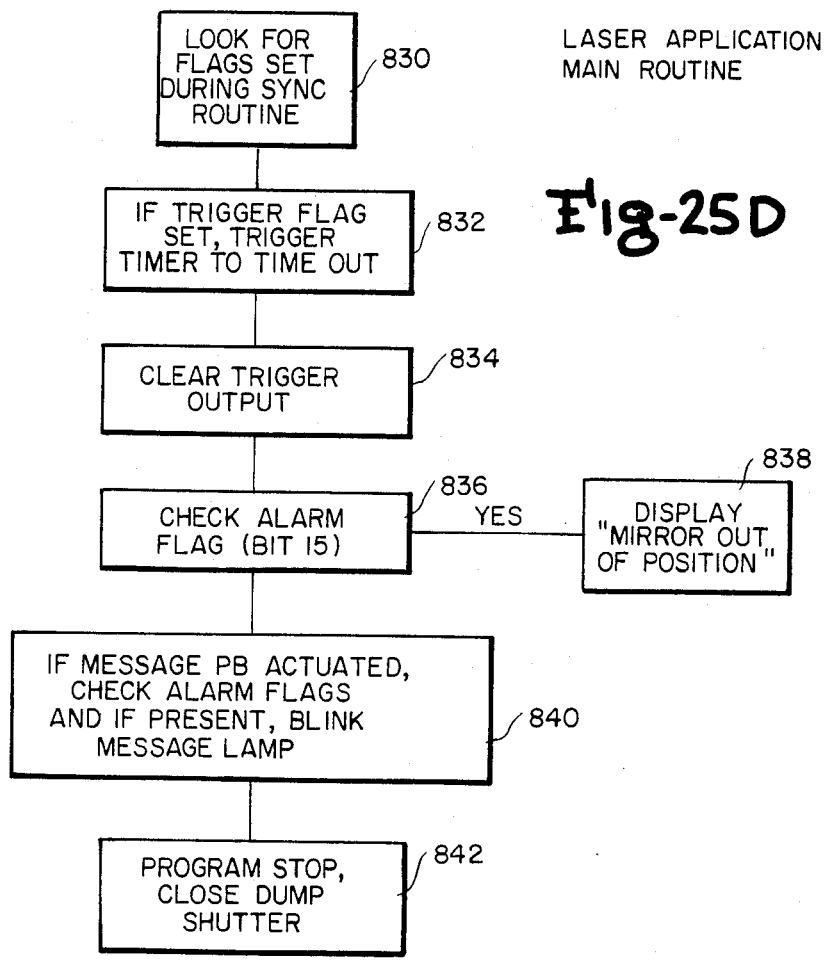
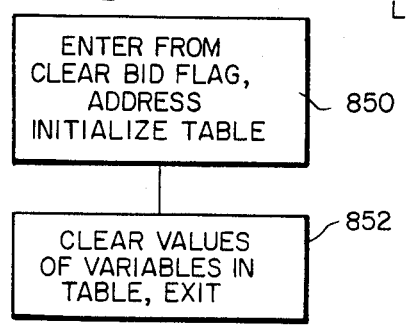

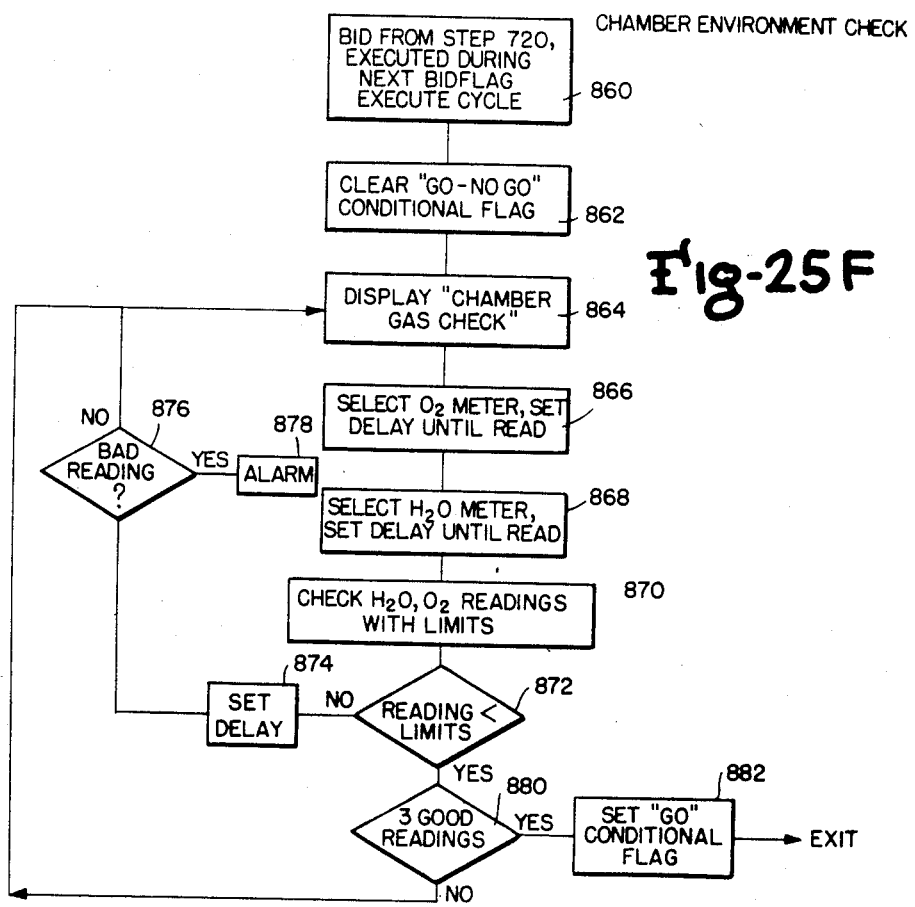
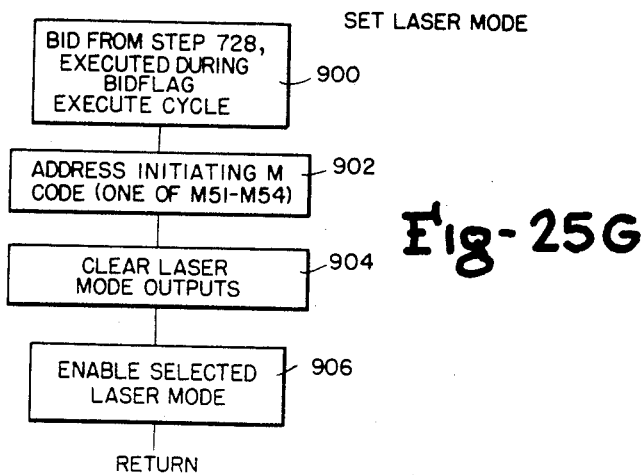

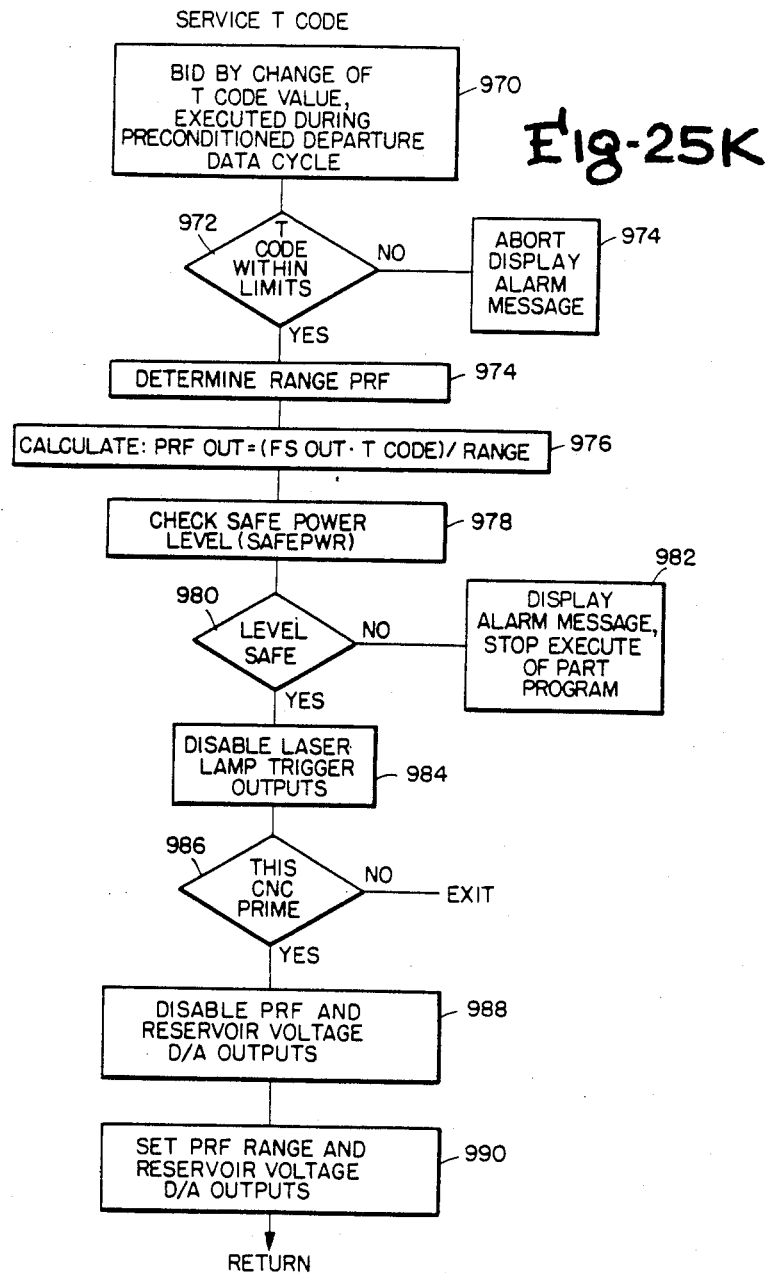

LASER MACHINING SYSTEM

CROSS-REFERENCE TO COPENDING APPLICATIONS

Attention is drawn to the following copending, commonly assigned applications, all/each filed on even data and incorporated specifically by reference into the instant specification:

(1) "FUEL GRID WITH SLEEVES WELDED IN NOTCHED GRID STRAPS" by R. Duncan, Ser. No. 414,232;

(2) "PULSED LASER MACHINING APPARATUS" by R. A. Miller and G. D. Bucher, Ser. No. 414,264;

(3) "APPARATUS AND METHOD FOR LASER MACHINING IN NON-REACTIVE ENVIRONMENT" by R. A. Miller and G. G. Lessman, Ser. No. 414,242;

(4) "STRAP AND VANE POSITIONING FIXTURE FOR FUEL ROD GRID AND METHOD" by R. F. Antol, R. W. Kalkbrenner and R. M. Kobuck, Ser. No. 414,197;

(5) "GRID ASSEMBLY FIXTURE, RETENTION STRAP AND METHOD" by R. M. Kobuck and R. W. Kalkbrenner, Ser. No. 414,198;

(6) "MOVABLE MACHINING CHAMBER WITH ROTATABLE WORK PIECE FIXTURE", by R. F. Antol, R. Kalkbrenner and D. L. Wolfe, Ser. No. 414,263;

(7) "WORKPIECE GRIPPING AND MANIPULATING APPARATUS FOR LASER WELDING SYSTEMS AND THE LIKE", by R. Kalkbrenner and R. Kobuck, Ser. No. 414,262;

(8) "LASER LENS AND LIGHT ASSEMBLY", by R. Antol, R. Kalkbrenner and R. Kobuck, Ser. No. 414,205;

(9) "WELDING PLATES FOR A FUEL ROD GRID", by R. M. Kobuck, R. Miller, R. W. Kalkbrenner, J. Kerrey and R. Duncan, Ser. No. 414,265;

(10) "PLURAL COMPUTER CONTROL FOR SHARED LASER MACHINING", by J. W. Clements and W. D. Lanyi, Ser. No. 414,204;

(11) "GRID AND SLEEVES WELDING FIXTURE AND METHOD", by J. S. Kerrey and R. Duncan, Ser. No. 414,203;

(12) "CALIBRATION OF AUTOMATED LASER MACHINING APPARATUS" by J. W. Clements and J. R. Faulkner, Ser. No. 414,272; and

(13) "RIGID SUPPORT FOR LASER MACHINING APPARATUS", by D. L. Wolfe, Ser. No. 414,191.

BACKGROUND OF THE INVENTION

1. Field of the Invention

This invention, in its preferred form, relates to apparatus for effecting a plurality of precision welds utilizing a laser beam while effecting movement of the work piece to be welded through a sequence of controlled movements whereby the work piece is accurately positioned with respect to the laser beam, and each of the plurality of welds is carried out with a precisely controlled quantity of energy. More particularly, this invention relates to apparatus for welding the elements, i.e. grid spacers, of a nuclear fuel assembly made of a volatile metallic material such as the zirconium alloy known as Zircaloy.

2. Description of the Prior Art

The precision laser welding apparatus of this invention relates generally to the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assemble 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and, therefore, the orientation of the fuel rods 18 with respect to each other is rigorously controlled.

The precision laser welding apparatus of this invention is, in one illustrative embodiment thereof, related to the manufacture of fuel rod grids 16 as shown in FIGS. 2A to 2E. The fuel rod grid 16 is of an approximately square configuration, whose periphery is formed by four outer grid straps 22. Each end of an outer grid strap 22 is welded by a corner seam weld 30 to the end of a perpendicularly disposed outer grid strap. A plurality of inner grid straps 20 is disposed in rows and columns perpendicular to each other, whereby a plurality of cells are formed to receive the control rods and the nuclear fuel rods 18. The inner grid straps 20 disposed along the rows and columns have complementary slots therein at each of the points 24 of intersection for receiving a perpendicularly disposed inner grid strap 20. An intersect weld 32 is formed at each of the points 24 of intersection, whereby a rigid egg crate structure is formed. Further, each of the inner grids straps 20 includes at each end a pair of tabs 26 of a size and configuration to be tightly received in either a top or bottom row of slots 28 formed in the outer grid straps 22, as shown in FIG. 2A. A slot and tab weld 34 is effected along the top and bottom rows formed by the slots 28 within the outer grid straps 22. Further, a plurality of guide sleeves 36 is disposed on the sleeve side surface of the fuel rod grid 16 to receive and guide the control rods disposed therein. A series of notch seam welds 40 securely attaches the guide sleeves 36 to corresponding notches 38 formed within the inner grid straps 20. The precision laser welding apparatus of this invention is particularly adapted to perform a series of controlled welding operations whereby each of the welds 30, 32, 34 and 40 is carried out. The precision laser welding apparatus of this invention not only controls the various parameters of generating the laser in terms of the pulse width, the pulse height of each laser pulse, and the number of pulses to be applied to each weld, but also controls the sequential positioning of the fuel rod grids 16 with respect to the laser beam. It is understood that after each such weld, the fuel rod grid 16 is repositioned and/or the focal point of the laser beam changed to effect the particular type of weld desired.

Referring now to FIGS. 2B and 2C, the plurality of resilient fingers 44 is disposed longitudinally of the inner grid straps 20 in a parallel relationship to each other. A pair of spacing fingers 46 is disposed on either side of a corresponding resilient finger 44 and serves along with the resilient finger 44 to provide a resilient grip of the nuclear fuel rods 18 that are disposed within the cell formed by the intersecting inner grid straps 20. A resilient finger 44a is disposed to the right as seen in FIG. 2C in an opposing relationship to the spacing finger 46a, whereby a nuclear fuel rod 18 is resiliently held therebetween.

The manner of assembling the inner grid straps 20 to each other as well as to the outer grip straps 22 is shown in FIG. 2D. Each of the inner grid straps 20 includes a plurality of complementary slots 52. An upper grid strap 20a has a downwardly projecting slot 52a, whereas a lower grid strap 20b has a plurality of upwardly oriented slots 52b of a configuration and size to be received within a corresponding slot 52a of the inner grid strap 20a. At each end of the inner grid strap 20, there is disposed a pair of the tabs 26 to be disposed within corresponding slots 28 of an outer grid strap 22.

As will be explained in detail later, the inner grid straps 20 are welded to each other by the intersect welds 32 as formed of projection tabs 48 and tab portions 50a and 50b. More specifically, a projection tab 48 is disposed between a corresponding set of tab portions 50a and 50b when the inner grid straps 20a and 20b are assembled together. Upon the application of a laser beam to the tab 48 and tab portions 50a and 50b, an intersect weld 32 is formed that is rigidly strong and free of contamination in accordance with the teachings of this invention. Further, each end of an outer grid strap 22 has a corner tab 54. As shown in FIG. 2D, the outer grid straps 22c and 22b have respectively corner tabs 54b and 54c that overlap each other and are seam welded together to form the corner seam weld 30.

The vanes 42 project, as seen in FIGS. 2C and 2E, from a vane side of the fuel rod grid 16 to enhance the turbulence of the water passing over the nuclear fuel rods 18. Further, as illustrated particularly in FIG. 2C, the guide sleeves 36 are aligned with cells formed by the inner grid straps 20 that are free of either a resilient finger 44 or spacing finger 46, to thereby permit the free movement of the control rod through the cell and through the guide sleeve 36.

U.S. Pat. No. 3,966,550 of Foulds et al., and U.S. Pat. No. 3,791,466 of Patterson et al., assigned to the assignee of this invention, disclose similarly configured fuel rod grids of the prior art. Each of these patents discloses a fuel rod grid wherein the inner and outer grid straps are made of a suitable metallic alloy such as Inconel, and the above identified interconnections are effected by furnace brazing. However, the zirconium alloy Zircaloy is known to have the desirable characteristic of a low neutron absorption cross section which allows for more efficient use of the nuclear fuel in the utility operation and therefore allows for a longer elapsed time between refueling by the replacement of the nuclear fuel bundle assemblies. In particular, fuel rod grids made of Zircaloy have a lower absorption rate of the neutrons generated by the fuel rods than that absorption rate of straps made with Inconel. The making of the grid straps of Zircaloy requires at least several changes in the assembly of the fuel rod grids. First, it is necessary to make the slots, whereby the inner grid straps may intersect with each other, of looser tolerances in that grid straps made of Zircaloy do not permit a force fitting thereof, i.e. to be hammered into position, but rather require controlled fit-up to allow "push-fits" of the intersecting grid straps. In addition, Zircaloy grid straps may not be brazed in that heating Zircaloy to a temperature sufficient to melt the brazing alloy would anneal the Zircaloy, resulting in a loss of mechanical strength.

Prior to the selection of a particular method of welding, several different methods of welding volatile materials such as Zircaloy were investigated including continuous welding with a $CO_2$ laser, pulsed emission of a Nd:YAG laser, gas tungsten arc welding and electron beam welding. A pulsed electron beam is capable of power densities of up to $10^9$ watts/square centimeter with pulse widths in the micro-second and low millisecond range. However, welding with an electron beam is typically carried out in a vacuum environment which is relatively expensive to build and requires a relatively long time to establish the desired degree of vacuum therein, thus slowing down the manufacture of the fuel rod grids. Further, it is necessary to obtain relative movement of the work piece, e.g. the fuel rod grids, in three dimensions with respect to the electron beam which would require a very complex grid positioning system. The use of a continuous electron beam provides relatively low levels of power (in the order of 200 watts) requiring relatively long welding times and providing very shallow weld penetrations. The use of a gas tungsten arc was also considered and proved to be unacceptable for providing a sequence of welds in that after a given number, of welds, e.g. 25, the arc electrodes require sharpening to provide the desired fine arc to produce numerous well defined welds and to avoid damaging adjacent grid straps or vanes of the fuel rod grids. Two types of lasers are commonly used for welding applications: (1) the solid state Nd:YAG laser, which uses a crystal rod of neodynium doped yttrium-aluminum-garnet and (2) the $CO_2$ laser, which uses a mixture of $CO^2$—$N_2$—He as the lasing medium. An inherent advantage of the Nd:YAG laser is that its emission is in the order of 1.06 micron wave lengths, where glass is transparent to its laser emission. This characteristic permits the use of a coaxial microscope which uses the same optic elements for both optical viewing and laser focusing. Further, a pulsed Nd:YAG laser is capable of 400 watts of average power, of a pulse frequency of up to 200 pulses per second and of a peak power in excess of 8000 watts for up to 7 milli-seconds. Such high peak power permits the Nd:YAG laser to produce welds of relatively deep penetration, thus insuring the structural security of welded straps of the nuclear fuel rod grids. Such lasers may be operated from a "cold start" with its shutter remaining open, whereby the weld time is determined by the length of time the power is applied to its flash lamps. Such a method of welding is not particularly applicable to a series of relatively rapid welds due to the laser rod warm-up time for each weld in the order of 0.8 seconds. Further, optical path length changes occur until a condition of thermal equilibrium is attained within the laser rod. A second method of operation of the Nd:YAG laser permits the continuous pulse operation of the laser while using its shutter to "pick off" a fixed number of pulses, thus eliminating the effects of laser warm-up and ensuring a uniformity of welds even though a great number of such welds are being effected.

The machining and, in particular, the laser drilling and welding of Zircaloy is described in articles entitled "Pressurization of Nuclear Fuel Rods Using Laser Welding", by Peter P. King and "External Attachment of Titanium Sheathed Thermocouples to Zirconium Nuclear Fuel Rods for the Loss-of-Fluid Test (LOFT) Reactor", both appearing in the proceedings of the Society of Photo-Optical Instrument Engineering, Volume 247, ADVANCES IN LASER ENGINEERING AND APPLICATIONS, (1980). Both of these articles particularly relate to the manufacture of nuclear fuel rods such as those rods 18 shown in FIG. 1. In the article entitled "Pressurization of Nuclear Fuel Rods Using Laser Welding", by Peter P. King, various possible welding techniques other than laser welding are described. In particular, resistance butt welding was attempted but found difficult to control and reproduce when welding thin walled cladding. In turn, high pressure gas tungsten arc welding experienced arc initiation and control difficulties at relatively high pressure. In particular, the nuclear fuel rods are described as being loaded with fuel pellets and sealed by gas tungsten arc welding in high purity helium; thereafter, the fuel rods are introduced into a laser pressurization chamber through a gland seal. The upper end cap of each fuel rod is drilled by a sharply focused laser beam, while the chamber is pressurized with high purity helium. After the laser drilling operation, the helium rushes through the drilled opening and into the rod; thereafter, the drilled hole is sealed by defocusing the laser beam. In addition to providing the desired pressurized gas within the rods, the use of helium within the welding chamber provides a suitable inert gas that will not rapidly oxidize (burn) or contaminate the Zircaloy. Further, a totally automatic fuel rod laser pressurization system is described wherein a tape control system of mini-computer is used to advance the fuel rod into the laser pressurization chamber to its laser welding postion at the focal point of the laser beam, to lock the gland seal, to control the chamber evacuation and introduction of the inert gas helium, and to control the pulse laser operation to effect first the desired hole drilling and thereafter, the hole sealing.

A similar teaching of the laser drilling and sealing of a nuclear fuel rod is described in U.S. Pat. No. 3,774,010 of Heer et al. This patent discloses that the nuclear fuel rod is brought to a single position where it is first drilled and then the drilled hole is sealed. Thus, it is evident that it is necessary to reposition such a work piece or to control a series of lasing operations as would be required to effect the intersect welds 32, the corner seam welds 30, the slot and tab welds 34, and the seam welds 40 of the fuel rod grid 16 as shown in FIG. 2A. Consideration of the number and type of welds required to manufacture the fuel rod grids 16 indicates that it is necessary to move the grid 16 along X and Y axes in a series of steps to effect the intersect welds, whereas it would be necessary to rotate the work piece in the form of the grid 16 from the plane formed by the X and Y axes in order that the notch seam welds 40 and the slot and tab welds 34 may be carried out.

The prior art has recognized the problem of fretting corrosion, wherein the surfaces of the fuel rod grids 16 and the fuel rods 18 rub against each other increasing the likelihood of weld contamination and eventual mechanical failure of the fuel rod grids 16. Fuel bundle assemblies 10 including the fuel rods 18 and grids 16 are designed to be disposed within the hostile atmosphere of a boiling water reactor (BWR) or pressurized water reactor (PWR), wherein the coolant, typically in the form of water, is super heated to temperatures in the order of 600° F., i.e. the boiling point of the water coolant is raised by applying extremely high pressures thereto. Under such conditions, any contamination, and in particular, fretting corrosion is enhanced. A publication entitled "Special Features of External Corrosion of Fuel Cladding in Boiling Water Reactors", by Liv Lunde, appearing in NUCLEAR ENGINEERING AND DESIGN, (1975), describes the various mechanisms responsible for fretting corrosion. First, metallic particles are produced by grinding or by formation of welds at the points of contact between the grid 16 and its fuel rod 18. These metal particles subsequently oxidizes to form an abrasive powder to increase the abrasive action. Finally, the metal beneath the protective oxide layer oxidizes due to the continuous removal of the metallic oxide by the scraping of the surface over each other. In particular, zirconium alloys are particularly prone to the direct oxidation of the metal by the scraping action.

It is readily contemplated that the continued contamination of the joints between the inner and outer grid straps 20 and 22 and the guide sleeves 36 of a fuel rod grid 16 will eventually lead to the joint's failure. As a result, the fuel rods 18 are subject to intense vibrations due to the high flow of the water, leading to the subsequent fuel rod rupture and to the release of the uranium oxide into the coolant water. Most of this uranium is absorbed by the ion exchangers, but small amounts may also be deposited on core components. The release of the uranium oxide into the water coolant further enhances the corrosion rate not only of the fuel grid 16 but also of the fuel rods 18. The article by Lunde particularly notes that the welding of grid and rod materials such as zirconium alloys in a contaminated welding atmosphere leads to contaminated welds and thus the problems enumerated above. In particular, there is discussed the problem of tungsten welding of Zircaloy and of the adverse effect of oxygen and water in the welding atmosphere. High amounts of oxygen will increase the hardness of the weld.

A further article, entitled "External Corrosion of Cladding in PWRs", by Stehle et al., and appearing in NUCLEAR ENGINEERING AND DESIGN, (1975), particularly describes the effect of corrosion of Zircaloy noting that at temperatures in excess of 500° C. that the presence of oxygen reduces the ductility of this metal. The Stehle et al. article particularly discloses that the main problem of tungsten arc welding is the contamination by impurities in the shielding gas, including fuel particles or tungsten electrode material. In particular, such contamination appears in the form of uranium oxide that appears as a heavy white oxide layer on the fuel rods 18. In particular, the Stehle et al. article suggests that the concentrations of water and oxygen be maintained at below about 20 and 10 ppm, respectively. Though the Lunde and Stehle et al. articles do not deal with the problems of welding large Zircaloy elements and, in particular, fuel rod grids 16 made of Zircaloy, experience has shown that welds produced in a relatively impure atmosphere will produce a weld with an initially low degree of contamination that, when subjected to the harsh atmosphere of a nuclear reactor, will be particularly subject to fretting contamination. Thus, it is particularly critical that any welding of Zircaloy and, in particular, laser welding be conducted in a controlled, pure atmosphere to ensure that weld contamination is minimized and will not deteriorate under the hostile conditions of a nuclear reactor.

U.S. Pat. No. 3,555,239 of Kerth is an early example of a large body of prior art disclosing automated laser welding apparatus in which the position of the work piece, as well as the welding process, is controlled by a digital computer. Kerth shows the control of laser beams while controlling the work piece as it is moved from side to side along an X axis, horizontally forward and backward along a Y axis and vertically up and down along a Z-axis. Typically, pulse driven motors are energized by the digital computer to move the work piece rectilinearly along a selected axis. In addition, the welding is carried out within a controlled atmosphere and, in particular, the pressure and flow of gas into the welding chamber is controlled by the digital computer. Further, a counter is used to count pulses, whereby the number of laser pulses applied to the work piece may likewise be controlled.

U.S. Pat. No. 4,088,890 of Waters discloses a programmable controller for controlling laser emission and, in particular, the control of a high beam shutter whereby the desired quantity of laser emission is directed onto the work piece. This patent also discloses the rectilinear movement of a carriage carrying the work piece along a vertical axis, whereby the work piece is successfully brought to a position, where a laser weld is made. In particular, there is disclosed the effecting of a seam weld, whereby the work piece is rotated while the laser beam is directed at a seam between two pieces to be welded together.

U.S. Pat. No. 3,422,246 of Wetzel discloses a laser cutting machine tool including a servo system for controlling servo drive motors to drive a work piece along X and Y drive axes respectively. A transducer is associated with each of the servo motors to provide feedback signals indicative of the movement of the work piece along its respective axis to thereby ensure accurate work piece position.

Laser machining systems have been adapted for precision work including the cutting of semiconductor assemblies. When lasers are applied to such high precision machining operations, it is important that the relative position between the laser and the work piece, and more particularly between the laser and the work piece holding assembly, be accurately and precisely maintained. Unlike a mechanical tool, which is brought into actual contact with the work piece, a laser is removed from its work piece by a relatively great distance. In such laser machining systems, the work holding means is disposed at a relatively great distance from the laser. In such machines, any relative movement between the work holding means and the laser is amplified by the support structure, causing relatively large movement of the laser beam with respect to the work piece and thus reducing the accuracy with which the laser beam is focused onto the work piece. Relative vibrations between the laser and the work holding means is serious in proportion to the desired small cross section of the laser beam at the work piece. With accuracies measured in thousandths of an inch or less, it is seen that if there is relative vibration, the focused beam will likewise be vibrated, such vibration being amplified by the structural support system by which the laser and the work piece position means are coupled together. For these reasons, vibration has resulted in problems in obtaining the desired accuracy in laser machining, especially where laser beams are focused to very fine points. Such accurate focusing of the laser beam is advantageously done over a relatively long focal length but increases the difficulty of achieving accurate machining due to vibration and shocks. U.S. Pat. No. 3,803,379 of McKay suggests the use of a rigid construction of a laser optical system mounting bed and a work piece holding frame. In particular, the bed is constructed as a hollow box and interconnected by locator pins forced fit through holes in one member and being threaded in the other member. In addition, the laser mounting bed and the work piece holding frame are mounted on vibration isolating pads to support the entire weight of the bed on a rigid floor.

The noted U.S. Pat. No. 3,803,379 also discusses the problem of maintaining the intensity of a laser beam at precise levels. In particular, this patent notes that when a work piece is changed, it is typically necessary to shut down the laser while a new work piece is being installed and thereafter, to start up the laser bringing it back to a desired level of intensity before resuming machining with its laser beam. In particular, the change of the laser beam intensity will effect corresponding changes in the machining effect on the work piece. To overcome this problem, U.S. Pat. No. 3,803,379 suggests that a diverter mechanism be incorporated along the path of the laser beam, whereby the laser beam may be diverted into a heat sink. Thus, while the work piece is being replaced, the diverter mechanism diverts the laser beam into the heat sink, thus allowing the laser to keep firing at a uniform rate without being shut down so that its temperature, once established under equilibrium conditions, will not be altered between machining operations. Further, experience has shown that with heavy laser usage, the intensity of the laser beam will attenuate with time due to aging of the laser itself as well as of the excitation lamps associated therewith. In addition, the laser beam upon striking a work piece typically throws off gaseous material and debris that may coat the work piece or the laser focusing lens, whereby the machining efficiency is attenuated. Thus it is necessary to periodically calibrate the laser system, whereby the energy level of the laser beam as imparted to the work piece may be accurately controlled.

In the initial development of laser machining systems, lasers were employed for individual, low production machining operations. With the development of the art, laser systems were increasingly employed for high production work processing operations as would be controlled automatically by computers. As described above, such high production systems operate efficiently to reposition the work piece, whereby a sequence of welds or other machining operations may be rapidly performed. Under such demands of continuing excitation, laser life becomes a factor in terms of efficient operation and of cost of production. It is contemplated that under high usage where repeated welds are required, as for the production of the above described fuel rod grids, that laser life would be a significant factor to consider. Under heavy usage, the life expectancy of the lamps exciting the pulsed laser would be in the order of several days, and after this life had been expended, it would be necessary to replace at least the lamps, as well as to calibrate the new laser system.

In order to improve laser efficiency and life, the prior art as illustrated by U.S. Pat. Nos. 4,223,201 and 4,223,202 of Peters et al. and U.S. Pat. No. 4,083,629 of Kocher et al., discloses the time sharing of a laser beam emitted from a single laser and alternatively directed along first and second optical paths onto a single work piece. U.S. Pat. No. 4,083,629 describes problems with automated welding systems wherein the work piece requires a plurality of welds to be made; in particular, the work piece may be brought to a first station, whereat a first welder is operated, and then transferred to a second station, whereat a second welder effects a welding operation. Alternatively, two welders could be used at a single station to effect the plurality of welds, thus minimizing the need to transport the work piece from the first to the second stations. However, these methods require that either the work piece be transported or reoriented, thus decreasing the production rate, or that two welders be used thus substantially increasing the capital investment of such apparatus. As an attempt to overcome these problems, U.S. Pat. No. 4,083,629 suggests the use of a bimodal switching means, whereby the laser welder sequentially welds at two distinct weld sites. In particular, there is suggested a motor for rotating a reflected mirror, whereby the beam is alternately directed along a first and then a second focal path to the work piece to effect first and second welds on a single work piece such as an electrical component. It is apparent that there is an automated control of the laser welder to synchronize the firing of the laser with the switching of the laser beams, the wire cutting, and other handling operations. U.S. Pat. No. 4,223,201 describes a somewhat similar laser system adapted for larger work pieces such as would be encountered in ship construction. In particular, U.S. Pat. No. 4,223,201 suggests the use of a rotating mirror to sequentially direct the laser beam along first and second paths, whereby a single laser beam may be time shared. In addition, a suitable automatic controller is employed to control corresponding first and second welding heads that are moved in time relationship with the beam sharing, so as to effect sequentially a series of welds at two different locations on a single work piece. U.S. Pat. No. 4,223,202 suggests the seam welding of two pieces together with the welding taking place on opposite sides of the work pieces at substantially the same point to effect a two sided laser seam weld, while the automated controller effects movement of the welding heads with respect to the work piece.

U.S. Pat. No. 4,078,167 of Banas et al. recognizes the problem of atmospheric contamination of the weld site during laser welding. Laser welding in a vacuum has been attempted, but this patent notes that vacuum welding limits the size and shape of the work piece that can be accommodated as well as increases welding time required to create the vacuum condition. Alternatively, the work piece may be totally immersed in an inert gas, or a trailer shield may provide a flow of known inert gas such as argon over the area of the work piece to be welded. In particular, U.S. Pat. No. 4,078,167 discloses a shield housing for establishing an inert atmosphere about the weld location of the work piece as the work piece is transported beneath the shield housing. An inert gas, typically argon, is passed through a gas passing means having a plurality of openings therethrough for providing a uniform blanket of inert gas which flows over the work piece and through a passage between the shield housing and the work piece into the atmosphere. The flow of inert gas prevents to a degree atmospheric gases including oxygen and water from flowing into the welding zone. It is stated that the flow rate of an inert gas is controlled to shield the weld from reactive gases, but causes turbulence of the melted material which would produce porous and uneven welds.

U.S. Pat. No. 4,078,167 does not mention the particular metal to be welded and does not contemplate the laser welding of Zircaloy as for the above-described fuel rod grid. Zircaloy is known to be highly reactive to oxygen, nitrogen, and water as found in the atmosphere, and welding tests leading to this invention have demonstrated conclusively that inert gas flow around the immediate weld area does not provide adequate shielding for the laser welding of Zircaloy. In accordance with the teachings of this invention, an atmosphere of an inert gas such as argon has been established with a purity in the order of 10 PPM, which degree of purity is not contemplated by U.S. Pat. No. 4,078,167.

The above discussion of the prior art illustrates the significant problems in achieving automated laser welding of a highly reactive material such as Zircaloy, wherein the work piece is sequentially moved under an automated controller to effect a number of precision welds. As enumerated above, it is necessary to move the work piece, e.g., the laser weld grid 16 as described above, along each of its X, Y, and Z axes with respect to the focused laser beam while maintaining an exceptionally high degree of purity of the surrounding atmosphere to avoid contamination of the welded material. In addition, it is desired to achieve a high degree of laser efficiency, even while the work piece is being moved through a sequence of positions in three dimensions with respect to the laser beam. In addition, there are problems of effecting precise welds in parts of small dimensions and, in particular, of maintaining the power level of the impinging laser beam at precise levels for different types of welds, noting the attenuation of laser output as a laser system including the laser rod and excitation lamps is used at high work duty ratios over an extended period of time and the effect of laser welding debris.

SUMMARY OF THE INVENTION

It is therefore an object of this invention to provide a new and improved programmable control of laser machining operations of a work piece.

It is a more particular object of this invention to provide a new and improved computer apparatus for controlling the laser machining and, in particular, the laser welding of plural welding sites of a work piece, wherein a sequence of relative movements between a laser beam and the work piece is effected under computer control.

It is a more particular object of this invention to provide a new and improved laser machining apparatus wherein the work piece to be laser machined is maintained in an atmosphere of a gas non-reactive to the material of which the work piece is made.

It is a still further object of this invention to provide a new and improved laser machining apparatus, wherein parameters may be selected so as to control the movement of the work piece to be machined, as well as to control the rate at which a non-reactive gas is introduced about the work piece.

It is a still further object of this invention to provide a new and improved programmable, computer controlled apparatus for controlling the energy level of the laser beam as directed onto the work piece.

It is a more particular object of this invention to provide a new and improved programmable computer controlled apparatus for controlling the energy level and particularly the number of laser pulses directed onto the work piece.

It is a still further object of this invention to provide a new and improved computer controlled apparatus for laser machining, wherein the laser beam may be measured to calibrate the power level of the laser beam incident upon the work piece to a level corresponding to the programmed parameter.

In accordance with these and other objects of this invention, there is provided a computer controlled apparatus for performing a series of laser machining operations on a work piece in an environment comprised of a non-reactive gas with respect to the material of which the work piece is made. The computer controlled apparatus includes a machining chamber for receiving the work piece and means in the form of a pump for directing the non-reactive gas into the machining chamber at a controlled, selected rate. A laser beam is generated by a laser and is focused into a beam along a path to the work piece. An assembly is provided for selectively moving the machining chamber and its work piece therein through a sequence of steps, whereby the relative position between the work piece and the laser beam is changed such that a series of lasing operations and, in particular, welds may be effected on a sequence of selected sites of the work piece. A computer is programmed to control the rate at which the non-reactive gas is introduced into the machining chamber, as well as to the machining sites of the work piece, whereby the selectively moving assembly may be controlled to dispose the work piece to effect the series of welding operations.

In a still further aspect of this invention, the computer is programmed to control a beam directing or splitting assembly to first direct the laser beam along a first path to a first work piece and then along a second path to a second piece. It is contemplated that two computers are configured to effect the laser machining of each of its work piece and are interconnected to coordinate the control of the beam directing means such that only one of the two computers has control of the laser beam at any one instant of time.

In a still further aspect of this invention, the machining chamber is mounted upon a rigid bed that provides a first substantially planar reference surface and there is provided a housing about the chamber for providing a second substantially planar sealing surface and an assembly for adjusting the position of the machining chamber such that a substantially uniform gap is provided between an upper peripheral surface thereof and the sealing chamber to permit the movement of the machining chamber without restraint, while maintaining the integrity of the machining environment within the machining chamber.

In a still further feature of this invention, the machining chamber is mounted upon a slide table to permit the movement of the machining chamber and its work piece from a first position, wherein the laser beam is directed onto the work piece, to a second position remote of the laser beam wherein the work piece may be readily inserted into and removed from the machining chamber. The slide table may be moved to a third position, wherein the measuring device mounted thereon is disposed to receive the laser beam to provide a signal indicative of its power level, whereby the degree of excitation of the laser may be adjusted or calibrated in accordance with a parameter programmed into the computer.

BRIEF DESCRIPTION OF THE DRAWINGS

A detailed description of a preferred embodiment of this invention is hereinafter made with specific reference being made to the drawings in which:

FIGS. 2A-2E are respectively a perspective view, a plan view, a sectioned side view, a perspective exploded view, and a plan view of a fuel rod grid made in accordance with the teachings of this invention and incorporated into the assembly of FIG. 1;

FIG. 4 is a perspective view of the precision laser welding apparatus in accordance with the teachings of this invention;

FIG. 5 is an exploded perspective view of the structural support system for the laser welding apparatus as shown in FIG. 4 and including a main frame and a kinematic support for rigidly supporting a laser system with respect to a pair of work pieces, e.g. nuclear fuel rod grids, as positioned by left and right positioning modules;

FIG. 6 is a perspective, schematic representation of the laser system as incorporated into the precision laser welding apparatus as shown in FIGS. 4 and 5 for directing on a time shared basis a laser beam emitted from a single laser source to each of two work pieces, e.g. nuclear fuel rod grids;

FIG. 7 is a side elevational view of the laser welding system as shown in FIG. 4;

FIG. 8 is a partial front elevational view of the laser welding system as shown in FIG. 4;

FIG. 10 is a side sectioned view taken along line X—X of FIG. 8;

FIG. 11 is a side sectioned view taken along line XI—XI of FIG. 8;

FIG. 12 is a partial front elevational view taken from the perspective of line XII—XII of FIG. 11;

FIG. 13 is a partial sectioned view of the mechanism for permitting the movement of the slide table as taken along line XIII—XIII of FIG. 11;

FIG. 14 is a perspective exploded view of a welding chamber as shown in FIG. 4 and its mechanism for selectively positioning its rotatable fixture;

FIG. 15 is a front sectioned view taken along lines XV—XV of FIG. 9, particularly illustrating a welding chamber, its mechanism for rotating selectively its rotatable fixture, and a B-axis rotation drive coupled with the aforementioned mechanism;

FIG. 16 is a side partially sectioned view taken along line XVI—XVI of FIG. 15, particularly illustrating the positioning mechanism of the rotatable fixture and the relationship of the laser focusing lens assembly to the welding chamber;

FIG. 17 is a sectioned view taken along lines XVII—XVII of FIG. 7, particularly illustrating the laser focusing lens assembly;

FIG. 18 is a plan partially broken away view of the rotatable fixture as disposed within the welding chamber of FIG. 14;

FIG. 19 is a sectioned view of the rotatable fixture as taken along line XIX—XIX of FIG. 18;

FIG. 20 is a side, sectioned view of the rotatable fixture as taken along line XX—XX of FIG. 19;

FIG. 21 is a schematic diagram of an argon supply system, whereby a suitable inert gas, e.g. argon, is supplied from a tank thereof to each of the welding chambers and laser focusing lens assemblies;

FIGS. 22A and 22B form a schematic diagram of the computer implemented control system for the laser welding system showing the relationship of the interface circuits with respect to the central processor unit (CPU) and memory and to each of the chamber positioning mechanisms, a second like computer control system, the laser system, the argon supply system, the vacuum exhaust system, the B axis rotation drive, the oxygen analyzer, the moisture analyzer, and the thermopile;

FIGS. 23A and 23B are respectively front views of the laser welder display panel and the machine function panel, respectively associated with the laser power supply as shown in FIG. 4 and the central processor unit as shown in FIGS. 22A and 22B;

DESCRIPTION OF THE PREFERRED EMBODIMENT

Figure 1:
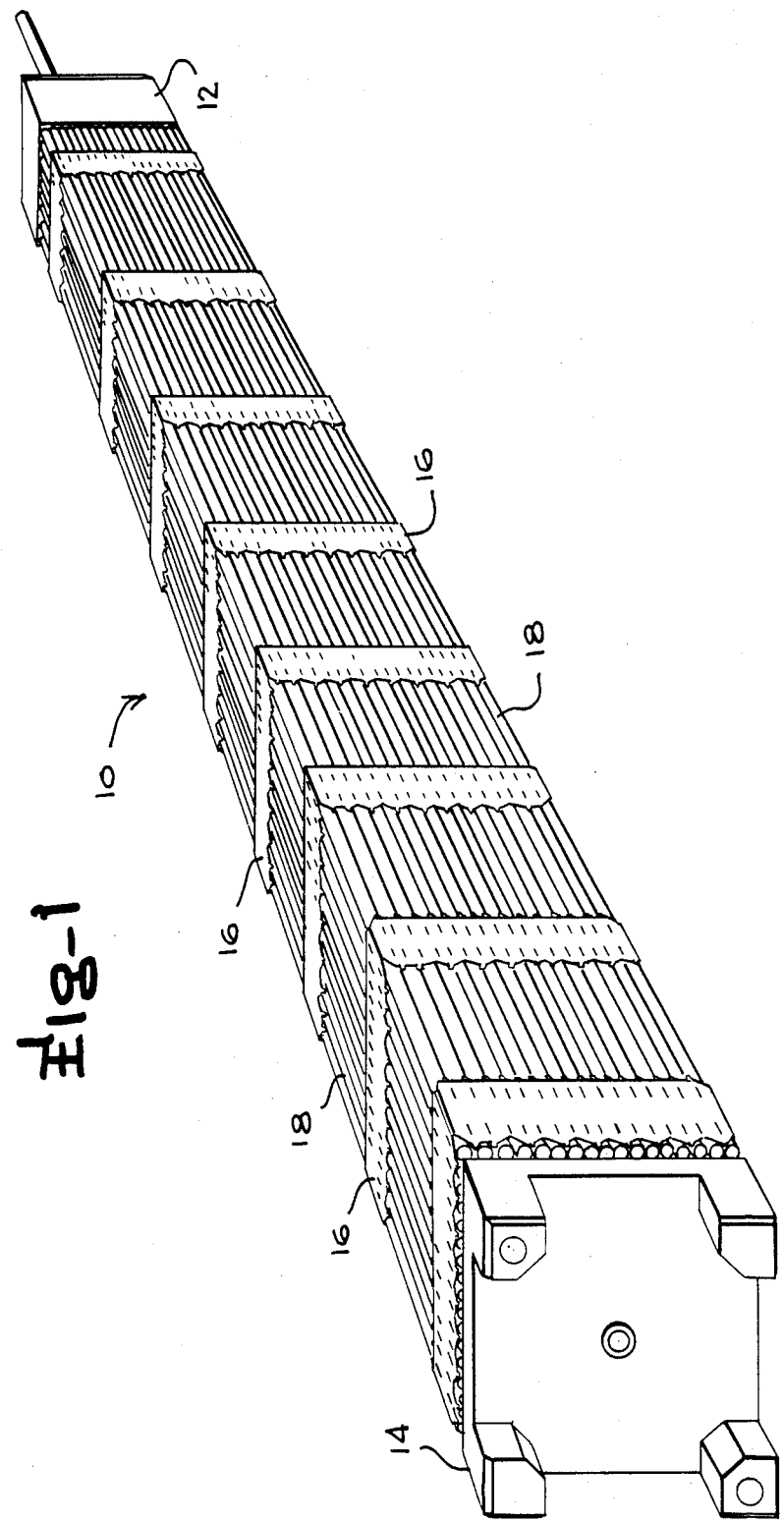
FIG. 1 is a perspective view of a nuclear fuel bundle assembly incorporating a plurality of grids made in accordance with the teachings of this invention.
Figure 2D:
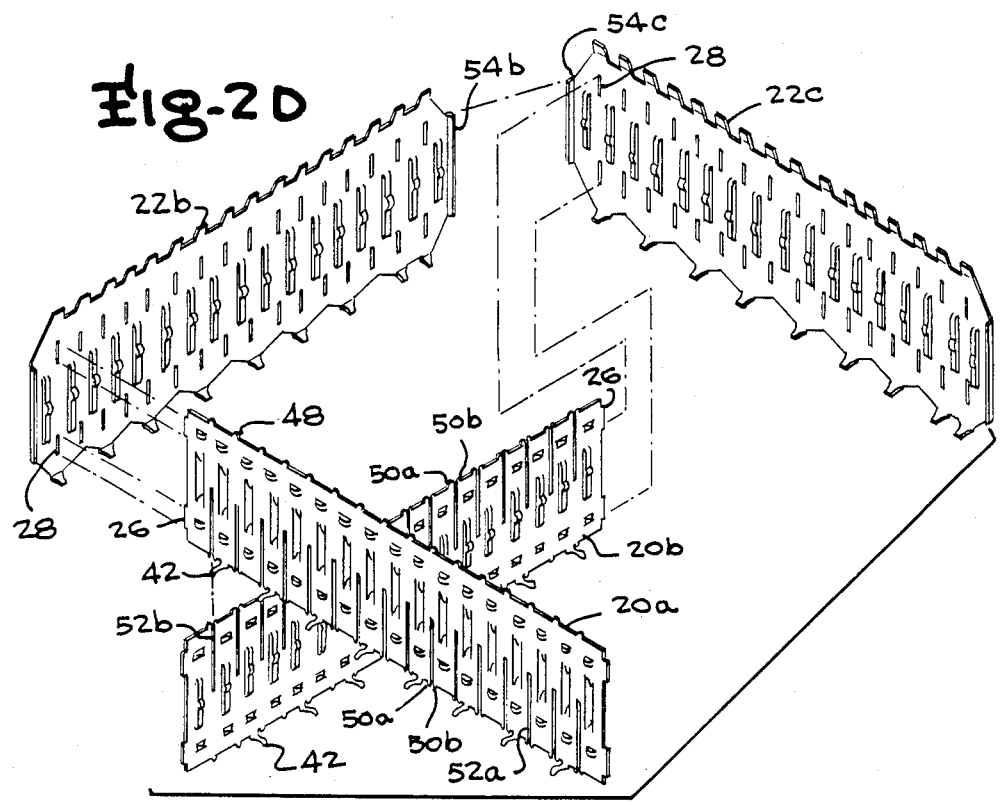
Figure 2E:
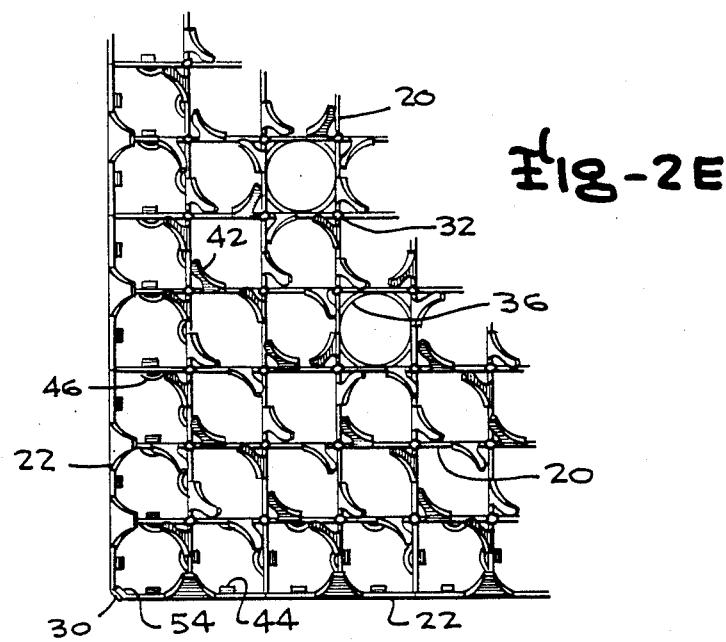
Figure 3A:
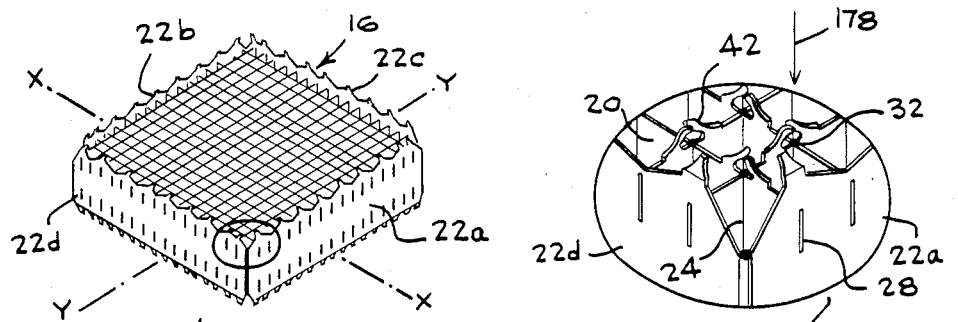
FIGS. 3A-3L show in a series of perspective views the sequence of steps for welding the nuclear rod grid as shown in FIG. 2.

The fuel rod grids 16 are comprised as described above of the inner and outer grid straps 20 and 22 that are assembled and welded together as shown in FIGS. 2A to 2E. Each of the grid straps 20 and 22 is punched from a continuous roll of slit material and accumulates some surface oil in the punching operation. The oil film is cleaned and thereafter, the strap is annealed and then assembled into a work fixture as described in copending application entitled "GRID ASSEMBLY FIXTURE, RETENTION STRAP AND METHOD" (Ser. No. 414,198). Thereafter, the grid 16 and fixture are welded by the laser welding system 100 of this invention which carries out each of the intersect welds 32, the corner seam welds 30, the slot and tab welds 34, and the notch seam welds 40 in a pure atmosphere of an inert gas. Referring now to FIGS. 3A to 3L, the sequence of the welding steps in the inert gas is described in accordance with the teachings of this invention. The laser welding system 100 will be described in detail later; it is believed that an understanding of the manner in which the work piece, i.e. the fuel rod grid 16, is manipulated in each of three dimensions will facilitate an understanding of the operation of the laser welding system 100. As is apparent from these drawings, the fuel rod grid 16 is incrementally moved along its X and Y axes within a plane and is selectively rotated about its Y axis. Significantly, the aforementioned motion is carried out within a chamber wherein the atmosphere of the inert gas is maintained to a high degree of purity. The first step is illustrated in FIG. 3A, wherein the fuel rod grid 16 is disposed within the controlled atmosphere as formed by the welding chamber with its vanes 42 extending upwardly. A welding fixture is described in the copending application entitled "WELDING PLATES FOR A FUEL ROD GRID" (Ser. No. 414,265) whereby the inner and outer grid straps 20 and 22 are fixedly disposed with respect to each other during the welding operations. A vane suppressor fixture is a tool that is used for deflecting the vanes 42, whereby the vanes are fitted within the welding fixture; the vane suppressor fixture is described in the copending application entitled "STRAP AND VANE POSITIONING FIXTURE FOR FUEL ROD GRID AND METHOD" (Ser. No. 414,197). The atmosphere is purified by directing argon gas into the welding chamber until the desired degree of purity is reached, i.e. 10 ppm of water and 7 ppm oxygen. When the pure atmosphere has been established, the fuel rod grid 16 is moved in a series of incremental movements along the X and Y axes, whereby each of the points 24 of intersection between inner grid straps 20 is aligned with a laser beam 178 and thereafter, a controlled amount of energy is imparted thereto to effect the intersect weld 32. As will be explained in detail later, the laser beam 178 is provided by a pulsed Nd:YAG laser that is excited by pulsed excitation lamps energized by a calibrated reservoir voltage to deliver a specified level of energy to the grid 16. In particular, the number of pulses directed onto the point 24 of intersection of the inner grid straps 20 is controlled as shown in FIG. 3M, wherein six pulses of the laser beam are directed onto the work piece to form the intersect weld 32, each pulse having a pulse width of 6.2 ms, a rate of 20 pulses per second (pps), an average power of 350 watts, and a peak power of 2,580 watts. The intersect welds 32 are formed by turning on the laser beam 178 when the fuel rod grid 16 has been disposed in an aligned position with respect to the laser beam 178.

Figure 3B:
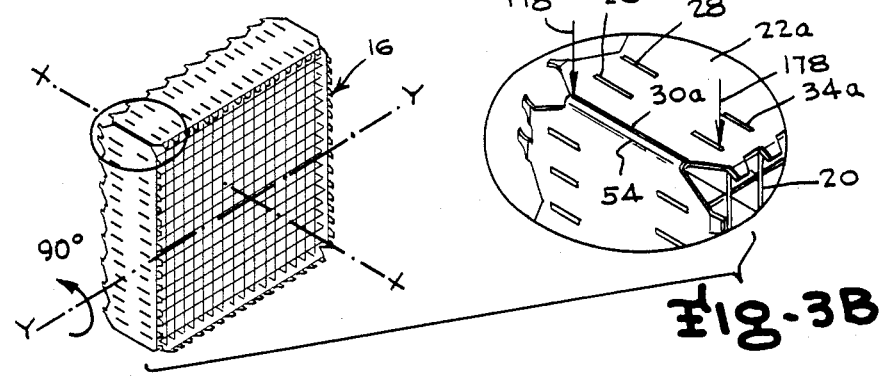

The next step is shown in FIG. 3B, wherein the fuel rod grid 16 is rotated about its Y axis 90° by a mechanism to be explained, whereby a first set of the slot and tab welds 34 and a first corner seam weld 30 are performed. These welds are seam welds which are carried out by moving the fuel rod grid 16 along its X axis while directing the laser beam 178 onto the work piece. In an illustrative embodiment of this invention, the slot and tab welds 34 are effected with a laser beam 178 of a pulse width of 2.2 ms, a pluse frequency of 50 pps, and an average of 350 watts, with the fuel rod grid 16 being moved at a rate of 30 inches per minute (IPM). FIG. 3B shows the relative position of the laser beam 178 to effect each of the slot and tab welds 34a and the corner seam weld 30a.

Figure 3C:
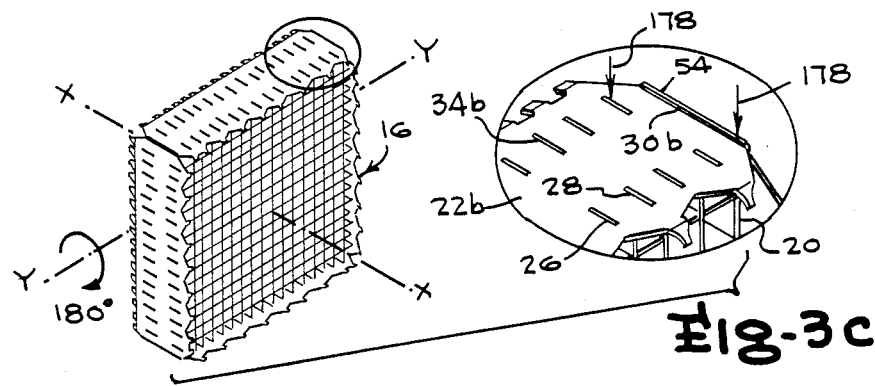
Figure 3D:
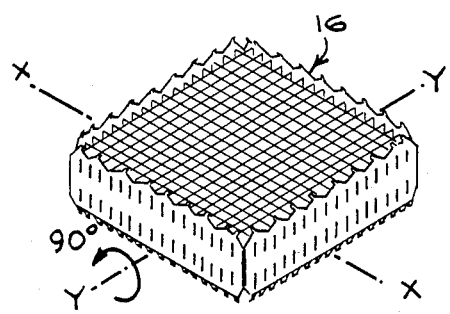

Next, as shown in FIG. 3C, the fuel rod grid 16 is rotated in a clockwise direction so that the opposing outer grid strap 22b is aligned with respect to the laser beam 178, whereby a second set of slot and tab welds 34b and a second corner seam weld 30b may be carried out. Thereafter, as shown in FIG. 3D, the fuel rod grid 16 is rotated 90° counter-clockwise to its original position as shown in FIG. 3A, and the fuel rod grid 16 and its weld fixture are removed from the welding chamber.

Figure 3E:
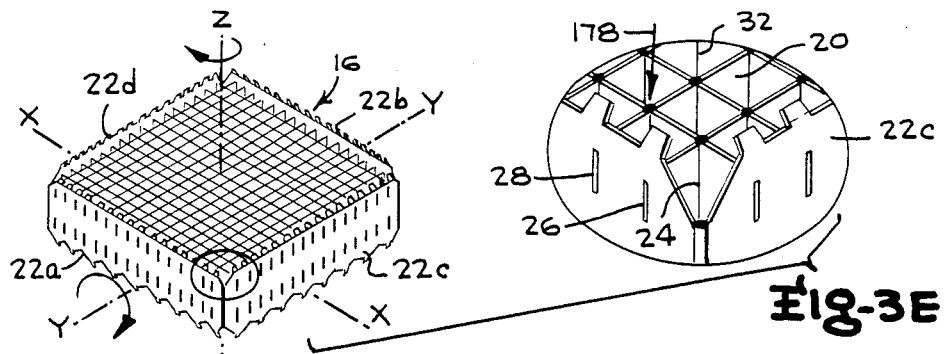
Figure 3F:
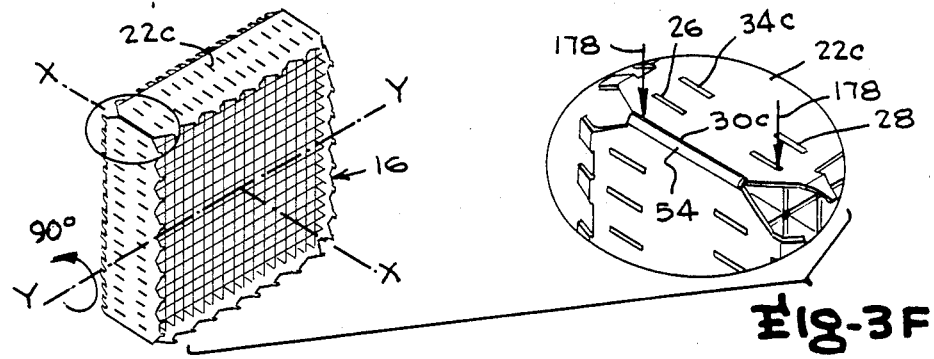
Figure 3G:
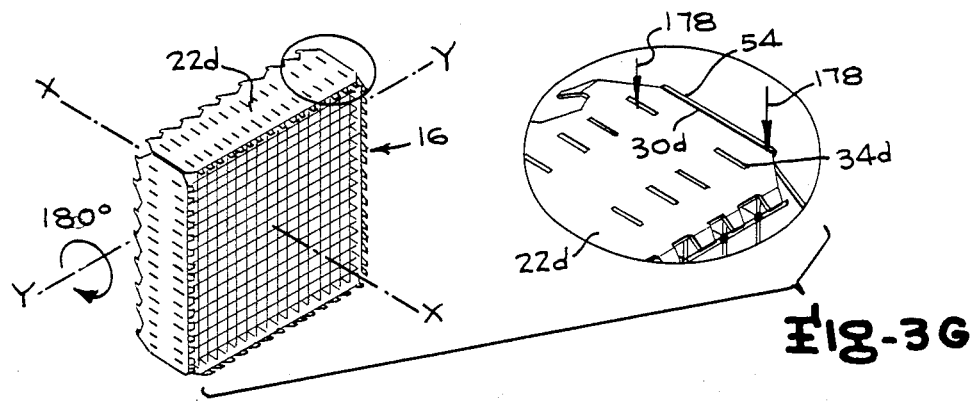
Figure 3H:
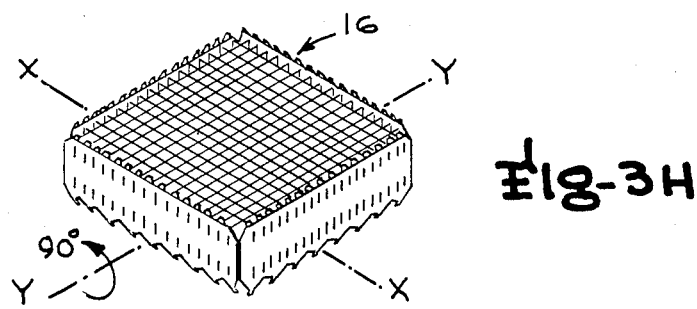
Figure 3I:
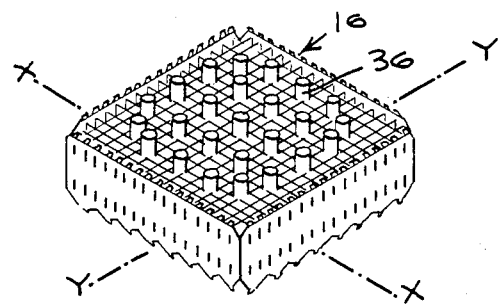

As shown in FIGS. 3E to 3H, a similar set of welding steps are carried out. After removal from the chamber, the fuel rod grid 16 and its weld fixture are turned over to dispose its vane side down and are rotated about its Z-axes 90° in clockwise direction so that the unwelded outer grid strap 22c faces the door of the welding chamber. The grid 16 and its weld fixture is locked into a secure position with respect to the welding chamber and the laser beam. Initially, the air within the welding chamber is purged with argon gas to an acceptable level of purity. Thereafter, as shown in FIG. 3E, the fuel rod grid 16 is incrementally moved through a series of steps along the X and Y axes, whereby each of the intersect welds 32 is effected as described above. After the completion of the intersect welds 32, the fuel rod grid 16 is rotated 90° in a counter-clockwise direction about its Y axis so that its outer grid strap 22c is brought beneath the laser beam 178, whereby a third set of slot and tab welds 34c is carried out and a third corner seam weld 30c effected. Next, as shown in FIG. 3G, the fuel rod grid 16 is rotated 180° about its Y axis to present the fourth outer grid strap 22d to the laser beam 178, whereby a fourth set of slot and tab welds 34d, and a fourth corner seam weld 30d may be carried out. Thereafter, in the step as shown in FIG. 3H, the fuel grid 16 is rotated 90° in a counter-clockwise direction to its original position before it and its weld fixture are removed from the welding chamber.

Figure 3J:
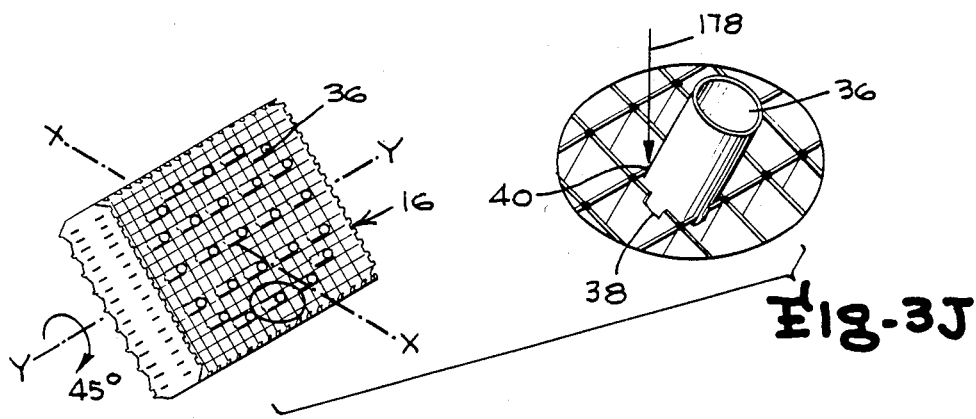
Figure 3K:
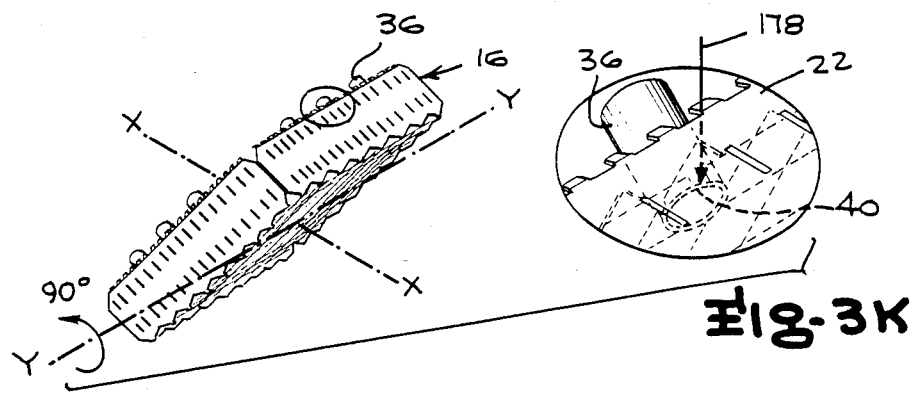
Figure 3L:
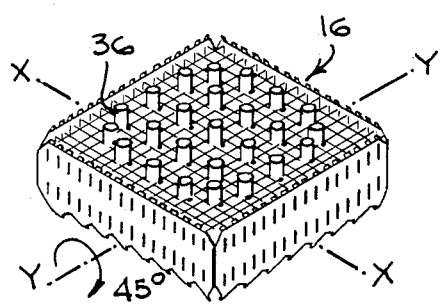
Figure 3M:
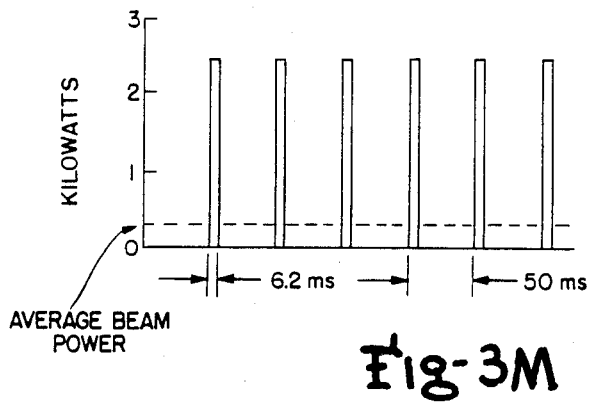
FIG. 3M is a graph showing a laser beam profile.

Referring now to FIGS. 3I to 3L, there is shown the process by which the guide sleeves 36 are welded to the fuel rod grid 16. Initially, the fuel rod grid 16 is removed from its welding fixture as required for the steps in FIGS. 3A to 3H and placed into a sleeve welding fixture as described in the copending application entitled "FUEL GRID WITH SLEEVES WELDED IN NOTCHED GRID STRAPS" (Ser. No. 414,232) the sleeve welding fixture includes a plurality of fixture pins disposed through selected of the cells formed by the inner grid straps 20 for receiving the guide sleeves 36, i.e. those openings having the notches 38 disposed in the peripheral edges thereof as seen in FIG. 3J. In particular, the fixture pins accurately position the guide sleeves 36 so that its axis is disposed centrally of and parallel with the surfaces of the inner grid steps 20. With the guide sleeves 36 accurately aligned and assembled with respect to the fuel rod grid 16, the grid 16 and its sleeve welding fixture are disposed into the welding chamber and affixed with respect to the chamber and to the laser beam 178. Thereafter, the air is purged with argon gas to the desired level of purity. Thereafter, as shown in FIG. 3J, the fuel rod grid 16 is rotated 45° in a counter clockwise direction and thereafter the grid and sleeve welding fixture is locked into that position at 45° with respect to the path of the laser beam 178 as shown in FIG. 3J. Thereafter, a series of notch seam welds 40 is carried out at a pulse width of 6.2 ms, at a pulse frequency of 20 PPS, an average power of 255 watts, and at a welding speed of 10 IPM. The fuel rod grid 16 is moved along the Y axis at the noted rate while the laser beam 178 is pulsed. As will be explained in detail later, it is necessary to refocus the laser beam 178 for each horizontal row of guide sleeves 36 as shown in FIG. 3J. A series of notch seam welds 40 is effected by moving the fuel rod grid 16 along its Y axis, bringing each guide sleeve 36 into position with respect to the laser beam 178, turning on the laser beam to effect the notch seam weld 40, and thereafter moving the fuel rod grid 16 to align the next guide sleeve 36. After a single horizontal row of guide sleeves 36 has been welded, the fuel rod grid 16 is moved along its X axis to position the next row of guide sleeves 36 in alignment with respect to the laser beam 178. Thereafter, it is necessary to refocus the laser beam 178 to effect the notch seam welds 40. As seen in FIGS. 3J and 3K, the guide sleeve 36 fits into four notches 38, and notch seam welds 40 are effected on opposing sides of the guide sleeves 36.

After one side of the guide sleeve 36 has been welded, it is necessary to rotate the grid 16 90° in a counter-clockwise direction as shown in FIG. 3K to expose the other, opposing notch 38 to the laser beam 178. After rotation, a series of notch seam welds 40 is carried out as explained above. Finally, in step FIG. 3L, the fuel rod grid 16 is rotated 45° in a clockwise direction to its original position before the grid 16 and its sleeve welding fixture are removed from the welding chamber to complete the welding steps of the fuel rod grid 16.

Referring now to FIG. 4, there is shown the laser welding system 100 for controlling the series of welds and in particular the intersect welds 32, the slot and tab welds 34, the corner seam welds 30, and the notch seam welds 40 necessary to secure the inner and outer grid straps 20 and 22 together to form the fuel rod grid 16 and to secure the guide sleeves 36 to the grid 16 by controlling a laser system 102 (shown in detail in the subsequent drawings) to emit a laser beam 178 of controlled energy to successively and precisely position the grid 16, and to control the supply of a suitable inert gas, e.g. argon, in which to carry out the laser welding of the aforementioned welds. Each of the work pieces, e.g. the fuel rod grids 16, is successively moved to each of the weld positions by its positioning module 106a and 106b, the module 106a being shown in FIG. 4. In particular, a welding chamber 108 is associated with each of the positioning modules 106 for receiving its grid 16 to establish an environment in which the laser welding may be carried out and, in particular, to establish an atmosphere of the inert gas while permitting movement of the grid 16 to effect the series of welds. The right positioning module 106a has a right cabinet door 114a, which is shown in an open position. A like left cabinet door 114b is shown in its closed position and is understood to cover its corresponding left positioning module 106b and left welding chamber 108b. A cabinet 104 further encloses the right and left positioning modules 106a and 106b, as well as the laser system 102, a main frame 122, an argon purging system 118, and an argon supply system 473 to be described below. A pair of sensing mats form right and left safety zones 134a and 134b disposed immediately in front of the right and left positioning modules 106a and 106b respectively; the zones 134a and 134b sense the presence of an operator thereon to prevent the driving of its corresponding welding chamber 108 into a position outside of the cabinet 104.

Figure 23A:
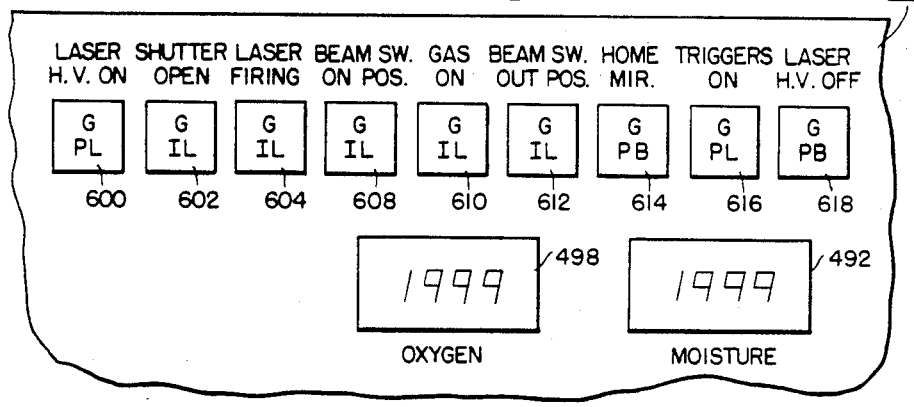

A laser power supply 120 is shown in FIG. 4 and is coupled by suitable conductors to the laser system 102 to control the emission of coherent light therefrom in a manner to be more fully explained below. In addition, there is included a computer control system 124 including a first Computer Numerical Control (CNC) system 126a and an identical second CNC 126b, associated respectively with controlling the lasing operations as occur within the right and left positioning modules 106a and 106b. As will be explained later, the first and second CNC's 126a and 126b bid for control of the laser system 102 whereby the CNC's time share the control of the laser system 102. The laser power supply 120 includes a laser welding display panel 132, as more fully shown in FIG. 23A, and each of the CNC's 126a and 126b includes respectively its machine function panel (MFP) 130 as more fully shown in FIG. 23B.

The main frame 122 is more fully shown in FIG. 5 for mounting adjustably the laser system 102 in an aligned position with respect to the right and left positioning modules 106a and 106b. Once aligned with the laser system 102, the right and left positioning modules 106a and 106b are fixedly secured with respect to the main frame 122 and therefore with respect to the laser system 102 to ensure that the alignment of the laser beam 178 may be accurately controlled with respect to each of the positioning modules 106a and 106b and therefore with respect to the fuel rod grids 16 carried thereby. The main frame 122 is made up of a top plate 142 and a bottom plate 43 (see FIG. 7), each welded to a frame of square tubing. As shown in FIG. 7, leveling and shock pads 224 are attached to the bottom plate 143 and serve to isolate the laser system 102 and the right and left positioning modules 106a and 106b from vibrations that might be imparted to the laser welding system 100 through the floor on which the laser welding system 100 rests. In addition, the pads 224 also dampen any vibrations that might be caused by the motor drives (to be described) associated with each of the right and left positioning modules 106a and 106b. The top plate 142 is machined flat after it has been welded to its frame of square tubings to provide a reference surface for the other system components that are mounted thereon. These other components are bolted or doweled to or with respect to the top plate 142 so that the critical alignments can be maintained.

Figure 9:
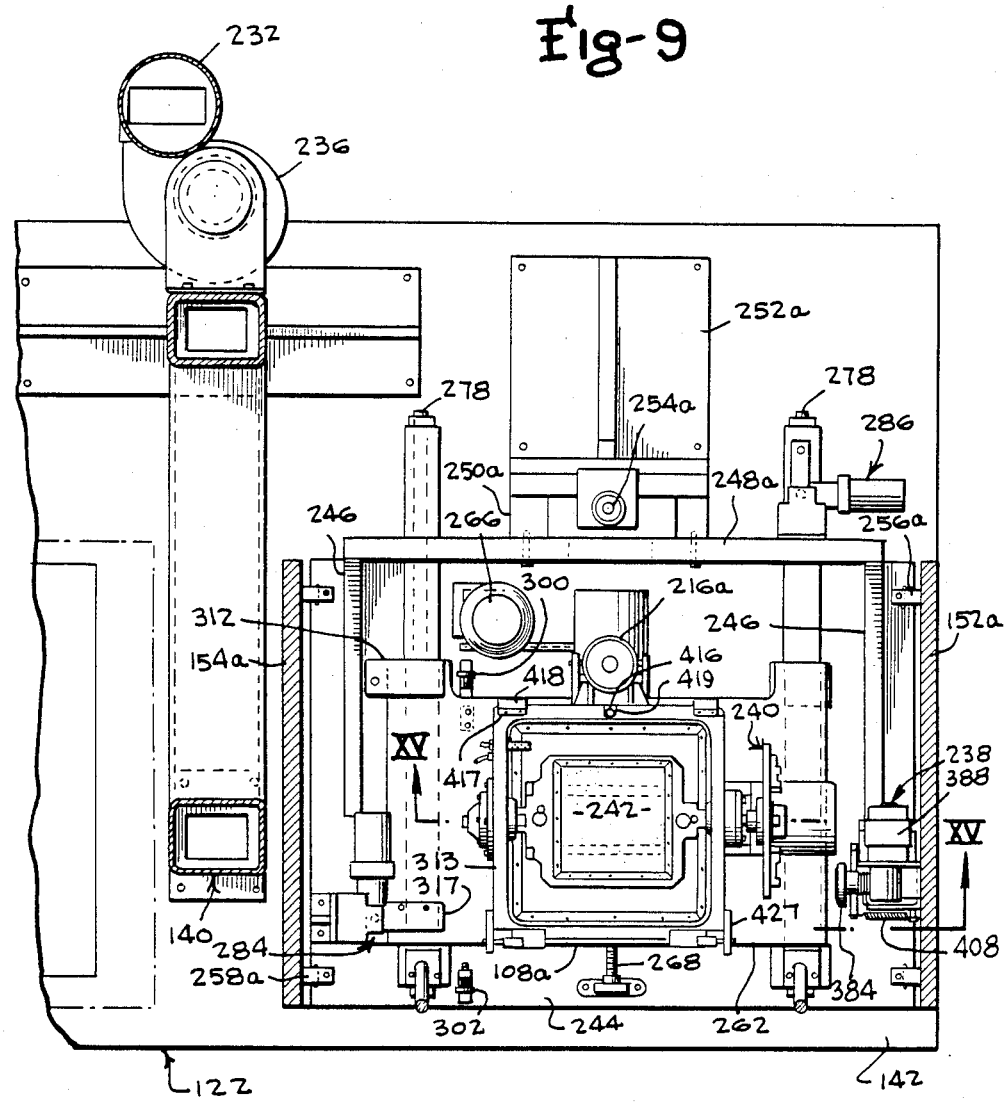
FIG. 9 is a plan view of the laser welding system taken along line IX—IX of FIG. 8.

A kinematic support 140 is bolted to the top plate 142 and comprises a pair of legs 141 and 139 each having a dowel pin securing it with respect to the top plate 142. Each of the positioning modules 106 is mounted on the main frame 122 and comprise, as shown in FIG. 5, a base plate 150 bolted to the top plate 142 at each of its four corners. Each positioning module 106 includes side walls 152 and 154, each bolted to the base plate 150, as shown in FIGS. 5 and 10. Each module 106 includes a back wall or vertical support 248, as shown in FIG. 10. A vertical slide 252 is bolted in turn to two gussets 246, as shown in FIG. 10; an X-Y platform 244 is in turn bolted to the two gussets 246 one on either side, as shown in FIG. 9. As shown in FIG. 10, the X-Y platform 244 receives and mounts an X-Y positioning system 288 by which its welding chamber 108 is incrementally moved along X and Y axes under the control of its CNC 126. Each of the positioning modules 106 further includes as shown in FIG. 5, a top or sealing plate 156 that is disposed in a close spacing (i.e. less than 0.040 inch) from, and in a substantially parallel relationship with, the upper flange 331 that forms the top surface 333 of its welding chamber 108, as shown in FIG. 8. Inspection of FIG. 8 will indicate that the critical spacing and relationship between the welding chamber 108 and its sealing plate 156 permit the X-Y positioning system 288 to move the welding chamber 108 while maintaining the relationship of the welding chamber 108 to the sealing plate 156. This critical relationship is established by accurately positioning the platform 244 with respect to the sealing plate 156 in a manner as will be explained.

As shown in FIGS. 7 and 9, a pair of vertical slides 252 are fixedly secured by dowels to the top plate 142. In particular, two dowel pins fit through the base of each vertical slide 252 and hold it to the top plate 142. A saddle 250 is movably mounted upon each vertical slide 252 and includes a positioning screw 254 extending in a substantially perpendicular relationship to the referenced surface of the top plate 142, whereby its saddle 250, its vertical slide 252, and the platform 244 may be critically aligned. The saddle 250 is bolted and doweled to the vertical slide 252 of the positioning module 106. The saddle 250 and its positioning screw 254 are illustratively that model as manufactured by Milwaukee Machine Components Company under their designation Model RB16-32-20-L. The vertical slides 252 provide means for raising or lowering the X-Y platform 244 to accommodate changes in the process or in the height of the welding chamber 108. Three dowels secure the X-Y platform 244 to its gussets 246 and may be removed therefrom to free the X-Y platform 244. Then the sets of gib keys 256 and 258 are pulled by means of their jacking screws. Next, a crank (not shown in the drawings) associated with the positioning screw 254 is turned to reposition up or down the X-Y platform 244, and thereafter the vertical slide 252 is bolted and doweled to its saddle 250, and the X-Y platform 244 is bolted to the vertical slide 252. When the X-Y platform 244 is at the required height, it is leveled, i.e. the spacing between the top of the welding chamber 108 and the bottom surface of the sealing plate 156 is made parallel with each other, and thereafter, new gib keys 256 and 258 are positioned, and the dowel pins are refitted in new holes drilled and reamed in the side walls 152 and 154 at their new locations.

The argon purging system 118 is more fully shown in FIGS. 4, 5, and 7. Argon that spills out of the welding chambers 108 during purging and welding falls to the bottom of each positioning module 106 to flow through a plurality of exhaust openings 151 within the base plates 150a and 150b. In the front of the main frame 122 are two openings 148a and 148b covered by wire mesh 146. The wire mesh 146 and the main frame 122 form a pair of plenums 144a and 144b which are connected by an exhaust duct (not shown) at the back of the main frame 122 via a damper 226 (see FIG. 7), and a duct 228 to a blower assembly 230, whereby the argon spillage is forced from the cabinet 104 via an argon exhaust conduit 232 from the building. The damper 226 controls the rate of argon flow. The blower assembly 230 creates a negative pressure or vacuum when the cabinet doors 114 are closed. The blower assembly 230 may illustratively take the form of an exhaust blower as manufactured by Dayton Electric Company under their Model 2C887. The spacing between the upper surface of the welding chamber 108 and the sealing plate 156 as shown in FIG. 8 is typically in the order of 0.030 inch to permit the movement of the welding chamber 108 along X and Y axes, as well as to permit an even flow of the argon from the welding chamber 108.

As shown in FIG. 5, the kinematic support 140 positions the laser system 102 (and, in particular, the source of laser emission in the form of a laser rod 170 and the related optics) with respect to the reference surface of the main frame 122 and more specifically with respect to the work pieces in the form of the fuel rod grids 16. The laser rod 170 is disposed within a laser head housing 166 and is mounted upon an optical tooling plate 168 which has been manufactured to very close tolerances for flatness. The optical tooling plate 168 is mounted upon a laser subbase 162 which is in turn supported upon the kinematic support 140 and, in particular, upon its cross beam 157 and horizontal member 159. In addition to the laser head housing 166, a movable beam switching mirror 172 and its actuator in the form of a stepping motor 175 and stationary beam diverters in the form of mirrors 174, 176a and 176b are also mounted upon the optical tooling plate 168. As shown in FIG. 6, the beam switching mirror 172 takes the form of a tear drop member coupled to the stepping motor 175 to be successively rotated by the motor 175 into and out of position to reflect or to transmit the laser beam 178 emitted from the laser rod 170.

The laser subbase 162 supports the optical tooling plate 168 and, in turn, is mounted upon the kinematic support 140. The kinematic support 140 is a weldment made of square tubing and provides the rigidity necessary to maintain the critical alignment between the laser beam 178 emitted from the laser rod 170, and the fuel rod grids 16. The laser subbase 162 is bolted to a pair of leveling jacks 158a and 158b disposed at either end of the cross beam 157. A spherical bearing 160 is disposed on a rearward portion of the horizontal member 159 to provide a single point of support for the laser subbase 162, whereby it may rotate about an axis 164 as each of the front leveling jacks 158a and 158b is raised or lowered. The spherical bearing 160 is disposed at a fixed height to provide a pivot about which the laser subbase 162 may be either lifted straight up or tilted to the required angle by the leveling jacks 158a and 158b.

The plane of the laser subbase 162 must remain rigid while the jacking forces are applied thereto by the leveling jacks 158A and 158B during the initial alignment of the laser welding system 100. As will be explained below, the laser subbase 162 also supports a pair of Z-axis laser assemblies 222 (see FIG. 7), whereby corresponding laser focusing lens assemblies 204 (see FIG. 6) may be rectilinearly adjusted to focus the laser beam onto the fuel rod grids 16 within the corresponding welding chambers 108. The laser subbase 162 provides a bolting surface for mounting the Z-axis positioning assemblies 222 (see FIG. 7). Each Z-axis laser assembly 22 is rigidly secured to the laser subbase 162 so that it carries the laser focusing lens assembly 204 along its Z-axis that is perpendicular to the top surface of the laser subbase 162. As shown in FIGS. 5 and 6, the laser rod 170 emits a laser beam 177 that is focused onto the beam switching mirror 172, which alternately directs the laser beam 177 first to the vertical directing mirror 176a and then to the vertical directing mirror 176b, thus forming a right laser beam 178a and a left laser beam 178b. The laser beams 178a and 178b are directed through openings 180a and 180b within the positioning modules 106a and 106b respectively.

The laser system 102 as shown in FIG. 5 and schematically in FIG. 6 may, in one illustrative embodiment of this invention, take the form of that laser system manufactured by Raytheon under their model designation number SS500. The laser system 102 includes the laser rod 170 illustratively taking the form of a Nd:YAG crystal laser and a pair of linear krypton flash lamps disposed in a high efficiency laser head. The laser head includes a total reflecting mirror 182 and a partial reflecting mirror 184 disposed on either end of the laser rod 170. An inner cavity shutter 188 is disposed between the laser rod 170 and the total reflecting mirror 182 and is selectively controlled to release a selected number of lasing pulses, whereby the energy imparted to effect laser welding may be precisely controlled in a manner to be explained below. The laser head is modularly constructed to permit all optic elements thereof including the laser rod 170, the excitation lamps 186, and the mirrors 182 and 184 to be easily and independently replaced. The excitation lamps 186 shall be quickly replaced without disturbing the optical alignment. Further, the excitation or flash lamps 186 are water cooled over their entire length, including their end connectors. Lamp triggering provides for parallel pulsing of the excitation lamps 186 by energizing the cavity. The laser rod 170 shall illustratively be selected such that 400 watts average power is obtained at the work piece with the input power to the pulse forming network not to exceed 18 KW when operating at pulse widths of 6 ms and 2 ms and pulse rates of 20 Hz and 50 Hz respectively. A dump shutter 190 is disposable in a first position to direct the laser beam 177 along a diverted path 196 into a beam absorber 194 during those periods in which the work pieces in the form of the fuel rod grids 16 are being changed within the chambers 108. An actuating mechanism 192 is shown for disposing the shutter 190 from its first beam intercepting position to a second position, wherein the beam 177 is focused by a beam expander lens assembly 198 to a beam directing mechanism comprised of the movable beam switching mirror 172 and the stationary mirror 174. When the reflective mirror 171 is disposed to intercept the laser beam 177, it is diverted along path 178a to the vertically directing mirror 176a to be directed vertically. The laser focusing lens assembly 204a intercepts and focuses the laser beam 178a onto the fuel rod grid 16 within the chamber 108a. As shown, the laser focusing lens assembly 204, as will be described in detail later, includes a lens 202 and a lens carrier tube 200 as rectilinearly positioned by the Z-axis laser assembly 222. When the reflective mirror 172 is rotated by the motor 175 from a position intercepting the laser beam 177, it is diverted by the stationary reflective mirror 174 to form the laser beam 178b as directed by the vertically directing mirror 176b towards the welding chamber 108b.

The excitation lamps 186 are energized by the power supply 120, generally shown in FIG. 4. The power supply 120 illustratively comprises a voltage regulated DC power supply which charges a pulse forming network (PFN) through a charging inductor. The related CNC 126 alternately closes switches (silicon controlled rectifiers) that charges the PFN from the DC power supply reservoir capacitor bank and discharges the PFN into the excitation lamps 186 to thereby excite the laser rod 170 to emit a series of laser pulses. The excitation lamps 186 shall operate in a "simmer" mode of operation, in which the lamps 186 are operated at a low DC current level below lasing threshold, and high current pulses are superimposed on the simmer current for generating laser pulses. The PFN shall provide pulses of 2 ms and 6 ms.

To assist in the initial alignment of the weld chamber 108 and, in particular the fuel rod grid 16 with respect to the laser beam 178, there is provided means for sighting the grid 16 and, in particular, to determine its exact position with respect to laser beam 178 in the form of an alignment TV camera 206 that is aligned to establish an image path 214 coinciding with the path of the laser beam 178a. As shown in FIG. 6, the image path 214 is focused by a lens 210, selectively passed by a Bureau of Radiological Health (BRH) or safety shutter 212 and directed through the partially transmissive mirror 176 to the TV camera 206. The lens 202, in addition to focusing the laser beam 178 onto the fuel rod grid 16, also focuses with the assistance of lens 210 the image of the grid 16 onto the TV camera 206. As will be explained below, the laser focusing lens assembly 204 also includes an illuminating lamp that is selectively energized to illuminate the grid 16 for alignment purposes. The BRH shutter 212 is selectively opened and closed to permit alignment of the grid 16 with respect to the laser beam 178, remaining closed during all other periods as a safety measure.

As illustrated in FIG. 6, each of the welding chambers 108 may be moved from a first, welding position as shown in the dotted line to a second, out position. When the welding chamber 108 is in its second position, the laser beam 178 is directed by its vertically directing mirror 176 onto a power measuring device or thermopile 218, as supported within a shield tube 216. As will be shown later, the shield tube 216 is mounted on a rearward portion of the welding chamber 108 and includes a restricted opening 220 whereby the laser beam 178 may be effectively confined within the shield tube 216. Periodically, the welding chamber 108 is disposed to its second, out position and the laser beam 178 is directed onto the thermopile 218 to provide an indication of the power output of the laser rod 170 actually impinging onto the fuel rod grid 16. Under the heavy duty load imposed upon the laser system 102, it is contemplated that the laser efficiency will attenuate due to the exhaustion of the laser rod 170 and/or its excitation lamps 186, as well as due to the presence of smoke and debris given off during the laser welding. Thus, in order to provide accurate, reproducible welds, the voltage applied to the excitation lamps 186 is increased over the life of the laser system 102 dependent upon the thermopile measurements.

The cabinet 104 of the laser welding system 100 serves to confine the argon escaping from the welding chambers 108 so that it may be exhausted by the argon purging system 118 as described above. In order to permit the welding chamber 108 to be brought to its second, out position, wherein the work piece and, in particular, the fuel rod grid 16 may be replaced, the cabinet doors 114 are mounted to be rectilinearly moved to an open position as shown in FIG. 4. In an illustrative embodiment of this invention, a door opening mechanism 234 is shown in FIG. 7 as comprising two cable cylinders that are bolted to the main frame 122. An auxiliary air cylinder keeps constant tension on the cable and takes up stretch that occurs during operation of the cabinet doors 114. The air pressure on these cylinders is controlled by a regulator. The air to the cable cylinders is controlled by a solenoid valve. The doors 114 are permitted to move along rails mounted upon blocks. In an illustrative embodiment of this invention, the air operated cable cylinders may take the form of those devices as manufactured by Tolomatic under their model number 100-150.

Referring now to FIGS. 8, 9 and 10, there is shown a slide table 262 that permits the welding chamber 108 to be removed from the cabinet 104 to its second, out position, wherein the machine operator may remove the fuel rod grid 16 from the welding chamber 108. To this end, the slide table 262 is mounted upon the accurately positioned X-Y platform 244 to be positively driven by a slide drive motor 266 in a rectilinear fashion between its first welding position and its second, out position with respect to the cabinet 104. The slide table 262 includes a safety rail 264 that protrudes in advance of the leading edge of the slide table 262 to prevent operator injury. The slide drive motor 266 is coupled by a drive chain 272 to a screw drive 268 which is threadably received by a shoulder bolt 274 to drive a support bracket 276 fixedly attached to the slide table 262. As particularly shown in FIG. 10, the screw drive 268 is mounted at either end upon a pair of pillow blocks 270. As more fully shown in FIGS. 8 and 9, there are provided a pair of bearing shafts 278 fixedly secured to the underneath surface of the slide table 262 and oriented substantially parallel with each other to permit the desired rectilinear travel of the slide table 262 between its first and second positions. As shown in FIGS. 8, 12, and 13, each of the bearing shafts 278 includes a shaft support 310 which is disposed at either end of the bearing shaft 278, is bolted to the lower surface of the slide table 262 and is secured to the shaft 278 by a bolt 311. In turn, a pair of pillow blocks 282 is disposed along the length of the shaft 278 to receive and support it for rectilinear motion.

As shown particularly in FIG. 11, means are provided for limiting the motion of the slide table 262 between its inner and outer positions, taking the form of a stop 308 fixedly secured to the slide table 262. On either side of the stop 308, there are disposed stop brackets 300 and 302 having positioning nuts 304 and 306 threadably received therein, respectively. The positioning nuts 304 and 306 are set to variably select the limits of motion of the slide table 262. The stop brackets 300 and 302 are securely attached by pins to the X-Y platform 244.

Referring now to FIGS. 8 and 9, means are shown for accurately positioning the X-Y platform 244 and therefore the welding chamber 108 in its first, welding position within its positioning module 106 and in its second, out position removed from the cabinet 104, wherein the operator may readily remove the fuel rod grid 16 from the welding chamber 108. It is critical that the welding chamber 108 and, in particular, its fuel rod grid 16 be disposed accurately with respect to the laser beam 178 as shown in FIGS. 6, 8 and 9. To this end, a front locator assembly 284 selectively directs its locator pin 316 as shown in FIG. 12 from a first, withdrawn position, to a second, locking position, wherein it is disposed within an opening 318 of a positioning member 317 fixedly attached to the slide table 262 to thereby precisely position the slide table 262 with respect to the laser beam 178. A similar positioning member 312 is disposed at a rearward portion of and is fixedly attached to the slide table 262 to engage the locator pin 316 of the front locator assembly 284, to thereby position and hold the slide table 262 and therefore the welding chamber 108 in its second, out position. As more specifically shown in FIG. 12, the front locator assembly 284 includes a locator bracket 322 fixedly attached to the platform 244 at one end and having at its other end a crangor bracket 320 from which is suspended by a clevis 324, an actuator 314 for driving the locator pin 316. A second or back locator assembly 286 is shown in FIGS. 7 and 9 and serves to fixedly secure the slide table 262 with respect to the laser beam 178. The back locator assembly 286 is fixedly secured to its positioning module 106 by a locator bracket 323 attached to the vertical support 248 and includes an actuator 315 and a locator pin 319 driven thereby from a first, withdrawn position to a second, locking position, whereby the locator pin 319 engages an opening 325 of a positioning member 321 affixed to the slide table 262. In this manner, the slide table 262 is affixed at diagonally opposed corners by the locator pins 319 and 316 of the back and front locator assemblies 286 and 284, respectively, thus ensuring a fixed relationship between the table slide 262 and the laser beam 178. The front and back locator assemblies 284 and 286 may illustratively take the form of plunger mechanisms as manufactured by DeStaco.

Referring now to FIGS. 8 and 10, each of the positioning modules 106 includes means in the form of an X-Y positioning system 288 for precisely positioning the welding chamber 108 and, in particular, the fuel rod grid 16 contained therein in a plurality of precisely controlled positions along X and Y axes of a plane, as well as to rotate that plane at a precisely controlled angle about the Y axis, whereby a variety of welds may be effected by the laser beam 178. The X-Y positioning system 288 is disposed as shown in FIG. 10 as being mounted upon the slide table 262 for supporting and positioning the welding chamber 108. The X-Y positioning system 288 includes an X positioning table 290 and a Y positioning table 292 mounted thereon. The X and Y positioning tables 290 and 292 may illustratively take the form of that mechanism as manufactured by the Shaum Manufacturing Company under their product number DC1212. The X positioning table 290 serves to move the chamber 108 in a direction substantially perpendicular to the plane of FIG. 8, whereas the Y positioning table 292 moves the chamber 108 along a direction perpendicular to the plane of FIG. 10. The Y positioning table 292 is associated with a Y drive motor 296 that includes a resolver and tachometer, whereby precise incremental distances may be imparted to the welding chamber 108. Similarly, the X positioning table 290 is associated with an X drive motor, resolver, and tachometer 294.

As will be explained later in detail, a B axis rotation drive 238 as generally shown in FIG. 9 is engageable with the welding chamber 108 and in particular with a rotatable fixture assembly 240 as rotatably mounted within a side wall of the welding chamber 108 to rotatably position a rotatable fixture 242 as shown in FIG. 9. It is understood that the fuel rod grid 16 is attachable to the rotatable fixture assembly 240, whereby it may be rotatably disposed about the Y axis.

The welding chamber 108 and its rotatable fixture assembly 240 will now be described more specifically with respect to FIGS. 14 and 15, as comprising a bottom plate 326, front and back walls 329a and 329b, and side walls 327a and 327b. An upper flange 331 is disposed around the upper periphery of the aforementioned walls to provide a machined, flat seal surface 333 that is disposed in a close, precisely parallel relationship with the lower surface of the sealing plate 156. This precise relationship between the seal surface 333 and the sealing plate 156 permits the even flow of the argon from the welding chamber 108 into the positioning module 106, as well as the movement of the welding chamber 108 and its fuel rod grid 16 along the X, Y axes of a plane substantially parallel to the lower surface of the sealing plate 156.

As shown in FIG. 15, a support gasket 332 is disposed on the bottom plate 326 for forming a plenum chamber for receiving the flow of argon through an argon input port 338. The plenum chamber is formed by a bottom cover 328, a diffuser plate 330, and a hold down strap 334 which is configured as a frame and is disposed to retain the peripheral edge of the diffuser plate 330 with respect to the support gasket 332. A pair of manifold tubes 336, as shown in FIGS. 14 and 15 (only one being illustrated), distributes the flow of argon within the plenum chamber. Significantly, the diffuser plate 330 is made of a uniformly sintered, stainless steel of approximately 60% density and in an illustrative embodiment of this invention is made of a material known as "Feltmetal" having dimensions of ⅛ inch thickness and 15 inches square and manufactured by Brunswick under their number FM1110. The diffuser plate 330 covers the entire bottom of the welding chamber 108 and provides means for producing a laminar gas flow which "floats" the air out of the welding chamber 108 with a minimum of turbulence. The higher density of argon is evenly distributed over the cross sectional area of the welding chamber 108 to effectively exclude air from the welding chamber 108, whereby an atmosphere of inert gas, e.g. argon, may be established with a high degree of purity. It has been found that an atmosphere of a purity in the order of 10 parts per million (PPM) water and of 7 PPM oxygen will produce significantly improved welds of the material Zircaloy. Various porous metal products were tried to identify the most effective material; it was ascertained that improved results were obtained with a thicker, higher density material, e.g. a sintered, stainless steel fiber plate having a density of 60%. Further, it is significant that the diffuser plate 330 covers substantially the entire bottom of the welding chamber 108, with as little non-diffusing supporting structure as possible. As the diffuser area decreases in relationship to the chamber bottom surface area, the time and quantity of argon required to purge the welding chamber 108 of air and moisture increases. For example, a diffuser plate 330 that would cover only ¼ of the bottom surface is no more effective than simply directing a flow of gas into the welding chamber 108 through a tube or other jet. As illustrated in FIG. 15, the diffuser plate 330 is effectively sealed to the side walls 327 and the front and back walls 329 so that the argon flowing into the plenum is forced to diffuse through the plate 330, and not simply to bypass the diffuser plate 330 and to flow up along the side, front, and back walls. The illustrative structure for supporting the periphery of the diffuser plate 330 ensures that the argon introduced at relatively high gas flow will not deflect the diffuser plate 330. The pair of manifold tubes 336 as well as the configuration of the plenum formed by the bottom cover 328 and the diffuser plate 330 ensure an even gas distribution across the cross section of the welding chamber 108. As mentioned above, the seal surface 333 is disposed at a substantially uniform, parallel spacing with respect to the lower surface of the sealing plate 156 of a distance less than 0.040 inch and in one illustrative embodiment at a spacing of 0.030 inch to provide an even distribution into and from the welding chamber 108. The use of a seal between the welding chamber 108 and the sealing plate 156 was avoided in that it tended to impose an unnecessary drag on the X-Y positioning system 288, thereby slowing the rate at which the welds could be made. It is understood that a flow of gas, as will be discussed in detail later, into and from the welding chamber 108 prevents other contaminating gases from flowing into the chamber 108. As a result of maintaining an even flow of the inert gas into the welding chamber 108, the purity of the welding atmosphere within the welding chamber 108 is ensured. As discussed above, weld contamination is prevented to a high degree sufficient to ensure the structural integrity of the fuel rod grid 16 even when exposed to the hostile environment of a nuclear reactor, wherein the fuel rod grid 16 is subject to high flows of super-heated water tending to rapidly contaminate any weld and leading to the structural deterioration of the grid 16 and the rupturing of the fuel rods 18.

The welding chamber 108 receives and rotatively supports the rotatable fixture 242 upon which the fuel rod grid 16 is mounted for laser welding within the inert atmosphere. As shown in FIG. 14, the rotatable fixture 242 includes a first shaft 510 and a second, fixture shaft 368. The first shaft 510 is rotatively received by a bearing 346 as mounted by a port cover 342 within a port 343 of the side wall 327b of the welding chamber 108. A feed cover 348 is in turn mounted to cover the bearing 346 and to support and seal an argon input port 500 by which argon is introduced by a flexible hose 490, to the rotatable fixture 242. The shaft 368 is mounted within a bearing 356 (see FIG. 15) as mounted within a bearing housing 344 attached to the side wall 327a. In turn, the shaft 368 is fixedly coupled to a positioning wheel 358, which in controllably rotated to selectively rotate and fixedly orient the position of the rotatable fixture 242 within the welding chamber 108 with respect to the laser beam 178. A locating mechanism 370 is mounted by a housing 372 attached to the side wall 327a for positively locking the position of the positioning wheel 358 and therefore the angular position of the rotatable fixture 242, and for releasing the positioning wheel 358, whereby it may be rotated by the B axis rotation drive 238 as will be explained. The locating mechanism 370 includes a locator pin 378 that is biased by a spring 376 into one of the openings 379 to positively position and lock the positioning wheel 358 in that position. The locating mechanism 370 also includes a position shaft 374 attached to the pin 378 and disposed within the housing 372 for axially guiding the pin 378 and a release bracket 380 that is engageable to depress the spring 376 and to release the positioning wheel 358 for rotation by the B axis rotation drive 238.

As shown in FIGS. 14, 18, 19, and 20, the rotatable fixture 242 comprises a frame 502 disposed between the shafts 510 and 368 that are aligned on either side of the frame 502 with respect to each other. A pair of struts 504 extend parallel of each other between opposing sides of the frame 502 to form openings 505 through which the laminar flow of argon is directed to the fuel rod grid 16 as supported on a top most support surface 540. The fuel rod grid 16 is held within a welding fixture 542 which is in turn locked to the rotatable fixture 242 by a pair of locating pins 524. The welding fixture 542 is shown in phantom line in FIG. 15 and is described in copending application entitled "WELDING PLATES FOR A FUEL ROD GRID" (Ser. No. 414,265). Argon is introduced into the welding chamber 108 through the first argon input port 338 at the bottom-most portion of the welding chamber 108 and also through the second argon port 500 to be directed through a traverse conduit 512 and therefrom through a pair of axial conduits 514 to be discharged through output ports 506 within the struts 504. A second diffuser plate 520 is mounted to cover the openings 505 and is secured to the rotatable fixture 242 by a retaining frame 518 that is held by screws to retain the second diffuser plate 520 within a recess 516 formed within the rotatable fixture 242. Thus, there is shown means for providing a further flow of the inert gas argon through the work piece and, in particular, through the inner and outer grid straps 20 and 22 of the fuel rod grid 16, thereby ensuring the atmosphere purity and the integrity of the laser welds made therein.

The locating pins 524 comprise, as shown in FIGS. 19 and 21, a locking head 526 whose lower edge securely locks the welding fixture 542 in place upon the support surface 540 of the rotatable fixture 242. The locking head 526 is pivotally and flexibly mounted by a cantilever member 528 secured at its other end to a mounting member 530. In turn, the mounting member 530 is disposed within an opening 534 in such a manner that its collar 532 is securely fit within a recess 536 and retained therein by a screw 538. In this manner, the fuel rod grid 16 as supported by its welding fixture 542 may be gradually lowered onto the support surface 540, so that openings within the welding fixture 542 are aligned with and received by the locking heads 526 of the locating pins 524, which being spring biased are deflected to be directed through such openings and thereafter, the heads 526 are biased by their cantilever members 528 into a support locking position.

With reference to FIGS. 15 and 16, the detailed structure of the locating mechanism 370 will now be explained. The shaft 510 of the rotatable fixture 242 is rotatably mounted by a bearing 346, which is held within the thrust housing 340 by a locknut 350. In addition, a pair of hand knobs 352 is mounted upon the port cover 342 to assist in the movement of the welding chamber 108. The other shaft 368 of the rotatable fixture 242 is rotatably supported by the bearing 356 as supported within the bearing housing 344 and is retained therein by a hold down cover 354 threadably secured to the side wall 327a. A coupling collar 364 has an opening for receiving the end of the shaft 368 and is rotatively coupled to the positioning wheel 358 by a dowel pin 366 disposed through the collar opening and a slot within the shaft 368. A toothed coupling member 362 is fixedly attached to the positioning wheel 358 and has teeth of a configuration and spacing to engage the teeth of a corresponding toothed coupling member 384 as selectively driven by the B axis rotation drive 238 to impart a rotation to the positioning wheel 358 and to its rotatable fixture 242.

Referring to FIG. 16, there is shown a plurality of sensor strips 382a, 382b, 382c, 382d and 382e disposed radially of the positioning wheel 358 and serving to provide an indication of the angular position of the positioning wheel 358 and its rotatable fixture 242 about the B axis position, indicated by the arrow in FIG. 16, i.e. the angular position about the Y-axis as disposed perpendicularly with respect to the plane of FIG. 16. As seen in FIGS. 14 and 15, the sensor strips 382 have different configurations, so as to distinctly actuate corresponding ones of a plurality of proximity switches 402, 402a, 402b, 402c, and 402d, dependent upon the B axis position of the positioning wheel 358. For example, the sensor strip 382a actuates only switch 402a to provide a binary signal "100" to provide an indication of the B axis position of minus 90°; strip 382b actuates only the proximity switch 402b to provide a binary signal "010" to provide an indication of a minus 45° angular position; sensor strip 382c actuates the binary proximity switches 402a and b, to provide a binary signal "110" indicative of a zero angular position; sensor strip 382d actuates switch 402c to provide a binary signal "001" to provide an indication of a plus 45° position; and sensor strip 382e actuates switches 402a and 402c to provide a binary signal "101" to provide an indication of an angular position of plus 90°. The three proximity switches 402a, b, and c are actuated by the sensor strips 382 to provide binary signals indicative of the B axis position of the rotatable fixture 242, whereas the lower most or last proximity switch 402d is actuated to indicate that a sensor strip 382 is in an aligned relation to the proximity switches 402, which provide a binary signal indicative of the B axis angular position of the positioning wheel 358.

The welding chamber 108 is moved by the Y positioning table 292 to the left as seen in FIG. 15, whereby the sensor strips 382 engage selectively as indicated above the proximity switches 402 to provide their indication of the B axis angular position of the positioning wheel 358. As will be explained below, the X and Y positioning tables 290 and 292 are under the control of its CNC 126, whereby, when it is desired to rotate the positioning wheel 358 and its rotatable fixture 242, the Y positioning table 292 is actuated to move the welding chamber 108 to the left as seen in FIG. 15, whereby the rotatable fixture assembly 240 engages the B axis rotation drive 238 and, in particular, its toothed coupling member 362 engages the toothed coupling member 384 to effect a rotative coupling of the positioning wheel 358 to the rotatable fixture 242. A spring 394 serves to bias the coupling member 384 to mate with the coupling member 362. A fifth proximity switch 402e is also mounted upon the motor bracket 400 and is activated as the release bracket 380 is pressed there against as the welding chamber 108 is moved into position where the coupling members 362 and 384 engage each other. The activating or closing of the proximity switch 402e in turn energizes the solenoid 406, whereby the trip 404 is disposed to the left as shown in FIG. 15, against the biasing action of a spring 408, thus engaging the release bracket 380, depressing the spring 376 and removing the locator pin 378 from one of the openings 379 within the positioning wheel 358. A motor 388 is now energized to drive the coupled toothed coupling members 362 and 384 to impart a rotational movement to the rotatable fixture 242. The motor 288 continues to rotate the positioning wheel 358 until it reaches its new position as sensed by the proximity switches 402. Upon reaching its new position, the solenoid 406 is deenergized, and the locator pin 378 reinserted into that locator opening 379 associated with the new wheel position.

As shown in FIGS. 14 and 16, the welding chamber 108 includes a moisture sensor 410 for providing an indication of the moisture content within the chamber atmosphere in terms of parts per million. In addition, the shield tube 216 is mounted by a shield bracket (not shown) on the back wall 329b of the welding chamber 108. A meter bracket 412 is also disposed on the back wall 329b for mounting the thermopile 218 in alignment with the laser beam 178 when the welding chamber 108 is disposed to its second, out position as shown in dotted line in FIG. 6 and the lens carrier tube 200 is disposed in axial alignment with the shield tube 216. As noted above, the laser system 102 is periodically calibrated to ensure that precise quantities of laser energy are imparted by the laser beam 178 to the fuel rod grid 16. Further, as shown in FIG. 16, the sealing plate 156 includes an opening 426 that is disposed in alignment with the work piece, e.g. the grid 16, when the welding chamber 108 is disposed and locked in its first, welding position by the front and back locator assemblies 284 and 286. When the laser focusing lens assembly 204 is aligned with the work piece as mounted upon the rotatable fixture 242, the Z-axis laser assembly 222 is actuated to direct the laser focusing lens assembly 204 along the Z-axis downwardly as shown in FIGS. 6 and 15, whereby the assembly 204 and in particular its lens 202 are positioned to focus the laser beam 178 upon the work piece. In that position, the laser focusing lens assembly 204 is axially aligned within a shielding ring 420 disposed concentrically about the opening 426. In addition, a shielding cap 422 is mounted upon the ring 420 and includes an inwardly directed flange to form an opening 424 of but slightly greater dimension than that of the laser focusing lens assembly 204, thereby preventing operator exposure to the laser emission directed into the welding chamber 108.

Referring now to FIG. 17, there is shown in detail the laser focusing lens assembly 204 as mounted upon the Z-axis laser assembly 222 for movement rectilinearly along the Z-axis to and from the welding chamber 108 and in particular, its shielding cap 422. The laser focusing lens assembly 204 is described in copending application entitled "LASER LENS AND LIGHT ASSEMBLY" (Ser. No. 414,205). The assembly 204 includes the lens carrier tube 200 disposed vertically and aligned concentrically with respect to its laser beam 178. A tube base 430 is disposed at the bottom of and connected to the lens carrier tube 200 for removably receiving a lens mounting member 440. As shown in the detailed drawing of FIG. 19, the mounting member 440 is configured to receive a locking ring 436 having a plurality of helical grooves 434, e.g. 3, disposed to receive a corresponding plurality of lock pins 432. Upon rotation, the locking ring 436 and its mounting member 440 may be locked to the tube base 430. A safety hood 438 is made of conical configuration to direct the focused laser beam 178 onto the work piece and has a threaded peripheral portion for engaging a set of threads upon the inner peripheral portion of the mounting member 440. In similar fashion, the lens 202 is supported within a central opening of a mounting member 440 and is retained therein by a retaining ring 442 being peripherally threaded to engage a set of threads upon the mounting member 440, whereby the retaining ring 442 may be screwed onto the mounting member 440 to retain the focusing lens 202.

The safety hood 438 is disposed through an opening within a lamp hood 446 to affix the hood 446 to the mounting member 440. A pair of quartz-halogen lamps 428 is disposed within the lamp hood 446 to illuminate the work piece thus permitting alignment of the work piece with respect to the Z-axis or laser beam 178. The operating temperature of the lamps 428 prevents welding debris from collecting thereon. As will be described in detail below, the operator aligns the work piece with respect to the laser beam 178 by viewing the CRT 133 displaying the image as taken by the TV camera 206 whereby the operator may place its electronic rectical on an initial weld site to determine an offset between a home position and the sighted, first weld site; this offset is then automatically incorporated into the control signals as applied to the X-Y positioning system 288, whereby each of the welds is precisely positioned with respect to the laser beam 178. The lamp 428 is energized by wires directed to the lens hood 446 via an electrical input port 449 as inserted into a tube mounting portion 201 and a conduit 451 leading from the portion 201 to the tube base 430. In similar fashion, a flow of the inert gas, e.g. argon, is introduced into the space formed by the safety hood 438 and the lens 202 by an argon input port 448 threadably attached within an opening of the tube mounting portion 201 and therefrom via a conduit 450 leading to the mounting member 440. The mounting member 440 has an argon jet formed in alignment with the conduit 450, whereby the flow of argon is formed into a jet directed into the hood 438, whereby debris or contaminants as emitted during the welding process will be effectively removed so as not to attenuate the laser beam 178 focused onto the work piece. As seen in FIG. 17, the flow of argon escapes from the safety hood 438 into the space confined by the shielding ring 420 and the cap 422 to be exhausted via an output port 454.

The lens carrier tube 200 and in particular the tube mounting portion 201 is mounted by a mounting assembly 460 on the Z-axis laser assembly 222. A bellows 456 is secured to the topmost portion of the lens carrier tube 200 to provide shielding of the laser beam directed therethrough, while permitting the Z-axis laser assembly 222 to move the laser lens assembly 204 rectilinearly along the path of the laser beam 178 as shown in dotted line in FIG. 17. In this fashion, the lens 202 may be variably disposed along the Z-axis to permit precise focusing of the laser beam 178 onto the work piece whose position may be changed with respect to laser beam 178, as by rotating the rotatable fixture 242 to effect different types of welds.

As shown in FIGS. 7 and 8, the expandable bellows 456 is connected to the topmost portion of the lens carrier tube 200 and to a protective housing 461 by a bellows adapter 464. The Z-axis laser assembly 222 includes a Z-axis table 458 upon which the laser focusing lens assembly 204 is mounted by the lens mounting assembly 460, and is incrementally, selectively driven by a Z-axis drive motor 470 as shown in FIG. 7. In a manner similar to the X and Y drive motors 294 and 296, the Z-axis drive motor 470 also includes a resolver and a tachometer to provide output signals indicative of the precise position of the Z-axis table 458, as well as its speed of movement. The Z-axis table 458 is mounted in a vertical position, thereby imposing a force upon the Z-axis drive motor 470 which is counter-balanced by a pair of spring powered reels 466 that are coupled respectively by cables 472 disposed about the reels 466 and secured to the Z-axis table 458 by a suitable securing means such as a screw 468. The Z-axis table 458 may in one illustrative embodiment of this invention take the form of a table as manufactured by Design Components, Inc., under their designation SA100. The coupling between the Z-axis drive motor 470 and the Z-axis table 458 may illustratively take the form of those components manufactured by Shaum Manufacturing, Inc., under their designations "Heli-Cal" Nos. 3477-16-8 and 5085-8-8. The Z-axis drive motor 470 may illustratively take the form of that DC servo controller as manufactured by Control Systems Research, Inc., under their designation SM706RH.

An argon supply system 473 is shown in FIG. 21 for providing a flow of a suitable inert gas, e.g. argon, to the welding chamber 108 and to the laser lens assembly 204 at selected variable rates. The laser welding of volatile materials such as Zircaloy, of which the inner and outer grid straps 20 and 22 are made, must be conducted in an inert atmosphere due to the highly reactive nature of Zircaloy to oxygen, nitrogen, and water. Welding tests have demonstrated that an inert gas flow around the immediate weld area of a work piece does not provide adequate shielding from oxygen and water to produce the desired high quality of welds that will withstand the hostile environment of a nuclear reactor without failure. The argon supply system 473 as shown in FIG. 21 includes the welding chamber 108 as shown more fully in FIG. 14, as well as the laser focusing lens assembly 204 as particularly shown in FIG. 17. The argon supply system 473 comprises an argon supply tank 474 that is coupled to a flow valve 476 which separates the argon supply tank 474 from the remainder of the system 473. This valve 476 is kept fully open except when it is necessary to shut down the entire system. The argon flows from the tank 474 through the valve 476 to a regulator 478, which establishes the system pressure so as not to exceed a maximum level, e.g. 50 psi. It is contemplated that the flow of argon to each of the welding chambers 108a and 108b and the laser focusing lens assembly 204 will be controlled at a plurality of different rates depending upon whether the grid 16 is being loaded into the chamber 16, the chamber 108 is being purged, or a welding operation is occurring. For example, the purging of the welding chamber 108 requires a relatively high flow rate of the inert gas at which time pressure should not exceed the maximum level. To this end, a relief valve 482 is coupled to a manifold 480 for receiving the gas flow and for distributing it to each of a plurality of mass flow controllers 484, 486, and 488. The mass flow controllers 484, 486, and 488 are respectively connected to the welding chamber 108, to the rotatable fixture 242 and to the laser lens assembly 204. In particular, a controlled rate of gas flow is provided from the mass flow controller 484 via a flexible hose 490 to the argon input port 338, whereby argon is directed to each of the manifold tubes 336 as shown in FIG. 15. In similar fashion, the gas flow from the mass flow controller 486 is directed through the flexible hose 490 to the argon input port 500 as shown in FIGS. 15 and 18, whereby argon is directed via the conduits 512 and 514 to be discharged through output ports 506 of the rotatable fixture 242. It is understood that the flexible hoses 490 are provided to permit movement of the welding chamber 108 as it is moved into and out of the cabinet 104 by the slide table 262. The flow of gas is directed from the mass flow controller 488 via a flexible hose 490 to the laser lens assembly 204 and in particular to the argon input port 448, whereby argon may be directed via the conduit 450 and a plurality of the jets 452 into that space immediately below the focusing lens 202. This argon flow prevents the submicron oxides produced by the laser welding within the welding chamber 108 from contaminating the lens 202.

The moisture ($H_2O$) sensor 410 is disposed within the welding chamber 108 and is coupled with a moisture monitor 492. The operator and the CNC 126 check the level of moisture within the welding chamber 108 during the purging and welding operations, whereby laser welding may be prohibited if the moisture content is greater than a specified level, e.g. 10 ppm. In addition, an oxygen probe 496 is disposed in the sealing plate 156 for sampling the argon drawn through the peripheral opening between the upper flange 331 of the welding chamber 108 and the sealing plate 156. It is understood that the output of the oxygen probe 496 also serves to provide an indication of the nitrogen content of the air in the chamber 108. The monitoring of the atmosphere in the welding chamber 108 is begun when the welding chamber 108 is disposed to its first, welding position. Each such oxygen probe or monitor 496 includes a calibrating gas inlet so there is a direct flow of gas to the probe 496. The output of the probe 496 is coupled to an oxygen analyzer 494 whose output in parts per million (ppm) may be displayed upon the monitor meter 498. The CNC 126 may be programmed as will be explained so that the welding sequence will not be initiated until the oxygen level is below a programmed value, e.g. 7 ppm. During welding, the sampling of oxygen is automatically discontinued to avoid contamination of the probe 496 with welding debris.

The argon supply system 473 provides a flow of the inert gas, e.g. argon, at a substantially constant flow rate into the welding chamber 108 to maintain the atmosphere within the chamber substantially pure, i.e. below the limits of oxygen and water contamination as defined above. The flow rate is dependent upon whether the laser welding system 100 and in particular its welding chamber 108 is in its loading and unloading cycle, in its purging cycle, or in its welding cycle. As will be explained, the CNC 126 associated with the welding chamber 108 directly controls the mass flow of controllers 484, 486, and 488 to any one of a plurality of flow rates. In particular, there are four potentiometers for each mass flow controller. The CNC 126 actuates a selected potentiometer to provide the gas flow rate required for each of the loading and unloading, purging and welding cycles. To change the program flow rate, the CNC 126 addresses the potentiometer whereby the operator may then adjust the potentiometer to provide the desired flow rate. The flow will appear on a suitable digital display of the controller. The mass flow controllers are calibrated in standard liters per minute (SLPM).

When opening the welding chamber 108 to load and unload a grid 16, the welding chamber 108 should be slid as upon the slide 262 table with respect to the sealing plate 156, rather than swinging the sealing plate 156 open like a door. This sliding technique reduces air/argon turbulence and minimizes the air currents that would otherwise tend to mix the air with the argon in the welding chamber 108. During the load/unloading cycle, argon flow is set at a low rate to maintain the argon atmosphere as pure as possible, typically in the order of 30 CFH. A high flow rate during the load/unload cycle would cause turbulence that would draw air into the welding chamber 108. The loading/unloading of the grid 16 should be accomplished with a mechanical gripping device as described in copending application entitled "WORKPIECE GRIPPING AND MANIPULATING APPARATUS FOR LASER WELDING SYSTEMS AND THE LIKE" (Ser. No. 414,262). If such a gripping device were not employed, the operator would place his hands onto the chamber 108 thereby increasing the air/argon mixing and introducing additional undesirable moisture into the argon atmosphere.

Immediately prior to the welding cycle and after the welding chamber 108 has been returned to its first, welding position, i.e. beneath the sealing plate 156, the mass flow controllers 484 and 486 are controlled by their CNC 126 to effect a relatively high flow rate of the inert gas in the order of 400 CFH, whereby a welding chamber 108, as shown in FIG. 16 and having approximately square dimensions of 14 by 16 by 16 inches, may be purged to lower the oxygen level to below 10 ppm in approximately one minute.

After the purging cycle has been completed, the laser welding system 100 and in particular its CNC 126 is prepared to initiate the laser welding cycle, during which a substantially lowered gas flow rate as controlled by the mass flow controllers 484 and 486 may be introduced into the welding chamber 108. Also, the weld gas sampling pumps for the oxygen probe 496 are automatically shut off to prevent contamination with welding debris. A relatively low flow rate in the order of 30 CFH has been found sufficient to maintain the welding chamber atmosphere below the levels of the purity defined above. As shown in FIGS. 14 and 15, the argon gas is introduced by the manifold tubes 336 and flows through the diffuser plate 330 to produce a laminar gas flow which "floats" the air out of the welding chamber 108. The higher density of argon and the substantially constant flow rate thereof effectively excludes air from the welding chamber 108. The diffuser plate 330 is made of sintered stainless steel fibers with a plate density of approximately 60% and a thickness of 0.125 inch. Further, the diffuser plate 330 covers substantially the entire bottom cross section of the welding chamber 108, with as little non-diffusing supporting structure as possible. As the diffuser area decreases in relation to the cross sectional area of the chamber 108, the time and quantity of argon required to purge the welding chamber 108 of air increases; this is an important consideration when the rapid, high production of grids 16 must be effected. Further, the diffuser plate 330 must be adequately sealed to the sides of the welding chamber 108 so that the incoming argon is forced to diffuse through the plate 330 and not simply bypass the diffuser plate 330 and stream up along the walls 327 and 329. The hold down strip 334 is disposed about the upper peripheral surface of the diffuser plate 330 to prevent it from deflecting under high rates of gas flow that would otherwise tend to deflect the plate 330. Multiple gas inlets in the form of the pair of manifold tubes 336 improve the gas distribution into the welding chamber 108.

In like fashion, the laser lens assembly 204 as shown in FIG. 17 need not be tightly sealed with respect to the cap 422. The gap therebetween provides an opening for the argon gas to escape from the welding chamber 108, when a high argon flow is used to purge the welding chamber 108 of air. Since all gases diffuse within each other, a constant flow of gas is especially required during the welding and purging cycles to maintain a pure atmosphere. Although a small gap is preferably required between the chamber 108 and the sealing plate 156, as well as between the cap 422 and the laser lens assembly 204, the rest of the welding chamber 108 must be free of all leaks. While argon is heavier than air and would tend flow out through any such leaks in the chamber 108, air also can asperate into the chamber 108 through the same hole, thus contaminating the atmosphere of the welding chamber 108.

Figure 22B:
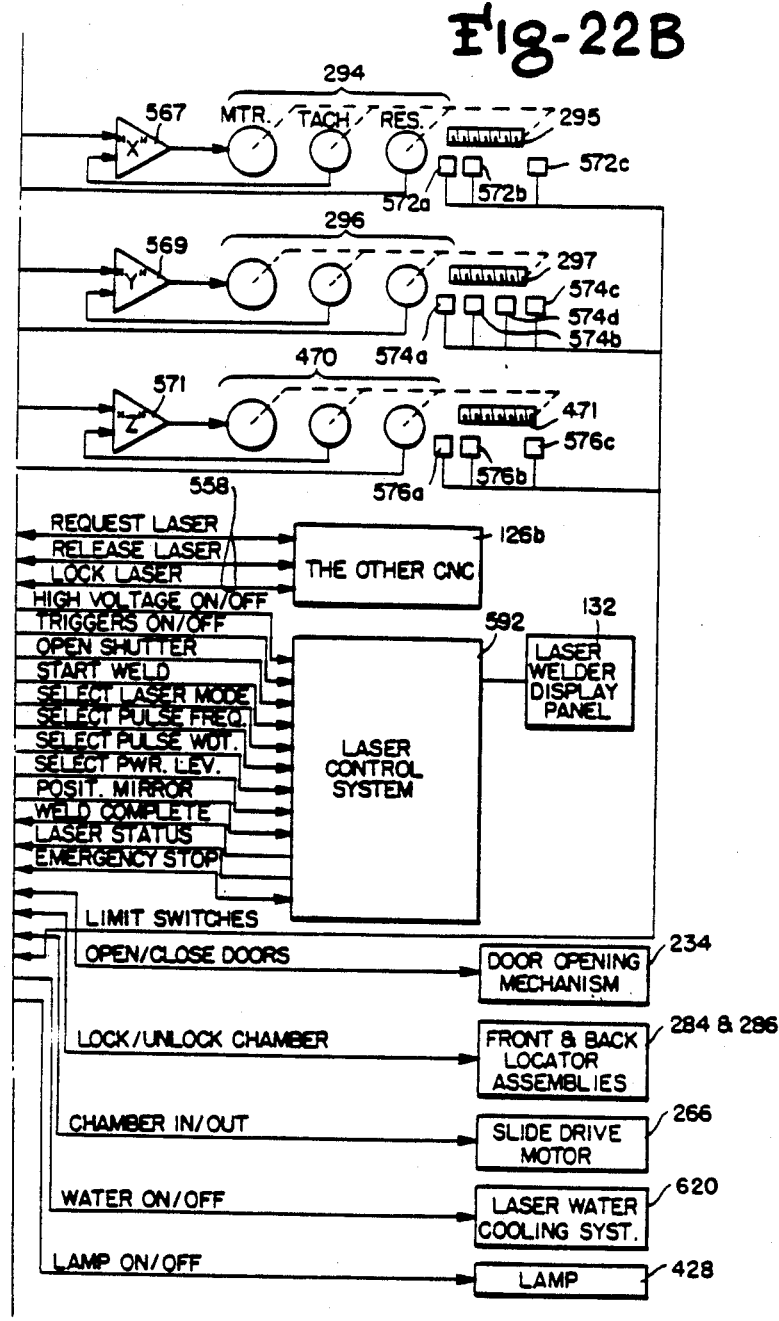

Referring now to FIGS. 22A and 22B, there is shown a functional block diagram of the computer control system 124 and in particular of the first computer numerical control (CNC) 126a and the manner of its connection to the other CNC 126b represented only by a single block within the diagram. In this regard, it is understood that the other CNC 126b comprises the same elements as does CNC 126a, as shown in FIGS. 22A and 22B. The CNC 126a comprises a central processor unit (CPU) and memory identified by the numeral 560. In an illustrative embodiment of this invention, the CNC 126 and in particular its CPU 560 may take the form of that computer as manufactured by the assignee of this invention under their model number 2560. The CPU 560 is provided with 64K of core memory and is particularly adapted in its architecture and in its programming for machine control. It is understood that a standard 2560 CNC contains a basic supervisory software termed herein as either a main task loop system or operating program, which acts in the nature of an executive program to oversee the operation of the entire system. In the data structure as established within the model 2560 CNC, sets of codes, i.e. M, S, and T codes, are used to effect special or customized operations for which the 2560 CNC is readily adapted. In particular, a part program is programmed with the M, S, and T codes which call or bid subroutines termed herein application subroutines, whereby selected functions including the control of the argon flow and of selecting a particular welding mode are carried out. Further, the part program is programmed also with X, Y, and Z codes that control the movement imparted by the X and Y drive motors 294 and 296 to its work piece, and the Z drive motor 470 to the laser lens assembly 204, respectively. In particular, the X and Y codes designate the amount of movement or destination to which the work piece in the form of the fuel rod grid 16 is to be moved between welding steps. In like fashion, the Z code controls the amount of movement to be imparted to the laser lens assembly 204, whereby the laser beam 178 is focused upon the fuel rod grid 16. In particular, the Z codes are needed to effect the notch seam welds 40, wherein the rotatable fixture 242 is rotated out of its normal plane perpendicular to the laser beam 178 thereby necessitating the refocusing of the laser lens assembly 204. In addition, the memory of the CPU 560 has a special storage area known as the Part Program Storage Area, which is used to store the part program for execution by the operating system program. As will be explained, the part program basically designates the steps of the process of welding in a controlled, inert atmosphere and more specifically, is programmed with the M, S and T codes, whereby the mode of welding and the rate of argon flow are effectively controlled. The Parts Program Storage Area stores the part program as described below in FIGS. 24A and 24B and the application routines are described in FIGS. 25A to 25R. The part program is entered into the memory of the CPU 560 by a magnetic tape drive 586 via interface 590; in an illustrative embodiment of this invention, the magnetic tape drive 586 may take the form of that drive as manufactured by Qantex under its number 220. Alternatively, the part program can be stored on a paper tape and entered via a paper tape reader 584 via a microprocessor interface 588; illustratively, the paper tape reader 584 may take the form of that reader as manufactured by Decitex. Additionally, the microprocessor interface 588 also permits display of data messages upon the CRT 133. In addition, various parameters may be entered into the memory of the CPU 560 by the operator upon an alpha-numeric key board 131 via the interface 588. The alpha-numeric key board 131 and the CRT 133 are mounted on the computer housings 129a and 129b as shown in FIG. 4.

As shown in FIGS. 22A and 22B, the CPU 560 is associated through a plurality of closed loop axis drive and control boards 566, 568 and 570 associated respectively with the X and Y drive motors 294 and 296, and with the Z axis drive motor 470. It is understood that each of the drive motors is associated with its tachomoter and resolver to provide an indication of the rate of travel, as well as the distance of travel, whereby extremely accurate control of the movement of the X, Y, and Z tables 290, 292 and 458 may be effected. Further, the control output signal as derived from the control board 566 is applied to a servo amplifier 567 to be compared with a signal indicative of motor speed, to provide an output signal to actuate the X drive motor 294. As shown schematically, each of the motors 294, 296, and 470 is associated with a lead screw 295, 297, and 471 that effects drive of its corresponding X, Y and Z tables 290, 292 and 458. A set of limit switches 572 are associated with the lead screw 295 to sense the position of the lead screw 295 and, therefore, its X positioning table 290 and to provide signals via an input and output interface 562 to the CPU 560. In particular, the limit switches 572a and 572c provide output signals indicative that the X positioning table 290 has been disposed to its forward and rearward most limits of travel, whereas the limit switch 572b indicates that the X positioning table 290 is disposed at its home or reference position with respect to the laser beam 178. A similar set of limit switches is associated with the lead screw 471 driving the Z axis table 458. A set of limit switches 574a, b, and c is provided with the lead screw 297 driving the Y table 292; a fourth limit switch 574d is associated with the lead screw 297 for detecting when the Y positioning table 292 has been disposed in its center position, i.e. that position at which the welding chamber 108 may be removed from the cabinet 104.

As seen in FIGS. 22A and 22B, a host of peripheral devices are associated with and controlled by the CPU 560 by optically isolating interfaces 562 and 564. In particular, the other CNC 126b interchanges a set of "handshaking" signals via a CNC link 558 and the interface 562 with the CPU 560, whereby each of the CNC's 126a and 126b may bid for and obtain control of the beam switching mirror 172 in a time shared fashion. As explained in the co-pending application entitled "PLURAL COMPUTER CONTROL FOR SHARED LASER MACHINING" (Ser. No. 414,204) each of the two CNC's 126a and 126b may bid for and subsequently control the beam switching mirror 172 to direct the laser beam 178 into its welding chamber 108. After use, the CNC 126 generates a release laser signal, whereby the other CNC 126 may request and subsequently lock the laser for its own use.

The laser system 102 may in one illustrative embodiment of this invention take the form of that laser system as manufactured by Raytheon under their model number SS500 and comprises the laser power supply 120 as shown in FIG. 4, as well as a laser control system 592 that is coupled by the interface 562 to the CPU 560. As shown in FIG. 22B, the laser control system 592 is coupled to a laser welding display panel 132 which, as shown in FIG. 4, is mounted upon the laser power supply 120 and is shown in detail in FIG. 23A. The laser welding display panel 132 includes an array of lamps and pushbuttons that control and display the condition of the laser system 102 and its control system 592. Before the laser rod 170 may be fired to emit its beam 177 of laser radiation, the laser triggers must be turned on or enabled. An illuminated pushbutton 600 is actuated to apply high voltage from the laser power supply 120 to the pulse forming network, provided that the laser power supply is in its standby mode. When the laser power supply provides a high voltage, the LASER HV ON pushbutton 600 is illuminated. A SHUTTER OPEN lamp 602 is illuminated when the dump shutter 190 is disposed in its open position and the BRH safety shutter 212 is disposed in its open position, whereby the laser beam 177 is directed into one of the welding chambers 108 and the TV camera 206 is permitted to view the image of the fuel rod grid 16. A LASER FIRING lamp 604 is illuminated when the laser rod 170 is lasing, i.e. when its excitation lamps 186 are triggered, the inner-cavity shutter 188 opens and its CNC 126 has gained control of the laser system 102. A BEAM SW IN position lamp 608 is illuminated when the beam switching mirror 172 is disposed in position to direct the laser beam into the right welding chamber 108a, whereas a BEAM SW OUT position lamp 612 is illuminated when the beam switching mirror 172 is in its alternate position, whereby the laser beam 177 is directed into the other, left welding chamber 108b. A GAS ON lamp 610 is illuminated when a particular argon gas flow rate has been selected by its CNC 126. A HOME MIRROR pushbutton 614 is pressed to direct the beam switching mirror 172 to its home or reference position. A TRIGGERS ON lamp 616 is pressed to enable the laser lamp trigger circuits, provided that the laser high voltage has been turned on. A LASER HV OFF pushbutton 618 is pressed to remove the high voltage output from the laser power supply 120. The meters 498 and 492 are digital meters continuously displaying the oxygen content and the water content of the welding chamber 108.

As seen in FIGS. 22A and 22B, the CPU 560 provides control signals via the optically isolated interface 562 to actuate the laser control system 592. In particular, interface outputs are applied to the laser control system 592 to turn on or off the high voltage output of the power supply 120, to enable the laser lamp triggers, to dispose the dump shutter 190 and the BRH safety shutter 212 to their open positions, to initiate the welding process, to select a particular mode of laser welding dependent on one of the codes M51 through M54, to set the pulse frequency (REP RATE) as derived from the T code, to set the power level as derived from the S code, to set the pulse width, and to position the beam switching mirror 172. Signals are developed by the laser control system 592 indicative of the completion of a weld as well as the laser status to be applied via the optically isolated interface 562 to the CPU 560. Upon generation of emergency stop signals, the operations of the laser welding system 102 and in particular of the laser control system 592 may be stopped in an emergency.

Further, signals are developed by the CPU 560 and are transmitted by the optically isolated interface 562 to control the door opening mechanism 234 as shown in FIG. 7 to either open or close the doors 114 of the cabinet 104. Signals are applied to lock or unlock the welding chamber 108 and, in particular, are applied to each of the front and back locator assemblies 284 and 286 as shown in FIG. 9. The output signals as derived from the sets 572, 574, and 576 of limit switches are applied to the interface 562. Signals are also applied to a laser water cooling system 620. The laser flash or excitation lamps 186 and the cavity as defined by the mirrors 182 and 184 are cooled by the closed-loop water cooling system which provides clean, pure, temperature-regulated water at the required pressure and flow rate. Though not shown, it is well understood in the art that the laser water cooling system includes a pump, a water-to-water heat exchanger, a reservoir, a deionizer, a filter, and a temperature regulator. Heat from the laser rod 170 and the beam absorber 194 is discharged to the water and removed from the system. In addition, a control signal is applied to the lamp 428 of the laser lens assembly 204, to illuminate the fuel rod grid 16, whereby the X-Y positioning system 288 may be adjusted along either the X or Y axis to align the starting point of the fuel rod grid 16 with respect to the laser beam 178.

Inputs are provided from the oxygen probe 496 and the moisture sensor 410 that are disposed with respect to the welding chamber 108 to provide analog signals indicative in parts per million of the oxygen and water within the welding chamber atmosphere. In similar fashion, the thermopile 218 as disposed with the shield tube 216 provides an analog signal indicative of the power of the laser beam 178 directed therein. The outputs of each of the probe 496, the sensor 410, and the thermopile 218 are applied to corresponding digital volt meters 578, 580, and 582, which convert the input analog signals to corresponding digital signals to be applied via the optically isolated interface 564 to the CPU 560. The interface 564 provides appropriate meter select signals to each of the digital volt meters 578, 580, and 582 to selectively apply only one digital signal at a time via the interface 564 to the CPU 560. Depending upon the operation of the laser welding system 100, the CPU 560 applies signals via the optically isolated interface 564 to each of the mass flow controllers 488, 484, and 486 to control the rate of argon flow respectively to the laser lens assembly 204, the rotatable fixture 242 and the welding chamber 108. In similar fashion, signals are applied to the B axis motor 388, whereby the positioning wheel 358 and the rotatable fixture 242 may be rotated. As explained above, the angular position of the positioning wheel 358 is sensed by the plurality of proximity switches 402a-d to provide a binary signal that is applied by the interface 564 to the CPU 560.

Referring now to FIG. 23B, there is shown the machine function panel (MFP) 130 as mounted on the computer housing 129 as shown in FIG. 4 for providing, as suggested in FIG. 22A, inputs via the optically isolated interface 564 to the CPU 560. The various control functions as implemented by the pushbuttons and selector switches of the machine function panel 130 will now be described. The EMERGENCY STOP pushbutton 680 is actuated by the operator in an emergency situation to turn off the CNC 126. When pressed, all digital outputs as derived from the CPU 560 are deactivated, and all auxiliary systems such as the argon supply system 473, the laser system 102, and the X and Y drives 294 and 296, and the Z drive 470 are stopped. A CONTROL ON pushbutton 668 is actuated to turn the CNC 126 to its ON state, whereby power is applied to the various logic elements and various data registers are cleared. When the pushbutton 668 is pressed and held, the lamps back-lighting various of the push buttons of the machine function panel 130 are energized to provide a suitable test thereof. A CLEAR pushbutton 656 is actuated to clear the CNC 126 and in particular to clear all active commands as stored in the stored program active buffer of the CPU 560, and selected outputs thereof are reset. The M and G codes as set in the course of the parts program are reset to initial conditions. In the course of the execution of the various programs, the pushbutton 656 is illuminated to request a clear function from the operator. A MESSAGE pushbutton 638 is periodically illuminated or flashed to indicate that there is a diagnostic message to be displayed on the CRT 133. When pressed by the operator, all active diagnostic messages are cleared from the display and the lamp illuminating the push button 638 deactuated. A TEST I lamp 636 is illuminated to indicate that the welding chamber 108 is disposed in its second, out or calibrating position and that the cooling water directed to the thermopile 218 has been turned on. A SERVO ON pushbutton 666 is operator actuated to apply AC power to the X and Y axes drive motors 294 and 296, and the Z axis drive motor 470, and is illuminated when these drives are active. A PIN OUT pushbutton 634 is pressed and held by the operator to actuate the front and back locator assemblies 284 and 286, whereby their locating pins 316 and 319 are removed to un-pin the slide table 262 for subsequent movement. The CNC 126 must be in its manual mode to permit this function. The PIN OUT pushbutton 634 is illuminated when the locating pins 316 and 319 are fully retracted.

A PIN IN pushbutton 652 when pressed and held by the operator actuates the front and back locator assemblies 284 and 286 to dispose their locating pins 316 and 319 into the positioning openings within the slide table 262. Similarly, the CNC 126 must be in its MANUAL mode to permit this function. When the locating pins 316 and 319 are fully inserted into their positioning openings, the PIN IN pushbutton 652 is illuminated. A DOOR OPEN pushbutton 632 is pressed and held by the operator to actuate the door opening mechanism 234. The CNC 126 must be in its MANUAL mode to permit this function to be carried out; when the door 114 has been disposed to its fully open position, the DOOR OPEN pushbutton 632 is illuminated. A DOOR CLOSE pushbutton 650 is pressed and held to activate the door opening mechanism 234 to close the chamber door 114. The CNC 126 must be in its MANUAL mode to permit this function. When the cabinet door 114 is disposed to its completely closed position, the DOOR CLOSE pushbutton 650 is illuminated. A CHAMBER OUT pushbutton 630 is pressed and held by the operator to actuate the slide drive motor 266, whereby the slide table 262 and its welding chamber 108 are driven to its second, out position. In order to drive the slide table 262, the CNC 126 must be in its MANUAL mode, the laser lens assembly 204 must be fully retracted as sensed by the limit switch 576b, and the Y positioning table 292 must be disposed in its center position as detected by the limit switch 574d. When the slide table 262 has been disposed in its second, out position, the CHAMBER OUT pushbutton 630 is illuminated. In similar fashion, a DOOR CLOSE pushbutton 650 is pressed and held to actuate the slide drive motor 266 in reverse direction to return the slide table 262 to its first, welding position. In order to drive the slide table 262 in, the CNC 126 must be in its MANUAL mode, the laser lens assembly 204 fully retracted, the door 114 open, the front and back locator assemblies 284 and 286 actuated to withdraw their locating pins, and the Y positioning table 292 centered. When the slide table 262 has been disposed in its first, welding position, the CHAMBER IN pushbutton 648 is illuminated.

A FEEDHOLD pushbutton 660 is initially pressed to set the FEEDHOLD function, whereby each of the X, Y, and Z drive motors 294, 296, and 470 is deactuated; as a result, the movement of the welding chamber 108 along its X or Y axes, except for the movement of the rotatable fixture 242 about its B axis, and the movement of the laser lens assembly 204 along its Z axis are inhibited. Upon a second pressing of the FEEDHOLD pushbutton 660, the FEEDHOLD function is released, thereby permitting the movement of the welding chamber 108 along its X and Y axes and the movement of the laser lens assembly 204 along its Z axis. A CYCLE START pushbutton 658 is actuated by the operator to initiate execution of the part program data when the CNC 126 is in its AUTO, SINGLE CYCLE or MANUAL data input MDI modes. The CYCLE START pushbutton 658 will be illuminated when the CNC 126 is executing part program data. A MANUAL pushbutton 678 is pressed to place the CNC 126 in its MANUAL mode of operation; when in its MANUAL mode, the MANUAL pushbutton 678 is illuminated. An MDI SINGLE pushbutton 676 is pushed by the operator to dispose the CNC 126 to its manual data input MDI SINGLE mode of operation; when in the MDI SINGLE mode, the pushbutton 676 is illuminated. The MDI SINGLE mode is a diagnostic tool and when this function is entered, the operator is permitted to enter steps of a part program via the keyboard 131 into a designated area or buffer of the CPU memory. Upon depression of the CYCLE START pushbutton 658, the entered program is read out and executed one step at a time. An MDI CONTINUOUS pushbutton 674 is pushed to dispose the CNC 126 in its MDI CONTINUOUS mode of operation. The MDI CONTINUOUS mode is similar to the MDI SINGLE mode, except that upon depression of the START CYCLE pushbutton 658, the entire operator entered program is read out as if in its automatic mode. A SINGLE CYCLE pushbutton 672 is pressed by the operator to dispose CNC 126 into it SINGLE CYCLE mode and when in that mode, the pushbutton 672 is illuminated. An AUTO pushbutton 670 is depressed to place the CNC 126 in its AUTOMATIC mode of operation and when in that mode, the AUTO pushbutton 670 is illuminated.

A % FEED selector switch 682 has twelve positions to provide a manual override of the drive feed rate at which the X and Y drive motors 294 and 296 drive respectively the X and Y positioning tables 290 and 292. As indicated, the feed rate is variable in 10% increments from 10% thru 120% dependent upon the position of the percent FEED switch 682. A JOG MODE selector switch 684 has seven positions for selecting one of the following axis JOG MODES: FAST (HIGH), SLOW (LOW), 1.000, 0.1000, 0.0100, 0.0010, and 0.0001. The FAST and SLOW modes are "slew" type jogs where a substantially continuous movement is imparted to the X and Y positioning tables 290 and 292, whereas in the remaining modes, incremental movements of the designated length are imparted to the X and Y positioning tables 290 and 292. An X IN pushbutton 622 is pressed by the operator to cause an X-axis jog motion in the minus direction or into the positioning module 106, i.e. in an upward direction as shown in FIG. 9. An X OUT pushbutton 640 is pressed to cause an X-axis jog motion in the plus direction or out of the positioning module 106, i.e. in a downward motion as shown in FIG. 9. A Y LEFT pushbutton 624 is pressed by the operator to cause a Y-axis jog motion in the plus or left direction, i.e. the welding chamber 108 is moved to the left as seen in FIG. 9. A Y RIGHT pushbutton 642 is pressed by the operator to cause a Y-axis jog motion in the minus or RIGHT direction, i.e., the welding chamber 108 is moved to the right as seen in FIG. 9.

A Z UP pushbutton 626 is depressed by the operator to cause a Z-axis jog motion in the minus direction; i.e. the Z axis drive motor 470 is energized to drive the Z axis table 458 in a minus or UP direction as shown in FIG. 7. A Z DOWN pushbutton 644 is pressed by the operator to cause a Z-axis jog motion in the plus direction, whereby the Z-axis table 458 and the laser lens assembly 204 carried thereby are disposed in a plus or DOWN direction as seen in FIG. 7. A B CW pushbutton 628 is pressed to cause a B axis motion in the plus or fixture clockwise motion if the CNC 126 is disposed in its MANUAL mode. In particular, upon pressing of the pushbutton 628, the B axis drive motor 388 is actuated to rotate the positioning wheel 358 in its clockwise direction as shown in FIG. 7. A B CCW pushbutton 646 is depressed by the operator to cause a B axis motion in the minus or counterclockwise direction if the CNC 126 is disposed in its MANUAL mode. In particular, the B-axis drive motor 388 is actuated to drive the positioning wheel 358 in the counterclockwise direction as seen in FIG. 7.

The process of welding the inner grid straps 20 together and in turn to the outer grid straps 22 and the resultant grid 16 to the guide sleeves 36 has been described above with respect to FIGS. 3A to 3K; in these figures, there is illustrated the series of movements of the fuel rod grid 16 in each of its X, Y, and Z axes to appropriately position the fuel rod grid 16 with respect to the laser beam 178, whereby each of the intersect welds 32, the corner seam welds 30, the slot and tab welds 34, and the notch seam welds 40 may be effected. The inner and outer grid straps 20 and 22 are assembled to form the fuel rod grid 16 as explained in the copending applications entitled "STRAP AND VANE POSITIONING FIXTURE FOR FUEL ROD GRID AND METHOD" (Ser. No. 414,197) and "GRID ASSEMBLY FIXTURE, RETENTION STRAP AND METHOD" (Ser. No. 414,198). Next, the fuel rod grid 16 is disposed upon the welding fixture 542 shown in FIG. 15 and described in the copending application entitled "WELDING PLATES FOR A FUEL ROD GRID" (Ser. No. 414,265); the welding fixture 542 in turn is releasably affixed by the locating pins 524 to the rotatable fixture 242 rotatably disposed within the welding chamber 108. As explained above, the fuel rod grid 16 may be rotated about its B axis to dispose the fuel rod grid 16 in position to receive the laser beam 178 to effect the notch seam welds 40. The X-Y positioning system 288 is selectively actuated to move the X and Y positioning tables 290 and 292 in a sequence of incremental steps along their X and Y axes to position the fuel rod grid 16 with respect to the laser beam 178, whereby the intersect welds 32 are effected, and after rotation upon the rotatable fixture 242, the slot and tab welds 34 and the corner seam welds 30 are effected.

The machine control for this process is provided by the CNC 126 and in particular by the CPU 560 which includes a memory for storing the part program 700, which will now be described with respect to FIGS. 24A and 24B. The part program 700 is entered when in step 702, the operator places the CNC 126 in its automatic mode by pressing the AUTO pushbutton 670 on the machine function panel 130. Next, the operator enters a command on the alpha-numeric keyboard 131 panel to call the part program for execution. Next, the operator presses the CYCLE START pushbutton 658. Next, in step 708. A programmed M81 code calls a LOAD/UNLOAD CHAMBER application subroutine to effect the actuation of the slide drive motor 266 to drive the slide table 262 from its first welding to its second, out position, whereby an operator may load an assembled, though not yet welded fuel rod grid 16 and its welding fixture 542 onto the rotatable fixture 242. The fuel rod grid 16 and its welding fixture 542 are locked by the locating pins 524 in a predetermined position on the rotatable fixture 242 with respect to the laser beam 178. The LOAD/UNLOAD CHAMBER subroutine is explained in greater detail with respect to FIG. 25B. In step 710, the operator loads the fuel rod grid 16 and its welding fixture 542 onto the rotatable fixture 242, with the assistance of the load/unload manipulator as described in the copending application entitled "WORK PIECE GRIPPING AND MANIPULATING APPARATUS FOR LASER WELDING SYSTEMS AND THE LIKE" (Ser. No. 414,260). At the end of step 708, the execution of the part program is suspended until in step 712, the operator presses the CYCLE START pushbutton 658 to recommence the execution of the part program. Next, step 714 calls the LOAD/UNLOAD application subroutine to reload the chamber 108 into its first or welding position beneath the laser beam 178. Once repositioned, an M code is used to call the CHAMBER ENVIRONMENT CHECK application subroutine before the welding chamber 108 is purged of impurities such as oxygen and water by introducing argon at a relatively high rate via the manifold tubes 336 and the diffuser plate 330, whereby the heavier argon displaces the air driving it out through the spacing between the chamber's upper flange 331 and the sealing plate 156. The particular argon flow rate is set by an M code, whereby the mass flow controller 484 is set to provide a high rate of flow to the welding chamber 108. In similar fashion, the mass flow controllers 486 and 488 associated with the rotatable fixture 242 and the laser lens assembly 204 are set to a higher flow rate to hasten the purging of the welding chamber 108. The particular M code calls the SELECT GAS FLOW RATE application routine as will be further described with respect to FIG. 25I. Next, step 716 of the part program sets the M91 codes to effect rotation of the rotatable fixture 242 and in particular to actuate the B axis rotation drive 238 to effect rotation of the fixture 242. In particular, the M91 code as executed by step 716 bids the ROTATE FIXTURE application subroutine as will be described in greater detail in FIG. 25R. Step 718 serves to initiate or bid the CHAMBER ENVIRONMENT CHECK application subroutine to monitor the environment within the welding chamber 108 as to its oxygen and water content and to prevent the further execution of the part program until the levels of oxygen and water are below predetermined levels. The CHAMBER ENVIRONMENT CHECK application subroutine will be further described with respect to FIG. 25F.

After step 718 has determined that the environment within the welding chamber 108 is sufficiently pure, step 720 responds to X and Y codes to controllably drive the X and Y positioning tables 290 and 292, whereby the initial weld to be made is positioned along the Z axis coinciding with the laser beam 178. The initial welding position is identified by a set of X and Y codes which are interpreted to provide appropriate control signals to the X and Y drive motors 294 and 296. In similar fashion, a Z code is interpreted and control signals are applied to the Z axis drive motor 470, whereby the laser lens assembly 204 is positioned to focus the laser beam 178 onto the initial weld of the fuel rod grid 16. After completion of these steps, step 720 brings the part program to a stop. In step 722, the operator may manually control by appropriate actuation of the X IN pushbutton 622, the X OUT pushbutton 640, the Y LEFT pushbutton 624 and the Y RIGHT pushbutton 642, the position of the X and Y positioning tables 290 and 292, whereby the initial weld of the fuel rod grid 16 is precisely aligned with respect to the laser beam 178. To this end, the BRH safety shutter 212 is opened, permitting the operator to view the grid image as displayed upon the CRT 133 and obtained from the alignment TV camera 206. The lens of the camera 206 has an electronic rectical by which the operator may align the initial weld precisely with respect to the laser beam 178. In similar fashion, the operator manipulates the Z UP pushbutton 626 and the Z DOWN pushbutton 644 to control the movement of the laser lens assembly 204 to precisely place the laser lens 202, whereby the laser beam 178 is focused onto the fuel rod grid 16.

In order to reinitiate the execution of the parts program, the operator in step 724 presses the CYCLE START pushbutton 658. Next, in step 726, the part program calculates the differences between the X and Y coordinates of the initial weld position and of the aligned position, i.e. the new grid position after being aligned in step 722, the differences being known as the X and Y offsets. Similarly, the difference between the initial home position along the Z-axis and the focused position of the laser lens assembly 204 provides a Z offset. The X, Y and Z offsets are stored in a designated area in memory and are used by the CNC 126 to calculate the precise position of each weld taking into account the adjusted or offset position of the fuel rod grid 16.

Figure 25H:
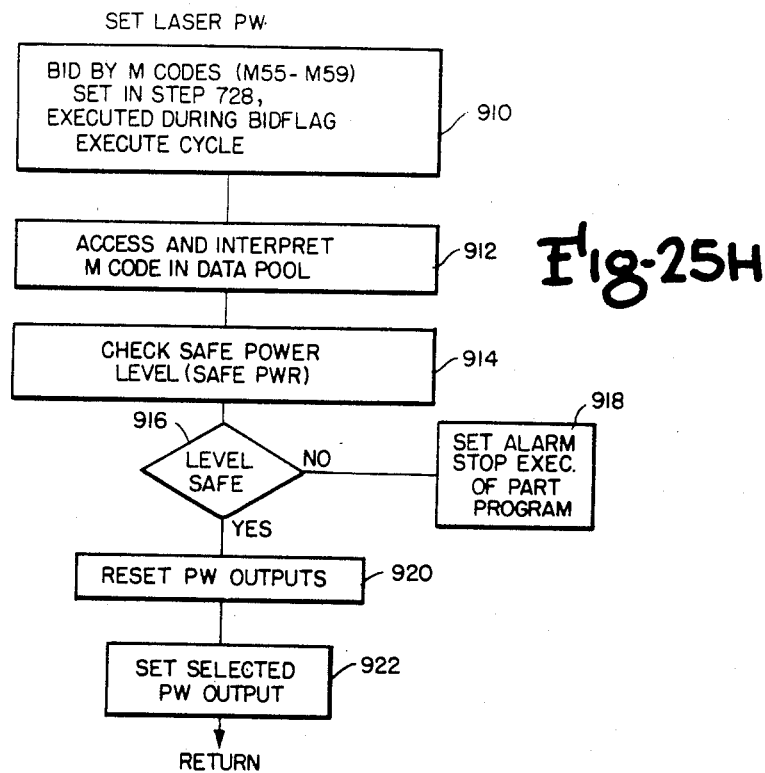
FIGS. 25A-25R are application subroutines that are bid by M, S, and T codes set in part by the part program as illustrated in FIGS. 24A and 22B.
FIG. 25S is a curve defining the characterizing parameters of the laser pulse forming network.
Figure 25I:
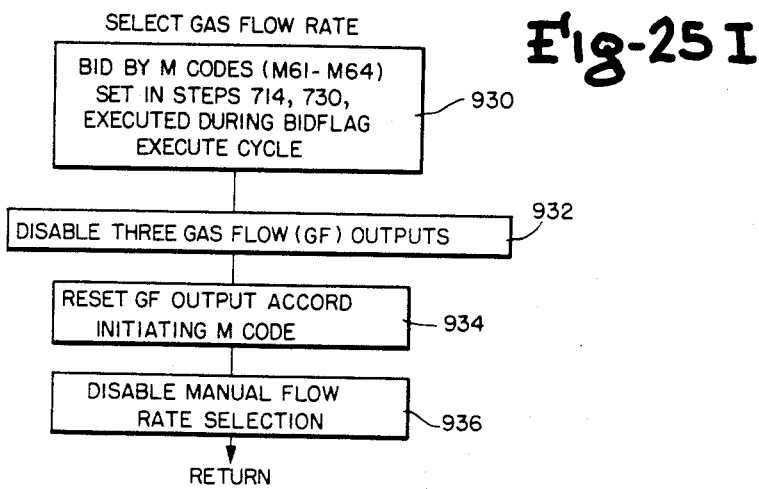
Figure 25J:
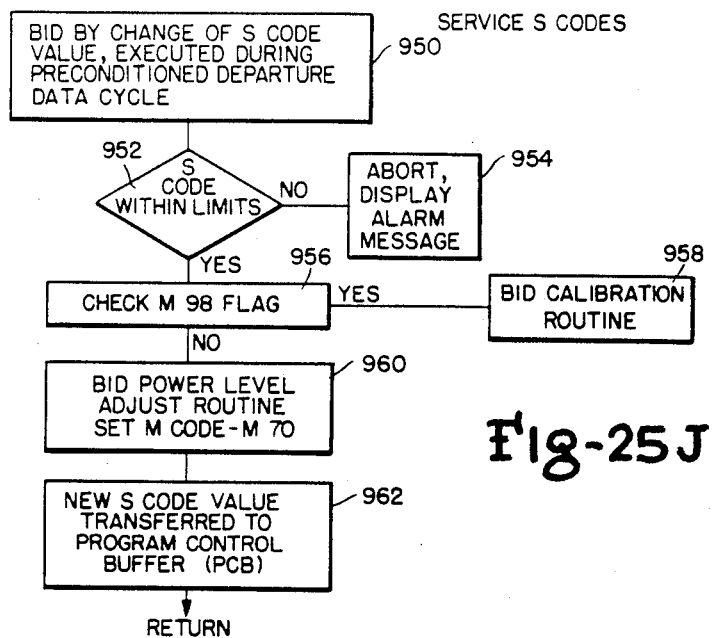
Figure 25L:
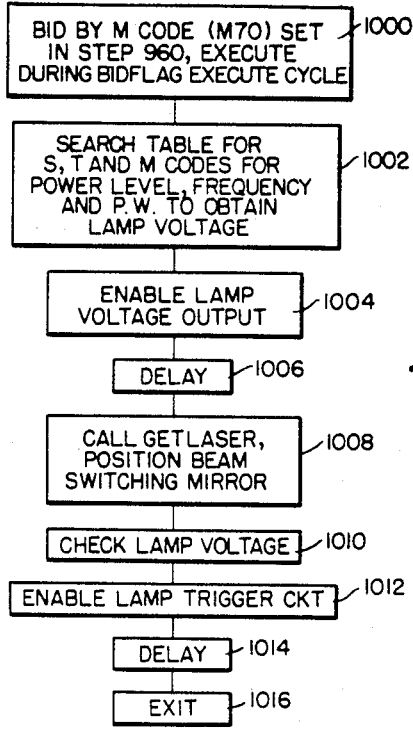

Next, step 728 sets the various parameters of the laser system 102 and in particular programs the S, T, and M codes that determine the power level, the pulse frequency, the pulse width, and the type of weld, i.e. which of the intersect welds 32, the corner seam welds 30, the slot and tab welds 34, and the notch seam welds 40, to be performed. In particular, the power level of the laser system 102 is determined by an S code which is serviced by a SERVICE S CODE application subroutine as will be explained in detail with respect to FIG. 25J. In similar fashion, the pulse frequency is set by a T CODE which is serviced by the SERVICE T CODE application subroutine as will be explained in detail later with respect to FIG. 25K. The pulse width is set by one of the M CODES M55-M60 corresponding to widths of 1 to 6 ms, which bid the execution of the SET LASER PULSE WIDTH application subroutine as shown in FIG. 25L. In similar fashion, there are four types of welds corresponding to the M codes M51 through M54, which bid the execution of the SET LASER MODE application subroutine as will be explained in greater detail in FIG. 25G. Next, step 730 sets by use of one of the M CODES M61 through M64 the particular argon flow rate that is required for a welding operation and in particular bids the SELECT GAS FLOW RATE application subroutine, as will be explained in detail later with respect to FIG. 25I. Next, in step 732, the set one of the M codes M51 through M54 bids the PERFORM LASER WELD application subroutine, as will be explained in greater detail with respect to FIG. 25N. Generally, the PERFORM LASER WELD application subroutine first requests or bids for the use of the laser via the GET LASER application subroutine as shown in FIG. 25Q, whereby the other CNC 126b is checked by examining the REQUEST LASER and LOCK LASER outputs of the other CNC 126b and if present, the CNC 126a waits until the appearance of a RELEASE LASER output from the other CNC 126b, at which time the CNC 126a requests and thereafter locks the laser for its use. Upon obtaining the use of the laser system 102, the CNC 126a disposes the beam switching mirrors 172 to direct the laser beam 178 to its welding chamber 108. Thereafter, the positions of the X and Y positioning tables 290 and 292 are checked to see if they have come to rest in their proper position and a positioning time out period is permitted to expire before firing the laser rod 170. Then, step 732 waits for a LASING COMPLETE signal indicating that the welding step has been completed before releasing the beam switching mirror 172 and commanding the X-Y positioning system 288 to move the fuel rod grid 16 to its next position in preparation for performing the next in a series of welds. Next, step 736 decides whether the particular type of weld as set by one of the M codes M51 through M54 has been completed and if not, the part program returns to step 732 to perform the next weld and then in step 734, to move the fuel rod grid 16 to its next weld position. Thereafter, step 735 determines whether the M code M88 has been programmed to bid for the WAIT FOR OTHER CNC application subroutine, whereby a signal is transmitted to the other CNC 126b to indicate that a series of welds has been completed and then to wait for a response from the other CNC 126b; during this interval, the part program execution is suspended.

After a particular type of weld has been completed, the part program moves to step 738 where the part program stops and examines which of the M codes M51 through M54 has been programmed to determine the next type of weld. Thereafter, in step 740, a decision is made as to whether all of the types of welds necessary to complete the welding of at least one side of the fuel rod grid 16 has been made and if not, the part program returns to step 716, whereby the sequence of steps 716 through 738 is repeated. The first sequence of welding steps as illustrated in FIGS. 3A to 3D is carried out on the vane side of the nuclear fuel rod grid 16 before it is then necessary to remove the fuel rod grid 16 from its welding chamber 108 to be rotated and returned to the welding chamber 108. In step 742, the laser system 102 is turned off by sending a signal to dispose the dump shutter 190 to a position as shown in full line of FIG. 6 to direct the laser beam 177 into the laser absorber 194.

Thereafter, step 744 sets the M code M82 to bid for the LOAD/UNLOAD CART application subroutine, whereby the slide drive motor 266 is actuated to direct the slide table 262 to its second, out position, whereby the fuel rod grid 16 may be removed from the welding chamber 108. At this point, the operator brings the manual manipulator to remove the fuel rod grid 16 and its welding fixture 542 from the welding chamber 108 to perform those manual operations in preparation for the next sequence of welding steps. For example, after the intersect welds 32 on the vane side of the fuel rod grid 16 are completed as in the steps shown in FIGS. 3A to 3D, the fuel rod grid 16 is removed and rotated so that the intersect welds 32 as appearing on the opposite or guide sleeve side of the fuel rod grid 16 may be completed as seen in the steps of FIGS. 3E to 3H. After the intersect welds on both sides of the fuel rod grid 16 have been completed, the grid 16 is removed and the guide sleeves 36 are inserted therein, before effecting the notch seam welds 40 as shown in the steps 3I to 3L.

Referring now to FIG. 25A, there is shown a CALIBRATION part program whereby the operator may manually enter via the alpha-numeric keyboard 131, a command to call the CALIBRATION part program. First in step 750, the operator presses the AUTO pushbutton 670. Thereafter in step 752, the operator types on the keyboard 131, a command calling the CALIBRATION part program and then in step 754, presses the CYCLE START pushbutton 658. Next, step 756 bids for the LOAD/UNLOAD CART application subroutine, whereby the slide table 262 and therefore the welding chamber 108 are disposed to their second, out position, whereby as shown in solid line in FIG. 6, the laser beam 178 is directed into the shield tube 216 and onto the thermopile 218. Next, in step 758, the CNC 126 controls the Z drive motor 470 to cause the laser lens assembly 204 to focus the laser beam into the termopile 218. The laser system 102 is set up in step 728', which performs the same operations as step 728 as shown in FIG. 24B, i.e. to set the power level according to its S code, the pulse frequency according to its T code, the pulse width according to its M code, and the weld type according to its M code, before in step 759 calling the CALIBRATION application subroutine. In particular, step 759 sets the M code M98, whereby the LASER CALIBRATION application subroutine is bid. In this way, the operator at selected times may effect a calibration of the laser system 102 noting that the efficiency of the laser rod 170 and its excitation lamps 186 attenuate with intense use of this laser welding system 100, i.e. the laser welding system 100 continuously excites the laser rod 170 to thereby ensure a high work duty ratio and as a result, a high production rate of the fuel rod grids 16. It is contemplated that the laser excitation lamps 186 may need to be replaced as often as every two days. In the course of continuous use, the operator will wish to check the actual power output of the laser rod 170 and to measure by the thermopile 218 its energy level as impinging on the work piece, whereby an adjustment of the output of the laser high voltage supply may be effected to maintain the intensity of the laser beam 178 at a level whereby uniform welds are achieved, regardless of the work life of the laser rod 170 or its excitation lamps 186.

Figure 25M:
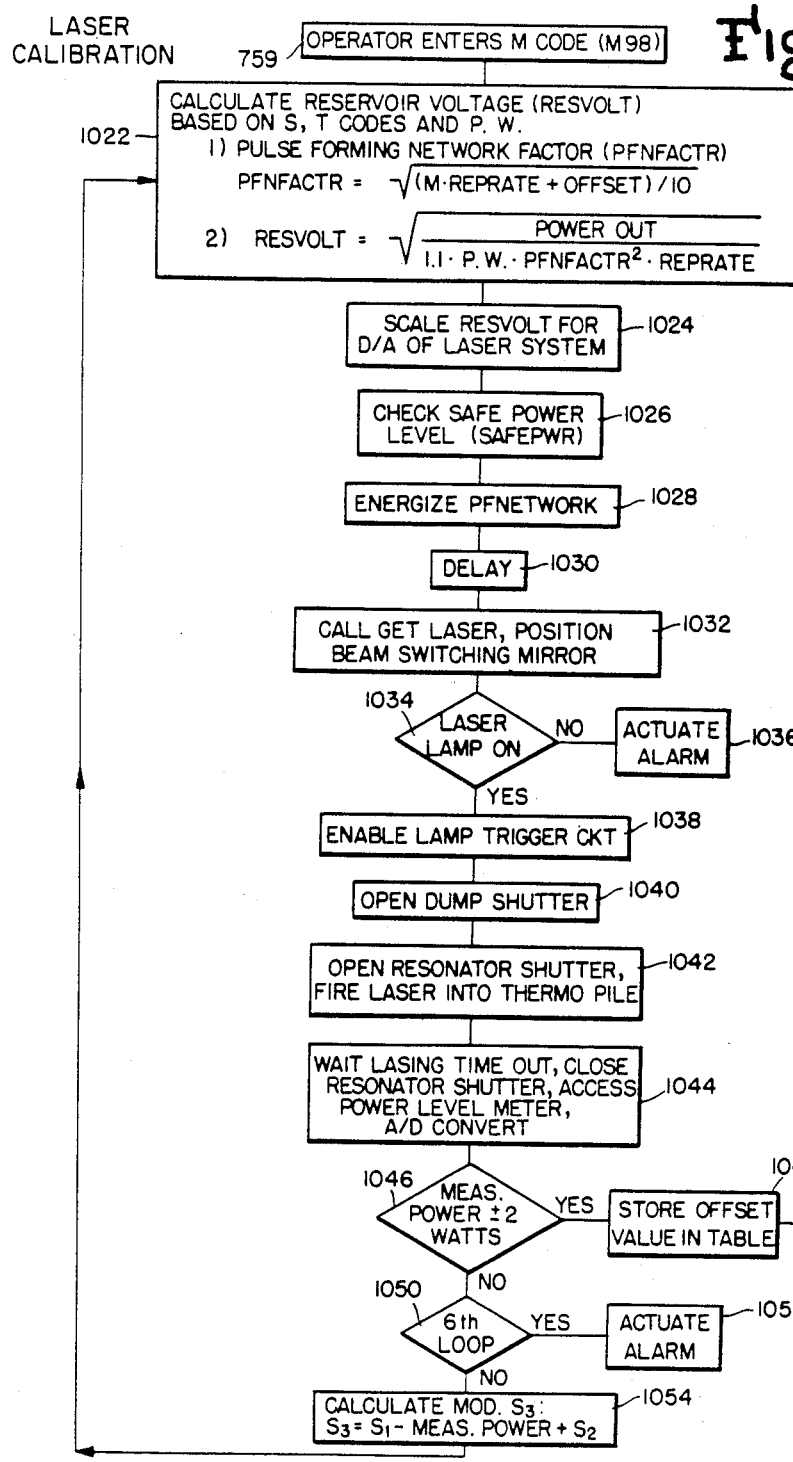

The laser CALIBRATION application subroutine as shown in FIG. 25M is entered by the setting of the M code M98 in step 759 and generally calculates the reservoir voltage RESVOLT as applied to the pulse forming network (PFN), whereby its output voltage as applied to the excitation lamps 186 is adjusted for the programmed power level according to the selected S code, pulse width, and pulse repetition rate (T code). The laser CALIBRATION application subroutine then fires the laser rod 170, takes a reading of the output of the thermopile 218, and compares the thermopile output with the programmed power level; the difference between the calculated and measured output of the thermopile 218 is used to adjust the reservoir voltage output. This reiteration process continues until the measured and programmed laser power levels are within a predetermined difference, e.g. 2 watts. When divergence is reached, the new value of the reservoir voltage is stored at a specified location within the memory of the CPU 560. Initially after entry in step 759, step 1022 solves equations 1 and 2 for a value of the reservoir voltage (RESVOLT) based upon the particular characteristics of the pulse forming network of a particular illustrative laser system, namely the model number SS500 as manufactured by Raytheon. Calculations have been carried out for the particular pulse forming network of the noted Raytheon laser system to provide a curve as shown in FIG. 25S that was calculated to provide parameters characterizing the pulse forming network factor as a function of the repetition rate or REP RATE. The parameter M in equation 1 is defined as the slope of the empirically derived curve of FIG. 25S, and the offset of the curve at zero REP RATE is taken for this pulse forming network as a value of 57; the slope M has an illustrative value of 0.33. The value of the pulse forming network factor PENFACTR is calculated in equation 1 and is substituted into equation 2 along with suitable values of the desired power output of the laser beam 178 in accordance with the programmed S code, the REP RATE as determined by the T code, and the pulse width as determined by the selected M code to provide in accordance with the terms of equation 2 a calculated value of the reservoir voltage RESVOLT. Next, step 1024 scales the calculated value of RESVOLT for the digital to analog D/A circuit of the particular Raytheon laser system 102. Next, the calculated value of RESVOLT is checked by a safe power level SAFPWR application subroutine that is called and executed as will be explained in detail as with respect to FIG. 25O. If the calculated RESVOLT is safe, step 1028 energizes the pulse forming network and after a suitable delay as timed in step 1030, step 1032 actuates the beam switching mirror 172 to direct the laser beam 178 to the welding chamber 108 being controlled. Next, step 1034 determines whether the excitation lamps 186 are energized and if not, an alarm message is displayed by step 1036 on the CRT 133. If the excitation lamps 186 have been turned on, the trigger circuit associated with the excitation lamps 186 is enabled before step 1040 opens the dump shutter 190. Next, step 1042 opens the innercavity shutter 188 to permit the laser rod 170 to emit the laser beam into the thermopile 218. Step 1044 times a suitable period before closing the innercavity shutter 188, accesses the output of thermopile 218 and converts the analog thermopile output to a corresponding digital manifestation. Step 1046 compares the measured laser power level with the programmed value thereof in accordance with the S code and if the difference is within 2 watts plus or minus, the corresponding value of the reservoir voltage RESVOLT is stored in a table of the memory of the CPU 560. If divergence is not met, step 1050 determines whether this is the 6th loop of the steps 1022 to 1046, and if so, step 1052 displays upon the CRT 133 an alarm message that the laser CALIBRATION application subroutine is unable to reach divergence. If less than the 6th loop, step 1054 calculates an offset or modified value S3 of the S code in accordance with the equation shown in step 1054 of FIG. 25M, where S1 is the initially programmed S code, MEAS POWER is the power of the laser beam 178 measured in step 1046 by the thermopile 218, and S2 is the previously calculated offset. The modified code S3 is returned and used in step 1022 to calculate a new value of RESVOLT in accordance with the second equation. Thereafter, steps 1024 through steps 1054 are repeated until divergence is obtained or six loops have been completed. As shown in FIG. 25M, when divergence is obtained as determined in step 1046, the output voltage from the power supply as applied to the pulse forming network of the laser system 102 is stored as an offset value in a table in memory, whereby a compensation of the laser output beam is effectively made, and the energy input for each weld is held substantially constant over a long period of time thus assuring weld uniformity.

The LOAD/UNLOAD CART application subroutine is shown in FIG. 25B for actuating the slide drive motor 266 to dispose the slide table 262 and its welding chamber 108 between its first, (welding) position in, and its second, out position, while insuring that the door 114 is open, the laser lens assembly 204 is retracted, and the locating pins 316 and 319 are removed, permitting the slide table 262 to move. Initially in step 760, the M code as set in step 708 of the part program as shown in FIG. 24A is executed during the Bidflag Execute Cycle of the operating system program. In particular, step 708 sets an M code M82 to unload the slide table 262 and its welding chamber 108, whereas in step 710, an M code M81 is set whereby the slide table 262 is returned to its first, welding position. Next, step 762 accesses the safety zone 134 in front of the welding chamber 108 to be moved and if free, step 764 actuates the Z drive motor 470 to move the laser lens assembly 204 to its home position. Next, step 766 actuates the X and Y drive motors 294 and 296 to dispose the X and Y positioning tables 290 and 292 to their center position and to their home or extended position, respectively. Next, step 768 sets the FEED HOLD to bring the X and Y positioning tables 290 and 292 to a halt, and the door opening mechanism 234 is actuated to dispose the door 114 to its open position. Next, the front and back locator assemblies 284 and 286 are actuated to raise their locating pins 316 and 319, thereby freeing the slide table 262. Thereafter, step 772 actuates the slide drive motor 266 to direct the slide table 262 outwardly when an M code M82 has been set or inwardly when an M code M81 has been set. Then, step 774 actuates the front and back locator assemblies 284 and 286 to dispose their locator pins 316 and 319 into a locking position with respect to the slide table 262. Next, the cabinet door 114 is closed in response to the M code M81, and in step 780, the FEED HOLD is released. In step 782, a decision is made as to whether the M code M81 has been set indicating that the welding chamber 108 is to be loaded and if so, the CHAMBER ENVIRONMENT CHECK application subroutine as shown in FIG. 25F is bid to ensure that the atmosphere within the welding chamber 108 is of sufficient purity to permit welding. Thereafter, step 784 clears the routines Bidflag and sequence pointer before exiting.

Referring now to FIG. 25C, there is shown the SYNC application subroutine that is called in step 790 by the 100 Hz clock of the CPU 560. Step 792 determines whether the beam switching mirror 172 is in the position that would direct the laser beam 178 to the welding chamber associated with the other CNC 126b and has not been commanded to change its position. If no, step 793 deselects the laser's operating voltage by the parent CNC 126a. It is understood that each of the parent CNC 126a and the other CNC 126b time shares the control of the laser system 102, wherein only one CNC 126 has control at any one instant of time. Further, one of the CNC's 126a and 126b is designated as the prime CNC and sets the pulse width and REP RATE, which parameters the other CNC adopts. However, each CNC 126a and 126b performs its own calibration process that is a function of the optical path that the laser beams 178a and 178b travel into the corresponding welding chambers 108a and 108b. In this regard, it is understood that the degree of attenuation imparted by each optical system to its laser beam 178 differs to some degree and further the welding process occurring in each welding chamber 108 may have a different effect, i.e. the coating of its laser focusing lens 202. After calibration, each CNC 126a and 126b will calculate its own value of the reservoir voltage RESVOLT that is applied via its own digital/analog converter to the laser control system 592, as shown in FIG. 22B. Thus, it is necessary when one of the CNC's 126a or 126b releases control of the laser system 102, that it deactuates its digital/analog converter as would otherwise apply its operating or reservoir voltage to the laser control system 592; in other words, each CNC 126 deselects its operating voltage as indicated in step 793. Next, step 794 determines whether both CNC's 126a and 126b have currently locked the laser, and, if yes, step 795 determines whether the parent CNC 126a has locked the laser. If no, step 796 causes the parent CNC 126a to unlock the laser and to re-initialize the GET LASER application subroutine, as shown in FIG. 25Q. Next, step 798 determines whether the parent CNC 126a has both locked and requested the laser and if not, the parent CNC 126 resets the laser release signal as applied in step 800 via the CNC link 558 to the other CNC 126b as shown in FIG. 22, before proceeding directly to step 808. If yes, step 802 determines whether the other CNC 126b has applied a laser request signal via the CNC link 558 to the parent CNC 126a and if yes, the routine moves to step 804 which decides whether the parent CNC 126a has locked the laser system 102 by applying a laser lock signal to the CNC link 558; if not, the parent CNC 126a updates in step 806 the CNC link 558, resetting its laser request signal before proceeding to step 808.

When the parent CNC 126a has locked the laser, i.e. has applied a laser lock signal via the CNC link 558 to the other CNC 126b, the routine initiates a laser status check. Initially, step 808 determines whether the parent CNC 126a has control over the laser, i.e. is the busy flag generated, and if not, the subroutine exits. If yes, the application subroutine checks in step 810 various laser parameters including whether the lamp voltage is on, whether the excitation lamps 186 are operating at their less than maximum power limit, the temperature of the lamp coolant, the flow rate of the lamp coolant, the current and voltage as drawn by the laser power supply, and whether the cabinet door is open. If all are OK, an exit is made from this subroutine. If any of the lamp parameters are not within limits, step 812 determines whether the laser trigger circuits are enabled and if yes, step 814 turns off the laser enabling circuits before setting a delay to disable the laser system 102. If step 812 decides no, step 818 determines whether the innercavity shutter 188 is open and if yes, step 820 sets the alarm status before step 822 disposes the beam switching mirror 172 out of position and step 824 displays a suitable alarm message "MIRROR OUT OF POSITION" on the CRT 133. If the innercavity shutter 188 is closed, step 826 immediately displays the alarm message on the CRT 133.

The MAIN application subroutine is shown in FIG. 25D and operates within the high level operating system program or the MAIN TASK LOOP. The main routine continuously operates, except when interrupted by a flag or other interrupt as other would be set by the keyboard 131, the paper tape reader 584, or the magnetic tape drive 586. As noted above, the SYNC routine will be called by an interrupt generated by the CPU's 100 Hz sync clock signal. Initially, step 830 looks for flags set during the SYNC application subroutine. Step 832 determines whether the Trigger Flag is set and if so, a Trigger Timer is allowed to time out before the Trigger enable output is cleared in step 834, whereby the trigger circuit associated with the laser system 102 is cleared. Next, step 836 checks a designated bit 15 of the Alarm Flag indicating that the beam switching mirror 172 is out of position and if yes, step 838 displays on the CRT 133 the message "MIRROR OUT OF POSITION". Step 840 determines whether the MESSAGE pushbutton 638 on the machine function panel 130 as shown in FIG. 23b has been actuated and if so, the alarm and error message flags are reset to acknowledge all error conditions and if present, the MESSAGE pushbutton 638 is illuminated. Finally, in step 842, if a program stop as would occur in the parts program as shown in FIGS. 24A and 24B is set, the laser dump shutter output is cleared, whereby the dump shutter 190 is closed to direct the laser beam 177 into the beam absorber 194.

Referring now to FIG. 25E, there is shown the CLEAR application subroutine which is executed within the CLEAR Bidflag function of the operating system program to clear all application timers, variables, outputs, and Bidflags contained in the Initialize Table of the memory of the CPU 560. This is effected as indicated in step 850 by addressing the memory's Initialize Table. In step 852, its length is determined whereby the value stored therein may be cleared before exiting. It is understood that Bidflags are the means by which the M codes when executed by the operating system bid or call the application subroutines as explained in FIGS. 25A to 25R.

Figure 24A:
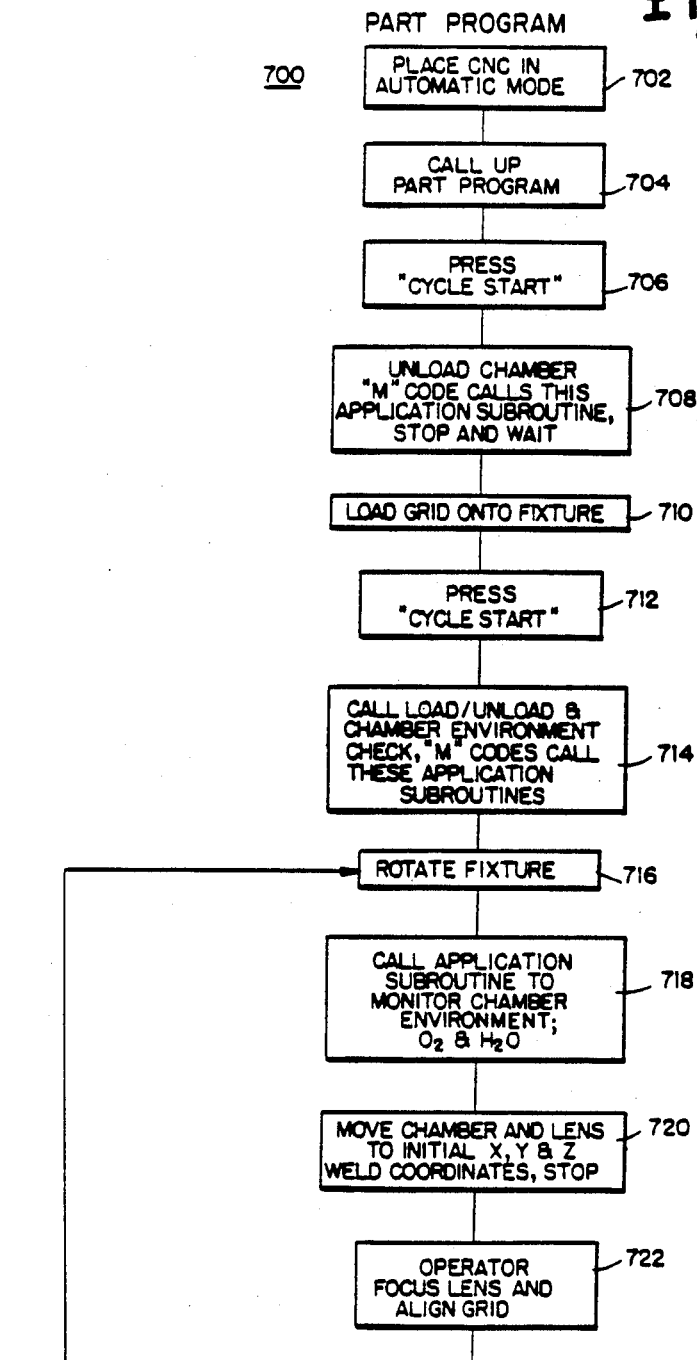
FIGS. 24A and 24B are a high level flow diagram of the part program illustrating the steps of the control process whereby the laser welding system is controlled to effect a series of welds of the nuclear rod grid in a precise fashion.

The CHAMBER ENVIRONMENT CHECK application subroutine is shown in FIG. 25F and is bid from step 718 of the part program shown in FIG. 24A, the bid being executed during the next Bidflag execute cycle of the main task loop or operating system program. Basically, this application subroutine reads the moisture sensor 410 and the oxygen probe 496 disposed to take readings of oxygen and water of the atmosphere within the welding chamber 108 to determine whether the welding atmosphere is sufficiently pure. The readings of oxygen and water are compared with specified limits to determine the "GO-NO GO" chamber environment condition for laser welding. In step 862, the "GO-NO GO" flag is cleared. Thereafter, step 864 displays on the CRT 133 of the CNC 126, the message "Chamber Gas Check" indicating that the oxygen and water content of the chamber environment is being measured. Thereafter, step 866 accesses the selected oxygen probe 496 and sets a time delay in which sample oxygen readings are taken before the CPU 560 takes its reading. In similar fashion, step 868 selects the desired moisture sensor 410 and sets a delay during which samples thereof are made before the CPU 560 takes its reading. Next, step 870 converts the analog readings of the oxygen probe 496 and the moisture sensor 410 to digital values, and compares these values with the preselected limits. Step 872 determines whether the oxygen and moisture values are less than the set limits and if not, step 874 sets a delay before the next set of water and oxygen readings are taken, and step 876 causes an alarm message "Bad Reading" to be displayed upon the CRT in Step 876. If a bad or above limit reading is made, steps 864 to 872 are repeated, contemplating that as the air is purged from the welding chamber 108, the desired degree of purity will be achieved within a relatively short period of time, e.g. one minute. If a single good reading is made as determined by step 872, step 880 determines whether three such good readings have been made and if not, steps 864 to 872 are repeated. After three good readings have been made as determined by step 880, step 882 sets the GO conditional flag before returning to the part program and in particular to step 720 as seen FIG. 24A.

Figure 24B:
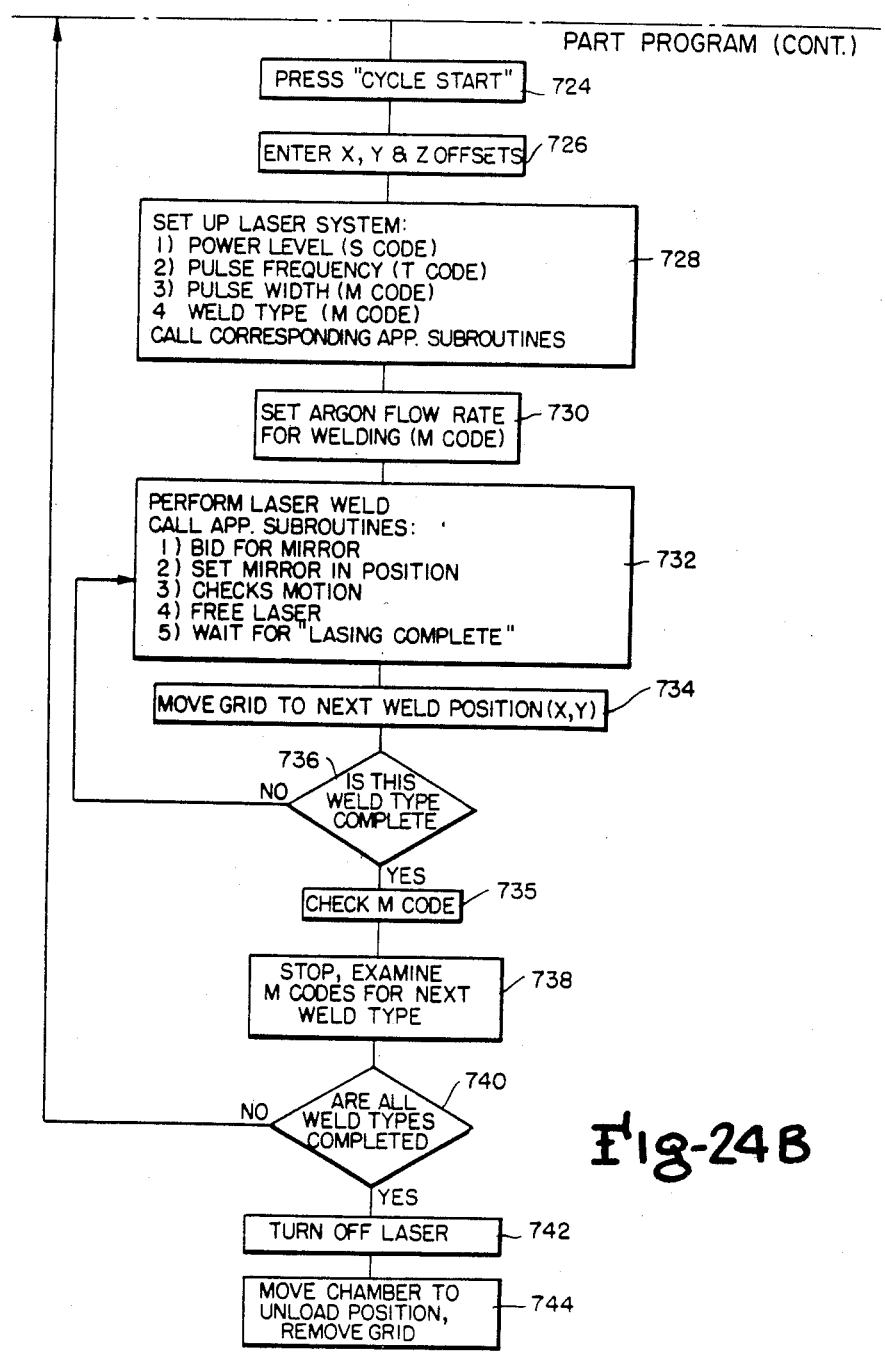

FIG. 25G shows the SET LASER MODE application subroutine that is bid from step 728 of the part program shown in FIG. 24B and is executed during the Bidflag Execute Cycle of the main task loop or operating system program. The SET LASER MODE application subroutine determines which of the four laser modes corresponding to the four different types of welds made upon the fuel rod grid 16 is to be selected. As shown in FIG. 2A, there are four different types of welds, namely the intersect welds 32, the corner seam welds 30, the slot and tab welds 34, and the notch seam welds 40. As explained above, the laser system 102 illustratively taking the form of a model number SS500 as manufactured by Raytheon, comprises four distinct modules or hard wired circuits for controlling each of the four types of welds, as to the number of pulses and/or the time interval during which the pulse laser beam 178 is directed onto the fuel rod grid 16. Illustratively, each of these modules has thumb wheel switches to permit the setting of the number of pulses or time period in which the laser beam 178 is directed onto the work piece. Each module and its weld type is assigned one of the codes M51 through M54. In step 902, one of these modules is addressed according to its code. In step 904, the laser mode output as appears on the SELECT LASER MODE terminal of the optically isolated interface 562 is cleared. Finally, step 906 applies the selected mode via the SELECT LASER MODE OUTPUT to the laser control system 592 to select the desired module for the particular type of weld. As will be explained later, the pulse width and the frequency or REP RATE are selected in accordance with programmed M and T codes.

Referring now to FIG. 25H, the SET LASER PULSE WIDTH application subroutine is shown. Initially in step 910, this application subroutine is entered by setting one of the M codes M55 through M59 dependent upon the selected one of possible five laser pulse widths in step 728 of the part program shown in FIG. 24B and is executed subsequently during the next Bidflag Execute Cycle Step 912 which interprets and accesses the selected M code in the data pool of the memory of the CPU 560. Step 914 checks the safe power level of the laser beam 178 as calculated with the selected pulse width by biding the SAFEPWR application subroutine as will be described in detail in FIG. 25O. Step 916 determines whether the calculated power level is safe, i.e. less than maximum limits, and if not, step 918 sets an alarm whereby an immediate stop to the part program is effected. If safe, step 920 resets the SELECT PULSE WIDTH OUTPUT of the interface 562, and step 922 sets the SELECTED PULSE WIDTH OUTPUT, whereby the laser control system 592 sets the desired pulse width of the laser beam 178. In this regard, it is noted that only one of the parent and other CNC's 126 may set the pulse width, with the other CNC 126 adopting the pulse width as set by the selected or PRIME CNC 126. As will be explained in greater detail with regard to the copending application entitled "PLURAL COMPUTER CONTROL FOR SHARED LASER MACHINING" Ser. No. 414,204, one of the two CNC's 126 is designated as the PRIME CNC and in effect controls the pulse width and frequency of the pulsing of the laser control system 592 of the other CNC. However, each CNC 126 selectively controls the reservoir voltage or output voltage from its laser power supply, whereby an individual adjustment may be made of the power level of the laser beam 178 as applied to the welding chamber 108 associated with each CNC 126. Since each welding chamber 108 is effecting a similar type of weld, a single CNC 126 designated as PRIME selects the pulse width and REP RATE, whereas an individual adjustment of the reservoir voltage or RESVOLT is desired to permit individual adjustment of each of the laser beams directed to each welding chamber 108 for the different conditions of the separate optical paths, laser lens assemblies 204 and welding chambers 108.

The SELECT GAS FLOW RATE application subroutine is shown in FIG. 25I and is bid by setting a particular M code, i.e. one of M codes M61 to M64, in steps 714 and 730 of the part program shown in FIGS. 24A and 24B, and is executed during the subsequent Bidflag Execute Cycle of the main task loop or operating system program. Next, in step 932, the three flow rate select outputs of the optically isolated interface 564 as shown in FIG. 22 are cleared, before in step 934, the selected flow rate select output as applied to one of the mass flow controllers 484, 486, and 488 is set in accordance with the programmed M code. Thereafter, step 936 disables the manual or steady state flow rate selection that is set in the absence of the CNC control.

Referring now to FIG. 25J, the SERVICE S CODE application subroutine is shown, wherein a change of an S code in step 728 of the part program bids the SERVICE S CODE application subroutine to be executed during the preconditioned departure data cycle of the operating system program. The S codes determine the laser operating voltage and in particular that voltage that is applied to the excitation lamps 186. After being bid in step 950, step 952 determines whether the new S code is within limits and if not, this application subroutine is aborted and an alarm message is displayed in step 954 on the CRT 133. If within limits, step 956 determines the presence of the M98 flag that is manually set by the operator to bid in step 958 the CALIBRATION routine as shown in FIGS. 25A and 25M. Next, step 960 bids or calls the SET LASER POWER LEVEL OFFSET application subroutine as described more fully with respect to FIG. 25L. Finally, the new S code value is transferred to the Program Control Buffer (PCB) within the memory of the CPU 560.

The SERVICE T CODE application subroutine is shown in FIG. 25K for calculating the values of the laser pulse REP RATE or frequency (PRF) as set by the T code in step 728 of the part program of FIG. 24B. Step 970 initiates the SERVICE T CODE application subroutine by examining the Converted Data Buffer (CDB) of the memory of the CPU 560. When a change is observed, the new T CODE is transferred to the Program Control Buffer (PCB) of the CPU memory, and the SERVICE T CODE application subroutine is bid and executed during the preconditioned departure data cycle of the operating system program to determine whether the new value of the T code is acceptable or not. In step 972, the new value of the T code is checked with predetermined limits and if outside these limits, the application routine is aborted and a suitable alarm message is displayed upon the CRT 133. If within limits, step 974 determines the PRF range associated with the digital analog converter as incorporated within the laser control system 592. As shown in FIG. 22B, the laser control system 592 receives a digital output upon the line marked SELECT PULSE FREQUENCY, which digital output has a corresponding range selected so that the laser control system 592 may generate a precise analog value of the digital output. Next, step 976 calculates the PRF digital/analog output value (PRFOUT) in accordance with the indicated equation, where FSOUT is the fully scale output of the particular digital/analog unit, T CODE is the T code value, and RANGE is the maximum value of each PRF RANGE. It is understood that the calculated value of PRFOUT is applied via the SELECT PULSE FREQUENCY OUTPUT of the optically isolated interface 562 to the laser control system 592. Next, step 978 bids the CHECK SAFE POWER LEVEL (SAFEPWR) application routine as will be explained in detail with respect to FIG. 25O. The calculated value of safe power is compared with known limits and if outside those limits, the execution of the part program is suspended and an alarm message is displayed upon the CRT 133. If safe, the trigger signals as applied by the optically isolated interface 562 to the laser control system 592 are turned off, and step 986 determines whether this CNC 126 is PRIME, i.e. that the laser pulse REP RATE and the pulse width are selected by this CNC 126, and if not, an exit is made from this application subroutine. Otherwise, step 988 disables the select pulse frequency output and the reservoir voltage output before step 990 sets the select pulse frequency output with the desired PRF range and percentage of range signals to be applied via the select power level output to the laser control system 592.

The SET LASER POWER LEVEL OFFSET application subroutine, as shown in FIG. 25L, is bid by a change of the S code or of any M code as noted by the programming of a M code M70 and is executed during the subsequent Bidflag Execute Cycle of the operating system program. For example, when there has been a change of the S code, the SERVICE S CODE application subroutine is executed and in its step 960, the SET LASER POWER LEVEL OFFSET application subroutine is bid. When there has been a change of the M code, the M code M70 is set, thereby bidding this application routine. Generally, the SET LASER POWER LEVEL OFFSET application subroutine obtains the reservoir voltage based upon the programmed pulse REP RATE rate as set by the T code and upon the programmed pulse width stored in a table in the CPU memory. The reservoir voltage is the output voltage of the laser power supply 120 that is applied to a pulse forming network, whereby the lamp energizing voltages are generated. In step 1002, the offset table within the CPU memory is searched for the programmed S, T, and M codes setting the levels of power, frequency, and pulse width to thereby obtain an indication of the reservoir voltage. Step 1004 enables the SELECT POWER LEVEL OUTPUT (see FIG. 22) before step 1006 initiates a timing delay. Next, step 1008 actuates the beam switching mirror 172 to direct the laser beam 178 to the welding chamber 108 of this CNC 126a. Next, 1010 checks whether the lamp voltage is within limits and thereafter enables in step 1012 the laser trigger circuits, i.e. the TRIGGERS output of the optically isolated interface 562 is turned on. Thereafter, step 1014 initiates a time delay to permit the excitation lamps 186 to reach stabilization before exiting in step 1016. Thus, when the PERFORM LASER WELD application subroutine, as will be described with respect to FIG. 25N, is called, the laser rod 170 is prepared to emit its laser beam 177.

Figure 25N:
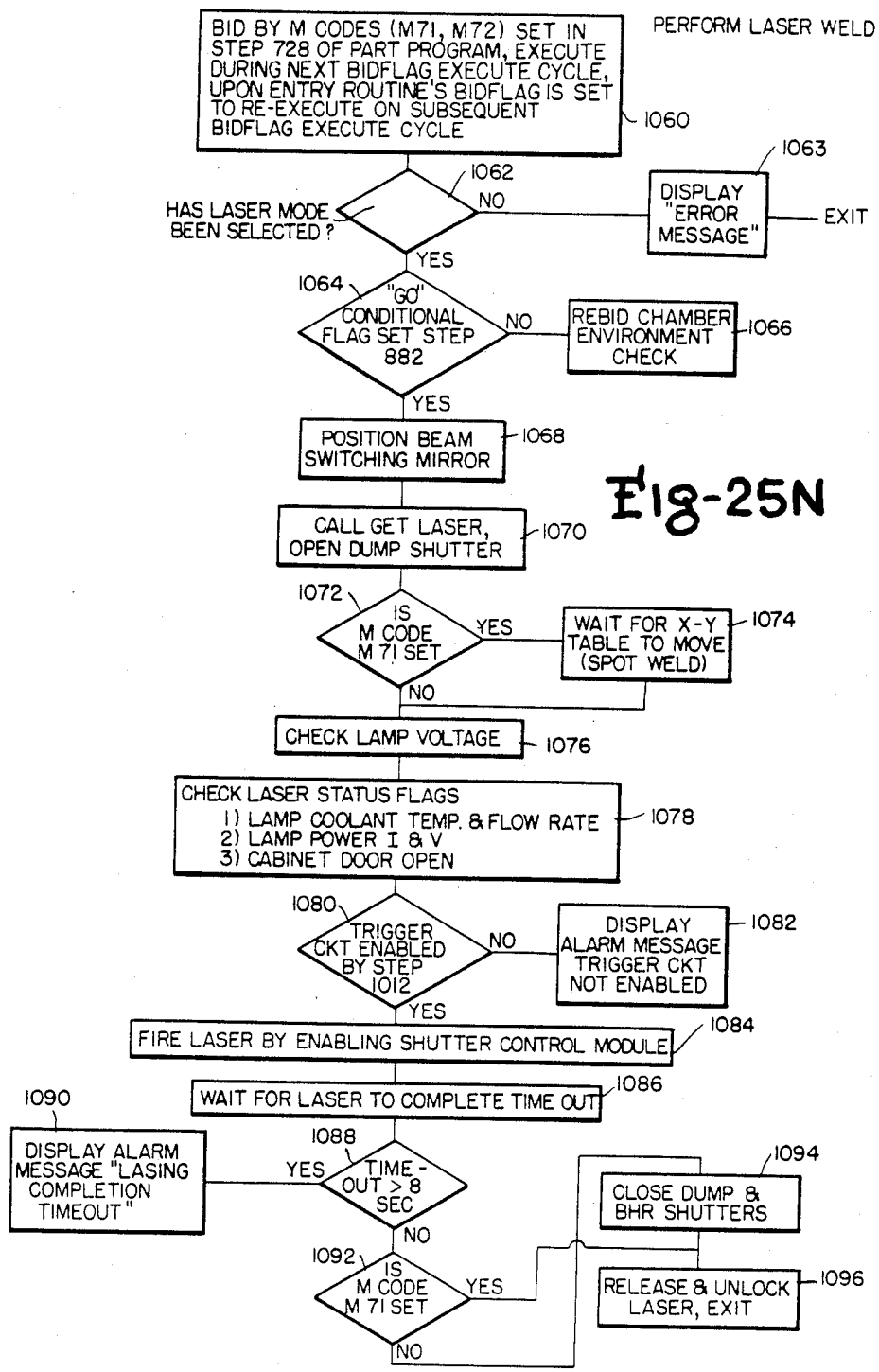
Figure 25O:
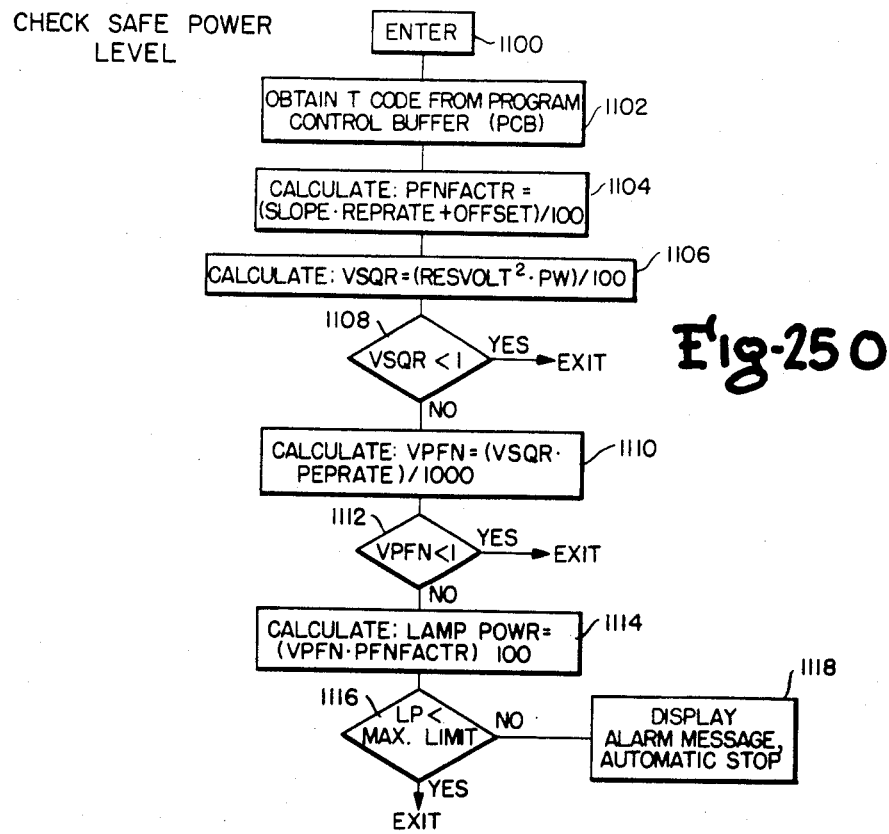

The PERFORM LASER WELDS application subroutine is shown in FIG. 25N and is bid by the M codes M71 and M72 as set in step 728 of the part program and executed during the next Bidflag Execute Cycle. Upon entering in step 1060, the application subroutine Bidflag is set to execute on the subsequent Bidflag Execute Cycle. After entering, step 1062 determining whether one of the laser modes corresponding to one of the codes M51 through M54 has been selected. As explained above, the laser control system 592 includes four separate modules, each hard wired and programmed to control one of the intersect welds 32, slot and tab welds 34, corner seam welds 30, or notch seam welds 40. If no, step 1063 displays an "ERROR MESSAGE" before exiting the routine. If yes, step 1064 checks to determine whether the GO flag had been previously set in step 882 of the CHAMBER ENVIRONMENT CHECK application subroutine as discussed above with respect to FIG. 25F. If not, the step 1066 rebids the CHAMBER ENVIRONMENT CHECK application subroutine to again determine whether the atmosphere within the welding chamber 108 has been purified so that its oxygen and water content is below the specified limits. If yes, step 1068 actuates the beam switching mirror 172 to direct the laser beam 178 to the welding chamber 108 of this CNC 126. Thereafter, the dump shutter 190 is disposed to its open position, whereby the laser beam 177 is directed into the selected welding chamber 108. Thereafter, step 1072 determines whether the M code M71 has been set. As indicated above, there are two M codes, i.e. M71 and M72, the code M71 indicating that a spot weld, corresponding to the intersect welds 32, is to be performed, whereas an M72 code indicates that a seam weld corresponding to the corner seam welds 30, the slot and tab welds 34, and the notch seam weld 40 is to be effected. A seam weld differs from a spot weld in that the fuel rod grid 16 is moved by the X-Y positioning system 288 while the laser rod 170 emits a series of pulses of the laser beam 178, whereas a spot weld is effected with the fuel rod grids 16 being kept stationary with respect to the laser beam 178. Thus, if an M71 CODE is detected, indicative that a spot weld is to be performed, step 1074 effects a delay to wait for the X-Y positioning system 288 to come to a halt before causing the laser rod 170 to fire. On the other hand, if an M72 CODE is programmed, indicating that a seam weld is to be performed, no delay is imparted thus permitting the laser rod 170 to initiate welding before the movement of the fuel rod grid 16 begins. Next, step 1076 checks to determine whether the voltage applied to the excitation lamps 186 is as programmed. Thereafter, step 1078 checks the status of the laser and in particular determines whether the temperature and flow rate of the lamp coolant are within specified limits, whether the current and voltage of the lamp power are within specified limits, and whether the cabinet door 114 is open. Thereafter, step 1080 determines whether the lamp trigger circuits have been successfully triggered by step 1012 of the SET LASER POWER LEVEL OFFSET application subroutine as shown in FIG. 25L. If not set, step 1082 displays an alarm message "Trigger Circuit Not Enabled" on the CRT 133. If enabled, step 1084 effects laser firing by enabling the shutter control module of the laser control system 592, i.e. applies the start weld signal thereto. Step 1086 initiates the timing of a delay period during which the laser rod 170 is programmed to complete its lasing, i.e. waits to receive the weld complete signal from the laser control system 592. Step 1088 determines whether a period of eight seconds has expired and if not expired, displays a message "Lasing Completion Time Out" on the CRT 133. After timing out, step 1092 determines whether a spot weld is to be performed, i.e. has the M CODE M71 been set, and if so, the subroutine moves to step 1096 wherein the CPU 560 generates via the optical interface 562 a Release Laser Signal on the CNC link 558 indicating that the laser rod 170 has been released and that the other CNC 126b may now request the laser. If a seam weld has been performed, step 1094 closes the dump shutter 190 and the safety BRH shutter 212, before exiting in step 1096.

The CHECK SAFE POWER LEVEL application subroutine is shown in FIG. 27O and is executed to calculate the laser lamp power required for a given REP RATE and pulse width as programmed by T codes and the M codes M55 through M57 and for the laser lamp voltage as determined in the SET LASER POWER LEVEL OFFSET application subroutine as explained above with respect to FIG. 25L. For the illustrative laser system 102, i.e. the Raytheon model number SS500, the maximum safe power level is in the order of 16 kilowatts and if the calculated lamp laser power exceeds that level, the part program is automatically stopped. The CHECK SAFE POWER LEVEL application subroutine is entered in step 1100 from either step 914 of the SET LASER PULSE WIDTH application subroutine shown in FIG. 25H, step 978 of the SERVICE T CODE application subroutine as shown in FIG. 25K, or step 1026 of the LASER CALIBRATION application subroutine of FIG. 25M. Next, in step 1102, the current T code values are obtained from the Program Control Buffer (PCB) of the CPU memory and are used in step 1104 to calculate the pulse forming network factor in accordance with the indicated equation, where the value of REP RATE is indicative of the pulse frequency as programmed by the T code value, the OFFSET is obtained from the OFFSET table as entered by the SET LASER POWER LEVEL OFFSET application subroutine of FIG. 25L, and the slope is that slope as determined from the curve of FIG. 25S. Next, step 1106 calculates an intermediate value VSQR as a function of the pulse width as set by the M codes M55 through M60 and the value of the reservoir voltage (RESVOLT). If VSQR is less than one, it is known that the lamp power is within the desired maximum limit and an exit is made from this application subroutine. If not, step 1110 calculates a value of the voltage applied to the pulse forming network (VPFN) in accordance with the indicated equation, using the intermediate value VSQR, and if BPFN is less than one, an exit is made in that there has been determined that the laser lamp power is below the maximum safe level. If not, there is an indication that the lamp power may exceed the maximum safety limit and if so, step 1114 calculates the lamp power in accordance with the values of BPFN and PFNFACTR. If the value of the lamp power is below the maximum safe limit, an exit is made, but if not, step 1118 displays an alarm message on the CRT 133 and the part program is automatically stopped. A G register of the CPU 560 is used as a check return indicator for the calling routine, whereby upon exiting of the CHECK SAFE POWER LEVEL application subroutine, a return may be made to one of the SET LASER PULSE WIDTH, the SERVICE T CODE, or the LASER POWER LEVEL OFFSET application subroutines.

Figure 25P:
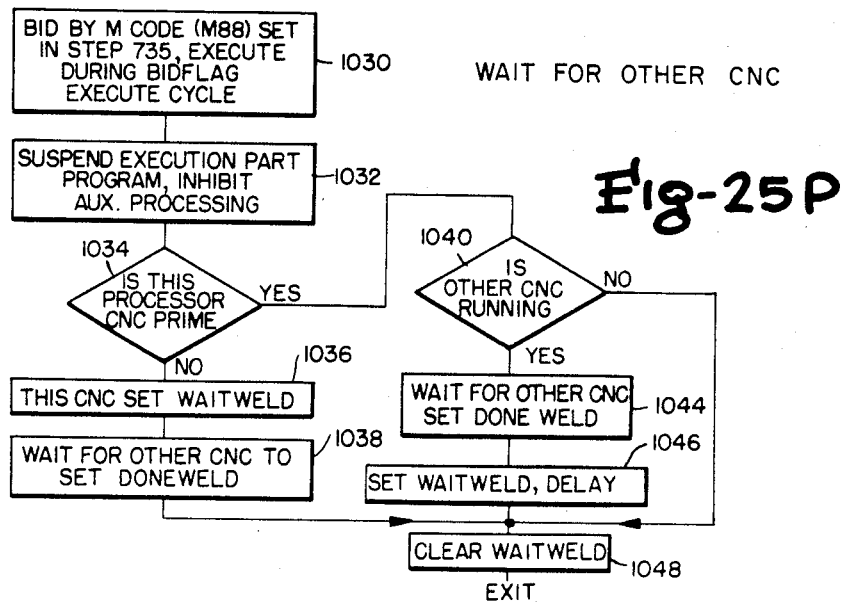
Figure 25Q:
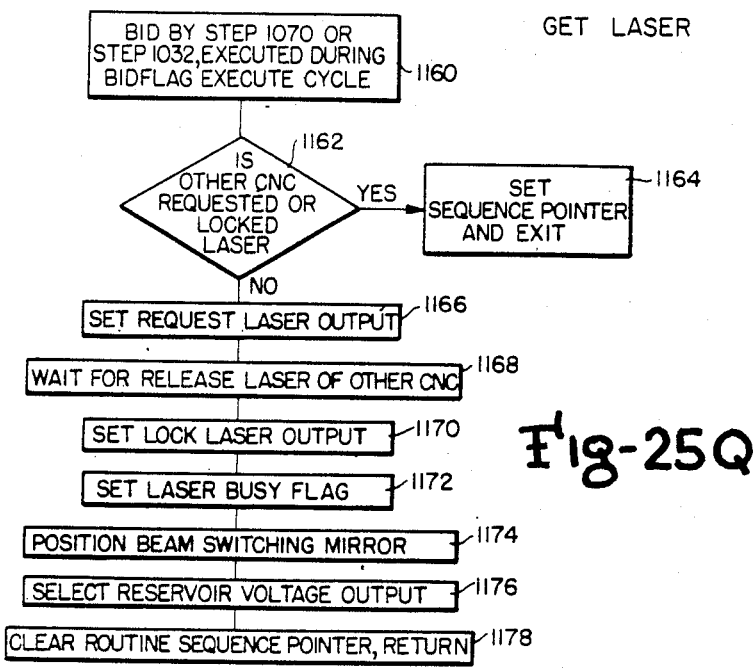
Figure 25S:
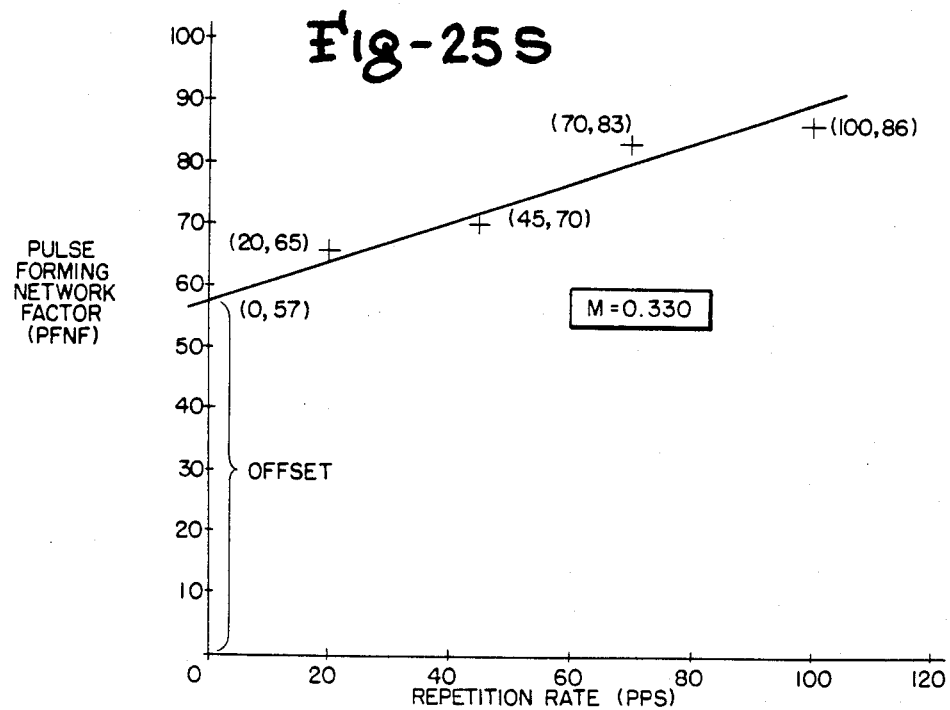

The WAIT FOR OTHER CNC application subroutine is shown in FIG. 25P and permits the parent CNC 126a to complete a series of welds and thereafter, suspend execution of the part program as shown in FIGS. 24A and 24B while waiting for a response from the other CNC 126b. This application subroutine is called by an M code M88 as set in step 735 of the part program shown in FIG. 24B and executed during the subsequent Bidflag Execute Cycle of the main task loop. This application subroutine provides a delay in which the other CNC 126b may complete its welding operations on its fuel rod grid 16 after the parent CNC 126a has completed a particular type of weld and would otherwise change the common welding parameters, i.e. of pulse width and REP RATE, as used by both CNC's 126a and 126b. In this regard, only one of the two CNC's 126 is set as the PRIME CNC 126a to thereby control the pulse width and REP RATE, the other CNC 126b adopting the pulse width and REP RATE set by the PRIME CNC 126; thus, the PRIME CNC 126a must delay resetting its pulse width and REP RATE until the other CNC 126 has completed its welding operations for a particular weld type. Thus, after step 736 determines that a first type of weld has been completed, a check of the M code M88 is made, thus calling the WAIT FOR OTHER CNC application subroutine. After entry in step 1030, step 1032 suspends execution of the part program as shown in FIGS. 24A and 24B and therefore maintains the same weld type and its REP RATE and pulse width until the other CNC 126b has completed its welding operations. To this end, step 1034 determines whether this CNC is selected as the PRIME CNC and if yes, step 1040 determines whether the other CNC is currently running. If not, this application subroutine moves directly to step 1048. If the other CNC is running, step 1044 sets a timing period in which the other CNC 126b may set its DONE WELD flag, before in step 1046 setting its WAIT WELD signal and initiating a delay. If this processor CNC 126 is not PRIME, step 1036 sets the WAIT WELD for this CNC, while step 1038 waits for the PRIME CNC to set its DONE WELD manifestation. In this manner, the delay set in step 1046 is provided for the other CNC 126b to complete its laser welding operations before step 1048 clears the WAIT WELD flag and then exits.

The GET LASER application subroutine is shown in FIG. 25Q and provides the means whereby one CNC 126 may communicate via the CNC link 558, as shown in FIG. 22B to bid for the use of the laser system 102. It is understood that only one of the CNC's 126a and 126b may have active control over the laser system 102 at any instant of time. Thus, to permit the coordination between the two CNC's 126a and 126b, the first CNC 126 that is actively controlling the laser system 102 places a LOCK LASER signal upon the CNC link 558. After relinquishing use of the laser system 102, the first CNC will place a RELEASE LASER signal on the CNC link 558, whereby the second CNC seeking control of the laser system 102 may then impose a REQUEST LASER signal on the CNC link 558. Thereafter, CNC 126 obtains use of the laser system 102 and imposes a LOCK LASER signal on the CNC link 558, whereby the first CNC 126 is inhibited from gaining access to the laser system 102. As shown in step 1160, the GET LASER application subroutine is bid by any one of step 1008 of the SET LASER POWER LEVEL OFFSET application subroutine, step 1032 of the LASER CALIBRATION application subroutine, or step 1070 of the PERFORM LASER WELDS application subroutine, and is executed during the subsequent Bidflag Execute Cycle of the operating system program. After entry, step 1162 examines the CNC link 558 to determine whether the second CNC 126b has set its REQUEST LASER or its LOCK LASER outputs and if so, step 1164 sets the sequence pointer on the first CNC 126a and exits. On the other hand, if the second CNC 126b has not requested or locked the laser system 102, the first CNC 126a places a REQUEST LASER output upon its optically isolated interface 562 to the CNC link 588. Thereafter, step 1168 initiates a wait for the RELEASE LASER output of the second CNC 126b. After the second CNC 126b imposes its RELEASE LASER output upon the CNC link 558, the first CNC 126a in step 1172 sets its laser busy flag and imposes a LOCK LASER output upon the CNC link 558, before in step 1174 actuating the laser switching mirror 172 to direct the laser beam to the welding chamber 108 associated with the first CNC 126a. Thereafter in step 1176, the first CNC 126a sets its reservoir voltage output, before in step 1178, clearing the routine sequence pointer and returning to the calling subroutine.

Figure 25R:
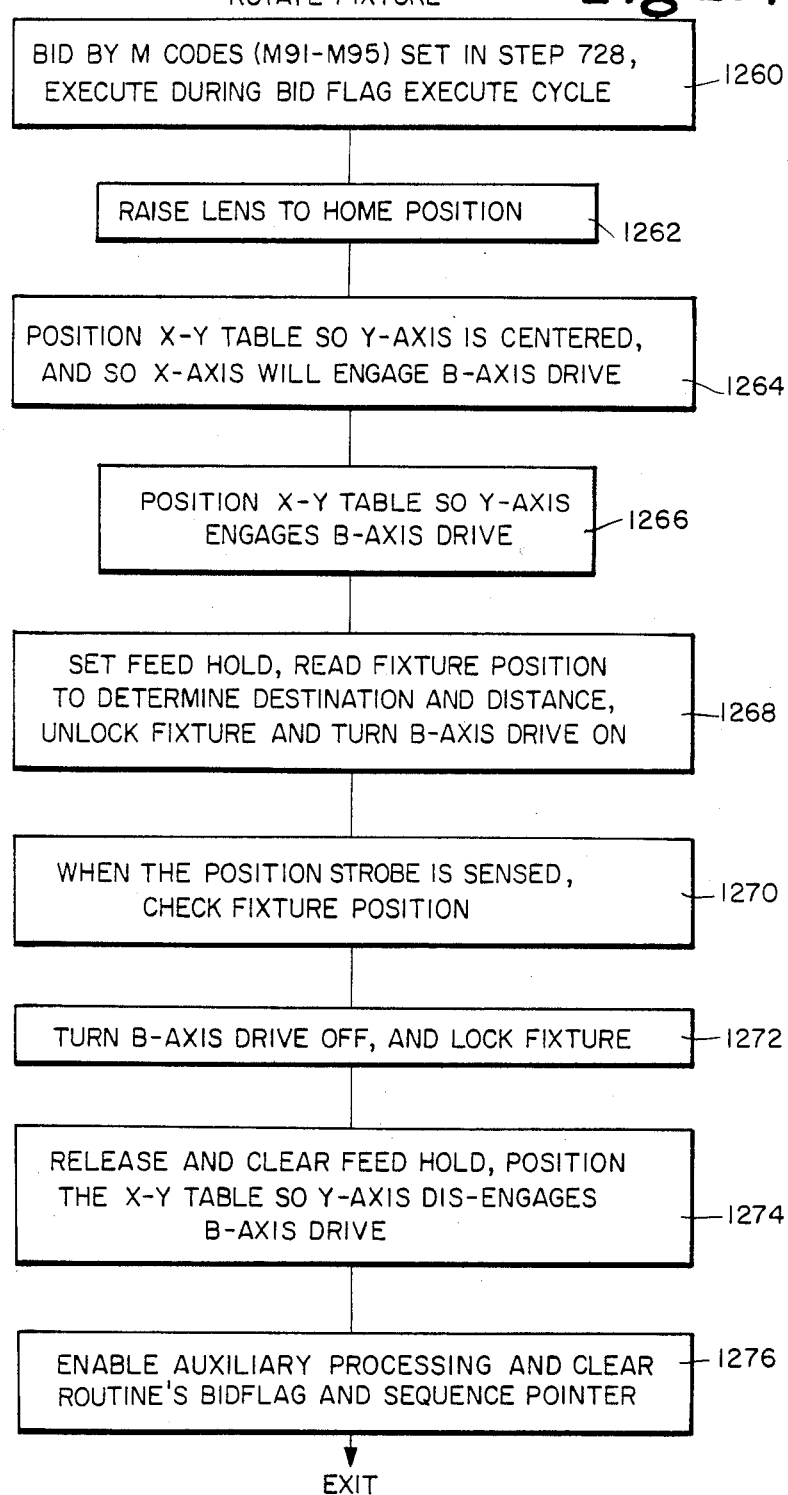

The ROTATE FIXTURE application subroutine is shown in FIG. 25R, and is bid by the M codes M91 through M95 as set in step 728 of the part program as shown in FIG. 24B, and is executed during the subsequent Bidflag Execute Cycle. After entry, step 1262 actuates the Z-drive motor 470, whereby the laser lens assembly 204 is disposed to its home position as detected by limit switch 576b. Thereafter in step 1264, the Y drive motor 296 is actuated to drive the Y positioning table 292 to its centered position as detected by the limit switch 574d, and the X axis is positioned to permit engagement of the B axis rotation drive 238. Thereafter in step 1266, the Y drive motor 296 is actuated to drive the Y positioning table 292 so that the coupling member 362 of the positioning wheel 358 engages the toothed coupling member 384 associated with the B axis rotation drive 238. Thereafter, step 1268 sets the FEED HOLD to inhibit movement of the X and Y positioning tables 290 and 292, and accesses the outputs of the proximity switches 402a–d to sense the present angular position of the rotatable fixture 252 to thus determine if the fixture needs to be rotated, before withdrawing the pin 378 locking the positioning wheel 358 and energizing the B axis motor 388. In step 1270, the output of the proximity switch 402d is sensed as a strobe and when sensed, the outputs of the remaining proximity switches 402a–402c are sensed to determine fixture position as it is being rotated to its new position. When rotated to its new position, step 1272 deactivates the B axis drive motor 388 as it is being rotated to its new position, and the trip solenoid 406, whereby the locator pin 378 is returned to engage and to lock the positioning wheel 358. Thereafter, the FEED HOLD is released and cleared, the Y drive motor 296 is actuated to move the Y positioning table 292 to disengage the B axis rotation drive 238, and finally in step 1274, auxiliary processing is enabled, and the routine's Bidflag and sequence pointer of the ROTATE FIXTURE application subroutine are cleared.

While not believed necessary for a thorough understanding of the present invention, submitted herewith and made a permanent part of the file wrapper of this application is a computer program listing showing how a conventional computer as identified herein may be programmed to simulate the various functions of the above described application subroutines; to the extent that this material is deemed by the Examiner to be necessary under the provisions of §112 of the Patent Laws, it is incorporated herein by reference.

In considering this invention, it should be remembered that the present disclosure is illustrative only and the scope of the invention should be determined by the appended claims.

We claim:

1. Computer controlled apparatus for performing a series of laser machining operations on a work piece in an environment comprised of a gas non-reactive with respect to the material of which the work piece is made, said laser machining apparatus comprising:
   (a) a machining chamber for receiving the work piece and for receiving the non-reactive gas to establish a machining environment about the work piece;
   (b) an excitable laser for generating laser emission;

(c) optical means for focusing and directing said laser emission as a laser beam along a path to the work piece;

(d) means for directing the non-reactive gas into said machining chamber at a selected rate;

(e) means for selectively moving said machining chamber and the work piece in a sequence of movements with respect to the laser beam, whereby each of the machining operations is performed on a selected site of the work piece; and (f) programmable computer means for controlling the laser machining of the work piece and including first means for controlling said gas directing means in accordance with a programmable parameter indicative of said selected rate, and second means programmable with a set of instructions indicative of the machining sites of the work piece for controlling said selectively moving means to sequencially move said machining chamber and the work piece disposed therein in said sequence of movements.

2. The computer controlled laser machining apparatus as claimed in claim 1, wherein said first means is programmed with a first parameter for controlling said gas directing means to provide the non-reactive gas to said machining chamber at a first rate sufficiently high to evacuate any gas reactive with the material of the work piece from said machining chamber.

3. The computer controlled laser machining apparatus as claimed in claim 2, wherein said first means is programmed with a second parameter for controlling said directing means to direct the non-reactive gas into said machining chamber at a second rate less than said first rate, said second rate being sufficient to maintain the purity of the non-reactive gas within said machining chamber to ensure the integrity of the laser machining operations effected upon the work piece.

4. The computer controlled laser machining apparatus as claimed in claim 3, wherein said first means is programmed with a third parameter for controlling said directing means at a third rate less than said second rate to permit the removal of one work piece from and the replacement of another work piece into said machining chamber.

5. The computer controlled laser machining apparatus as claimed in claim 1, wherein said programmable computer means comprises third means for controlling said laser to generate said laser emission.

6. The computer controlled laser machining apparatus as claimed in claim 5, wherein said third means controls said laser to provide laser emission, while said second means controls said selectively moving means to move said machining chamber and the work piece to effect a seam type of weld.

7. The computer controlled laser machining apparatus as claimed in claim 5, wherein there is included means associated with said machining chamber for measuring the reactive gas within said machining chamber, and said programmable computer means comprises fourth means for evaluating the output of said measuring means for inhibiting said third means from controlling said laser to provide laser emission if the content of the reactive gas within said machining chamber exceeds a predetermined limit.

8. The computer controlled laser machining apparatus as claimed in claim 7, wherein said first means is programmed with a first parameter for controlling said gas directing means to provide the non-reactive gas at a first rate sufficiently high to evacuate any reactive gas from said machining chamber, and said fourth means evaluates the output of said measuring means and if the content of the reactive gas exceeds said predetermined limit, said evaluating means causes said first means to operate said directing means to direct the non-reactive gas into the laser chamber at said first rate.

9. The computer controlled laser machining apparatus as claimed in claim 8, wherein said fourth means evaluates the output of said measuring means to determine that the content of reactive gas within said machining chamber is less than said predetermined limit to cause said third means to initiate the operation of said laser to generate and direct the laser beam onto the work piece.

10. The computer controlled laser machining apparatus as claimed in claim 1, wherein there is further included beam directing means disposed to intercept the laser beam and operative in a first mode for directing the laser beam along the first mentioned laser path, and in a second mode for directing the laser beam along a second laser path distinct from said first laser path, said first mentioned machining chamber disposed to intercept said first mentioned laser path, a second machining chamber for receiving a second work piece and disposed to intercept said second laser path, second optical means associated with said second path for focusing the laser beam onto the second work piece, and second means for selectively moving said second machining chamber and its second work piece with respect to said second laser path.

11. The computer controlled laser machining apparatus as claimed in claim 10, wherein said programmable computer means comprises third means operative for disposing said beam directing means to operate in one of its first and second modes to direct the laser beam onto one of the first and second work pieces, while said second means actuates said selectively moving means associated with the other of said first and second work pieces to move the other work piece in preparation for the next laser machining operation.

12. The computer controlled laser machining apparatus as claimed in claim 11, wherein there is further included second programmable computer means for controlling the laser machining of the second work piece, and said first-mentioned and said second programmable computer means operatively coupled to said beam directing means for disposing said beam directing means to operate in said first and second modes respectively, said first-mentioned and said second programmable computer means coupled to each other to permit only one of said first-mentioned and said second programmable computer means to gain control of and to operate said beam directing means in its corresponding mode, while excluding said other programmable computer means from gaining control of said beam directing means.

13. The computer controlled laser machining apparatus as claimed in claim 12, wherein each of said first-mentioned and second programmable computer means comprises said third means for enabling and inhibiting its control of said beam directing means, and link means coupled between said third means of each of said first and second computer control means.

14. The computer controlled laser machining apparatus as claimed in claim 13, wherein each of said third means is responsive to its gaining control of said beam directing means for applying a laser lock manifestation to said link means, whereby said third means of said other of said first-mentioned and second programmable computer means is inhibited from gaining control of said beam directing means.

15. The computer controlled laser machining apparatus as claimed in claim 14, wherein said third means of one of said first-mentioned and second programmable computer means generates a laser request manifestation on said link means, whereby said third means of said other programmable computer means is inhibited from gaining control of said beam directing means.

16. The computer controlled laser machining apparatus as claimed in claim 15, wherein said third means of one of said first-mentioned and second programmable computer means applies to said link means a laser release manifestation indicating that said one programmable computer means has completed its laser machining and that the other of said programmable computer means may now gain control of said beam directing means.

17. The computer controlled laser machining apparatus as claimed in claim 1, wherein there is further included rigid bed means resting on a support surface for defining a first substantially planar reference surface, means affixed to said first reference surface for rigidly mounting said laser with respect to said first reference surface, a platform, work piece housing means affixed to said first reference surface for defining and disposing a second, substantially planar sealing surface with respect to said first reference surface, said machining chamber having an upper opening defining a third substantially planar peripheral surface, said machining chamber being disposed on said platform, adjustable means for positioning said platform and said machining chamber mounted thereon so that said third peripheral surface is disposed substantially parallel with respect to said second sealing surface and spaced therefrom a distance sufficiently small to ensure the integrity of the machining environment within said machining chamber, and fastening means for affixing said platform to said work piece housing means once said third peripheral surface has been so positioned with respect to said second sealing surface.

18. The computer controlled laser machining apparatus as claimed in claim 17, wherein there is included a laser subbase defining a fourth substantially planar surface for receiving and mounting said laser, rigid frame means affixed to said first reference surface for mounting said laser subbase, and means affixedly mounted on said frame means for adjusting the position of said laser subbase so that said laser beam is precisely directed onto the work piece.

19. The computer controlled laser machining apparatus as claimed in claim 1, wherein there is further included a slide table for moving said selectively moving means and said machining chamber between a first position, wherein said machining chamber is disposed to receive the laser beam onto the work piece therein, and a second position, wherein said machining chamber is removed from the laser beam to permit the work piece to be disposed within and removed from said machining chamber.

20. The computer controlled laser machining apparatus as claimed in claim 19, wherein said machining chamber comprises an upper edge defining an opening for receiving its work piece, and there is further included sealing means disposed at a substantially uniform spacing from said upper edge to provide a peripheral gap between said sealing means and said machining chamber to facilitate the movement of said machining chamber without restraint as imparted respectively by said selectively moving means and said slide table.

21. The computer controlled laser machining apparatus as claimed in claim 20, wherein said sealing means comprises a first substantially planar surface disposed to form a substantially uniform spacing with respect to said upper edge.

22. The computer controlled laser machining apparatus as claimed in claim 21, wherein said selectively moving means moves said machining chamber and its upper edge along paths that define a second, substantially planar surface substantially parallel to said first planar surface.

23. The computer controlled laser machining apparatus as claimed in claim 22, wherein there is further included means responsive to the laser beam to provide a manifestation indicative of the power of the laser beam, said measuring means mounted upon said slide table and said slide table is movable to a third position, wherein the laser beam is aligned with said measuring means.

24. The computer controlled laser machining apparatus as claimed in claim 23, wherein there is included means responsive to a control signal for exciting said laser to emit its laser beam of a power corresponding to said control signal, and said programmable computer means comprises third calibration means coupled to each of said exciting means and said measuring means, said third calibration means being responsive to the measured power of the laser beam for providing the control signal.

25. The computer controlled laser machining apparatus as claimed in claim 24 wherein the laser machining operations include machining with a laser beam generated in accordance with at least first and second sets of distinct lasing parameters corresponding to first and second machining modes, respectively, wherein said programmable computer means comprises fourth means for programming said computer control means with said first and second sets of lasing parameters.

26. The computer controlled laser machining apparatus as claimed in claim 25, wherein said exciting means excites said laser to emit the laser beam in a series of controlled pulses.

27. The computer controlled laser machining apparatus as claimed in claim 26, wherein each of said first and second sets of lasing parameters includes a parameter indicative of the desired power level of the laser beam.

28. The computer controlled laser machining apparatus as claimed in claim 27, wherein each of said first and second sets of parameters includes parameters indicative of the pulse width and repetition rate of the controlled laser pulses.

29. The computer controlled laser machining apparatus as claimed in claim 28, wherein said programmable computer means comprises fifth means for comparing the measured power of the directed laser beam and the value of the programmed parameter indicative of the power level to provide a signal indicative of the difference therebetween.

30. The computer controlled laser machining apparatus as claimed in claim 29, wherein said computer control means comprises sixth means responsive to said difference signal for adjusting said control signal, whereby the actual power level of the emitter laser beam is adjusted accordingly.

31. The computer controlled laser machining apparatus as claimed in claim 1, wherein there is included means for directing radiation onto said laser of controlled frequency, whereby said laser emits a series of laser pulses of corresponding frequency along said path, shutter means disposed to intercept said path and operable between an open position to permit the laser pulses to be directed onto the work piece, and a closed position to prevent the laser pulses from being directed onto the work piece, said programmable computer means comprising third energy control means for actuating said shutter means to its open position for a period of time to permit a whole number of the laser pulses to be directed to the work piece, whereby the laser energy imparted to the work piece may be precisely controlled.

32. The computer controlled laser machining apparatus as claimed in claim 31, wherein said programmable computer means comprises fourth means for entering parameters indicative of the whole number, the pulse width of and the repetition rate of the laser pulses applied to the work piece to provide pulses of laser emission of sufficient peak power to progressively weld the work piece to the desired penetration.

33. The computer controlled laser machining apparatus as claimed in claim 31, wherein said third energy control means comprises counter means for counting the number of laser pulses applied to the work piece.

34. The computer controlled laser machining apparatus as claimed in claim 33, wherein said third energy control means comprises switch means for applying a selected count to said counter means, whereby said counter means counts to said selected count before disposing said shutter means from its open to its closed position.

35. The computer controlled laser machining apparatus as claimed in claim 33, wherein said third energy control means comprises timing means for generating and applying a series of timing signals of a selected frequency to said counter means to be counted thereby.

* * * * *